US012260465B2

(12) United States Patent
McGee et al.

(10) Patent No.: US 12,260,465 B2
(45) Date of Patent: Mar. 25, 2025

(54) REAL ESTATE MARKETPLACE METHOD AND SYSTEM

(71) Applicant: NOBUL CORPORATION, Toronto (CA)

(72) Inventors: Regan McGee, Toronto (CA); Robbie Freethy, Toronto (CA); Alex Sellink, Toronto (CA); Rahul Ramesh, Toronto (CA); Christopher Mark Mero, Uxbridge (CA)

(73) Assignee: NOBUL CORPORATION, Toronto (CA)

( * ) Notice: Subject to any disclaimer, the term of this patent is extended or adjusted under 35 U.S.C. 154(b) by 794 days.

(21) Appl. No.: 16/385,012

(22) Filed: Apr. 16, 2019

(65) Prior Publication Data

US 2019/0318433 A1   Oct. 17, 2019

Related U.S. Application Data

(60) Provisional application No. 62/658,287, filed on Apr. 16, 2018, provisional application No. 62/658,270, (Continued)

(51) Int. Cl.
*G06Q 50/16* (2024.01)
*G06Q 30/0601* (2023.01)
(Continued)

(52) U.S. Cl.
CPC ......... *G06Q 50/16* (2013.01); *G06Q 30/0639* (2013.01); *G06Q 30/0641* (2013.01);
(Continued)

(58) Field of Classification Search
None
See application file for complete search history.

(56) References Cited

U.S. PATENT DOCUMENTS 9,846,917 B1 * 12/2017 Watkins, III ......... G06Q 40/025
10,002,398 B1 *  6/2018 Isaacson ............... G06Q 50/188
(Continued)

OTHER PUBLICATIONS

Andrew Baum, "PropTech 3.0: the future of real estate", Apr. 2017, University of Oxford Research (Year: 2017).*

*Primary Examiner* — Sarah M Monfeldt
*Assistant Examiner* — Michael J. Monaghan
(74) *Attorney, Agent, or Firm* — Norton Rose Fulbright Canada LLP

(57) ABSTRACT

The present invention is a real estate marketplace incorporating computerized systems and methods. The marketplace may incorporate a platform and/or application (app) operable to provide a user with one or more functions for a real estate process. The marketplace may be integrated with blockchain whereby secured blockchain-based ledger structures are generated to facilitate a secured and traceable real estate process. Users of the marketplace may include buyers, sellers, agents and/or other service providers. Each type of user will experience a different flow of options and steps in accordance with the activities of said user in a real estate process. Agents and other service providers compete to provide services to buyers and seller users in a real estate process. The choice of agent and other service providers, the services to be provided, and the fees for such services relating to the real estate process are all driven by the buyer and seller users.

20 Claims, 24 Drawing Sheets

Related U.S. Application Data filed on Apr. 16, 2018, provisional application No. 62/658,244, filed on Apr. 16, 2018.

(51) Int. Cl.
*H04L 9/00* (2022.01)
*H04L 9/06* (2006.01)

(52) U.S. Cl.
CPC .......... *H04L 9/0637* (2013.01); *H04L 9/0643* (2013.01); *H04L 9/50* (2022.05)

(56) References Cited

U.S. PATENT DOCUMENTS

| | | | | |
|---|---|---|---|---|
| 10,037,558 B1* | 7/2018 | Thomas | ............... | G06Q 40/025 |
| 10,078,866 B1* | 9/2018 | Eraker | ............... | G06Q 30/0643 |
| 2003/0078897 A1* | 4/2003 | Florance | ................ | G06Q 30/02 |
| | | | | 705/80 |
| 2006/0015451 A1* | 1/2006 | Heyer | .................... | G06Q 20/10 |
| | | | | 705/39 |
| 2010/0063829 A1* | 3/2010 | Dupray | ................. | G06Q 50/16 |
| | | | | 705/313 |
| 2013/0151425 A1* | 6/2013 | Feinstein | ................ | G06F 40/20 |
| | | | | 704/9 |
| 2013/0211963 A1* | 8/2013 | Williams | ............... | G06Q 30/04 |
| | | | | 705/26.43 |
| 2013/0304725 A1* | 11/2013 | Nee | ....................... | G06F 16/248 |
| | | | | 707/722 |
| 2013/0339189 A1* | 12/2013 | Minerick | ............... | G06Q 50/16 |
| | | | | 705/26.41 |
| 2014/0279176 A1* | 9/2014 | Taylor | .................... | G06Q 50/16 |
| | | | | 705/26.4 |
| 2014/0279591 A1* | 9/2014 | Trailer | ............... | G06Q 30/0617 |
| | | | | 705/313 |
| 2015/0019366 A1* | 1/2015 | Fenn | .................... | G06Q 50/188 |
| | | | | 705/26.4 |
| 2015/0081497 A1* | 3/2015 | Patel | ...................... | G06Q 40/02 |
| | | | | 705/35 |
| 2015/0332418 A1* | 11/2015 | Wilson | .................... | G06Q 10/00 |
| | | | | 705/313 |
| 2016/0012554 A1* | 1/2016 | Dell Orfano | .......... | G06Q 40/00 |
| | | | | 705/313 |
| 2016/0093007 A1* | 3/2016 | Richardson | ........ | G06Q 30/0611 |
| | | | | 705/26.4 |
| 2016/0292763 A1* | 10/2016 | Goodrich | ............ | G06Q 30/0641 |
| 2016/0314525 A1* | 10/2016 | Dull | ...................... | G06Q 30/08 |
| 2016/0371801 A1* | 12/2016 | Dawson | .................. | G06F 16/29 |
| 2017/0287038 A1* | 10/2017 | Krasadakis | ........ | G06Q 30/0201 |
| 2018/0053269 A1* | 2/2018 | Heatherly | .............. | G06Q 50/16 |
| 2018/0096362 A1* | 4/2018 | Kwan | ................... | G06F 40/284 |
| 2018/0253780 A1* | 9/2018 | Wang | ...................... | H04L 51/02 |
| 2018/0300342 A1* | 10/2018 | Hundley | ............... | G06F 16/313 |
| 2018/0300741 A1* | 10/2018 | Leonard | ................ | G06Q 30/08 |
| 2018/0322597 A1* | 11/2018 | Sher | .................... | G06Q 20/3821 |
| 2019/0073729 A1* | 3/2019 | Cheng-Shorland | .......................... | |
| | | | | G06Q 30/0645 |
| 2019/0205971 A1* | 7/2019 | Deo | ....................... | H04L 67/535 |
| 2019/0236628 A1* | 8/2019 | Sudhindra | .......... | G06Q 30/0206 |

* cited by examiner

REAL ESTATE MARKETPLACE METHOD AND SYSTEM

This application claims the benefit of U.S. Provisional Patent Application Ser. No. 62/658,287 filed Apr. 16, 2018, U.S. Provisional Patent Application Ser. No. 62/658,244 filed Apr. 16, 2018, and U.S. Provisional Patent Application Ser. No. 62/658,270 filed Apr. 16, 2018.

FIELD OF INVENTION

This invention relates in general to the field of real estate computerized systems and more particularly to real estate computerized systems.

BACKGROUND OF THE INVENTION

Prior art computerized real estate systems have been directed to automating portions of the real estate selling and purchasing activities. As real estate selling and purchasing activities are generally driven by activities of real estate agents and other real estate service providers (e.g., lawyers, land registries, etc.) discrete steps that agents and service providers undertake have been individually and selectively automated, or enhanced by computer-implemented methods.

An example of a prior art real estate focused invention is disclosed in U.S. Patent Application Publication No. 2018/0068402, filed on Nov. 13, 2017 by Redfin Corporation. This application discloses a computer-implemented method of providing information that characterizes real-estate market conditions within a geographic sub-region. A user indicates the sub-region and the system searches its stored information to identify a parcel of real property located in the sub-region for which a purchase offer has been made. If a purchase transaction for the parcel of real property has not closed a range of plurality of values characterizing the purchase offer is provided to the user, or if a purchase transaction for the parcel of real property has closed a specific value of the plurality of values characterizing the purchase offer is provided to the user. This invention is solely directed to the discrete step of identification of purchasable real estate. Another example of a prior art real estate focused invention is disclosed in U.S. Patent Application Publication No. 2018/0061160, filed on Aug. 4, 2017 by ShowingTime.com, Inc. This application discloses a system for dispensing a key from a key kiosk at a realtor's office based upon a real estate showing appointment. The user can take steps to be authenticated by the system and if the authentication takes place at a time that is in keeping with the scheduled showing appointment, the kiosk will dispense the key to the user. This invention is solely directed to the discrete step of dispensing keys of real estate showings.

Yet another example of a prior art real estate focused invention is U.S. Pat. No. 9,105,061, issued on Aug. 11, 2015 to Redfin Corporation. This patent discloses a website system that maintains a webpage providing an aerial image map of a geographic region. The website further facilitates online collaboration for real estate transactions, whereby a user creates an account that provides the user access to real estate information. Real estate agents or other real estate service providers selected by the user are granted shared access to the user's account by the system. This invention is solely directed to the discrete action of providing access to a user's account that incorporates information the user requests and stores relating to real estate.

Prior art inventions also exist that incorporate blockchain technology. Such prior art systems are computerized systems and methods for generating secured blockchain-based ledger data structures. A blockchain creates a history of transactions and data in a series of blocks where each block contains a mathematical summary (a hash) of the previous block. The blocks are thereby linked and create a chain. The unpredictable nature of the hash considerably increases the difficulty of finding a valid hash. This creates security for the blockchain ledger.

Blockchain security is also based on implementation on a distributed network, whereby a large number of users all have access to the blockchain and are all attempting to add blocks to the end of the chain. A blockchain on a distributed network that incorporates sufficiently restrictive rules for creating valid blocks, is secure against unauthorized changes to the data stored therein. This makes blockchain technologies particularly useful for recording financial transactions. Prior art systems further incorporate uses of blockchain with discrete aspects of a real estate processes.

An example of a prior art invention that references use of blockchain with a discrete aspect of a real estate process is U.S. Patent Application Publication No. 2017/0116693, filed on Oct. 27, 2016 by Verimatrix. This application discloses a method for decentralizing rights management for digital assets using a blockchain rights ledger. The invention is a playback device for accessing content using a decentralized blockchain rights ledger that directs a processor to obtain an encrypted digital media work and generates a digital representation of the digital media work. A platform license transaction corresponding to the identified digital representation and matching platform identification can be located, and the platform activation transaction can identify a platform that is permitted to play back the digital media work. Encryption processes are integrated in this invention, and content from the digital media work can be decrypted. Such decrypted content can be played back to a user. This application suggests that this process can be applied to digital titles that certify ownership in real estate properties.

In light of the prior art, and the gaps therein, what is needed is a real estate marketplace that and is applicable to multiple activities incorporated in a real estate process.

SUMMARY OF THE INVENTION

In one aspect, the present disclosure relates to a real estate process marketplace method, comprising utilizing a real estate marketplace system for the steps of: one or more users each generating a profile in the real estate marketplace system, and the following steps of: one of the one or more users that is a first user generating a proposal and making the proposal available via the real estate marketplace system to one or more other users; one or more of the one or more users that is a second user accessing and viewing the proposal; the second user generating an offer in response to the proposal and transferring such offer to the first user; the first user that receives the offer reviewing the offer and generating a response that declines or accepts the offer and transferring such response to the second user; a real estate process agreement being generated by the real estate marketplace system between the first user and the second user and being transferred to said first user and said second user for execution of the real estate process agreement; and said first user and second user engaging in a real estate process.

In another aspect, the present disclosure relates to a real estate process marketplace method, further comprising utilizing a real estate marketplace system for the step of generating a smart contract as the real estate process agreement.

In another aspect, the present disclosure relates to a real estate process marketplace method, further comprising the step of generating a blockchain ledger for the real estate process in accordance with terms of the real estate process agreement.

In another aspect, the present disclosure relates to a real estate process marketplace method, further comprising the step of the first user or second user engaging one or more other users to assist with the real estate market process as a service provider.

In another aspect, the present disclosure relates to a real estate process marketplace method, further comprising the step of the real estate marketplace system operating to generate a workflow identifying the steps for the real estate process, and identifying sub-steps for each of the one or more real estate service provider engaged for the real estate process.

In another aspect, the present disclosure relates to a real estate process marketplace method, further comprising the step of the real estate marketplace system generating one or more agreements between the first user and second user, or the first user and a service provider, or the second user and a service provider, in accordance with the real estate process.

In another aspect, the present disclosure relates to a real estate process marketplace method, further comprising the step of engaging one or more service providers that are one or more of the following: home and property insurance providers, mortgage brokers, property inspectors, home inspectors, lawyers, escrow managers, and financial institutions.

In another aspect, the present disclosure relates to a real estate process marketplace method, further comprising the step of the real estate marketplace system linking to one or more external systems, and transferring data from said one or more external systems to the real estate marketplace system, for use in the real estate process.

In another aspect, the present disclosure relates to a real estate process marketplace method, further comprising the step of the first user, second user and the one or more service providers operating the real estate marketplace system via a computing device.

In another aspect, the present disclosure relates to a real estate process marketplace method, further comprising the step of the real estate marketplace system collecting proposals from the first user and one or more other users, and making one or more such proposals accessible by the second user in accordance with a query generated by said second user, whereby the one or more proposals available to the second user are identified by the real estate marketplace system as incorporating criteria identified by the query.

In another aspect, the present disclosure relates to a real estate process marketplace method, further comprising the step of the real estate marketplace system identifying one or more proposals as incorporating the criteria of a location identified in the query.

In another aspect, the present disclosure relates to a real estate process marketplace method, further comprising the step of the real estate marketplace system being linked to one or more real estate registry systems, and the real estate marketplace system transferring one or more filings generated by the real estate process each to one of the one or more real estate registry systems.

In another aspect, the present disclosure relates to a real estate process marketplace method, further comprising the step of the real estate marketplace system generating a new module for each new type of service provider that provides services via the real estate marketplace system, whereby multiple modules are incorporated in the real estate marketplace system each for a service in the real estate process and users can access a service provider for one or more of said services via the corresponding module.

In another aspect, the present disclosure relates to a real estate process marketplace method, further comprising the step of the real estate marketplace system generating a map indicating one or more real estate locations relating to a real estate process.

In another aspect, the present disclosure relates to a real estate process marketplace method, further comprising the step of the real estate marketplace system generating predictive analytics for a real estate asset or for one or more real estate assets in a geographic location.

In yet another aspect the present disclosure relates to a computer-implemented real estate map tool method, comprising the steps of: obtaining map data to generate a map indicating real estate assets in a geolocation; comparing map data to the map data for one or more previously generated maps to determine any differences there-between, and undertaking one of the following steps: utilizing prior map data if no differences are determined; updating prior map data if differences are determined and utilizing the updated map data; or utilizing map data if significant differences are determined; and compressing map data and transmitting map data to user.

In yet another aspect the present disclosure relates to a computer-implemented real estate map tool method, further comprising the step of setting parameters for the map data and applying parameters to the map data to filter the real estate assets indicated to a user upon the map generated from the map data.

In another aspect the present disclosure relates to a computer-implemented real estate map tool method, further comprising the step of generating travel information for travelling between the one or more real estate assets incorporated in a map.

In still another aspect the present disclosure relates to a computer-implemented real estate predictive analytics tool comprising: an ingest data module connected to one or more data resources, and operable to collect information from the one or more data resources; a develop model module connected to the one or more data resources whereby information collected from the one or more data resources is transmitted from the ingest data module to the develop model module, and such information is processed to generate predictive models and reports; and one or more servers connected to the develop model module wherein information and reports are stored.

In still another aspect the present disclosure relates to a computer-implemented real estate predictive analytics tool further comprising artificial intelligence operable to improve the accuracy of the predictive models and reports.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
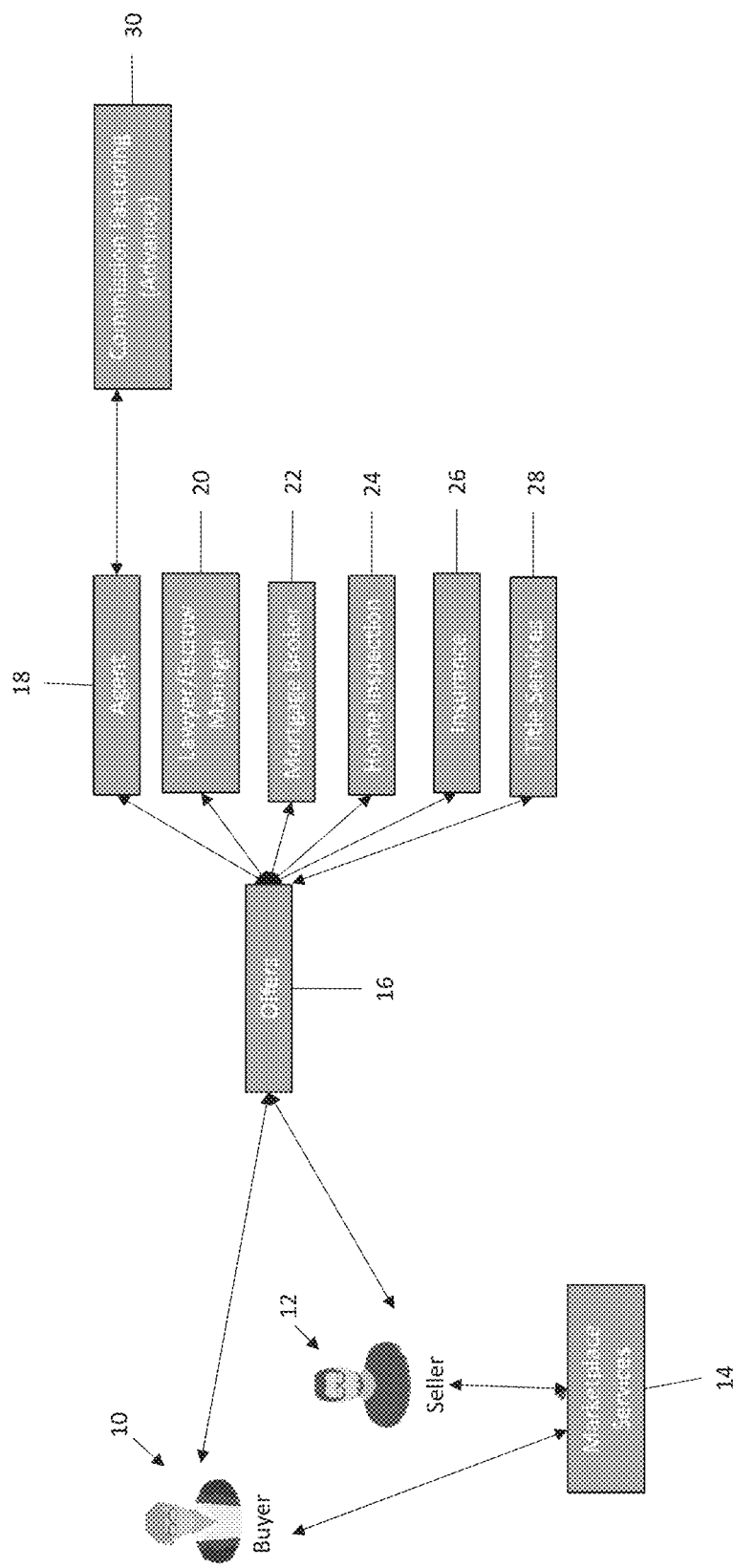
FIG. 1 is a systems drawing showing modules utilized by buyer and seller users interacting with marketplace service providers, of embodiments of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a real estate marketplace incorporating computerized modules and tools. The marketplace may incorporate a platform and/or application (app) operable to provide a user with one or more functions for a real estate process. Users of the marketplace may include buyers and sellers, as well as agents and/or other service providers. Each type of user will experience a different flow of options and steps in accordance with the activities of said user in a real estate process. Agents and other service providers can compete to provide services to buyer and seller users in a real estate process. The choice of agent and other service providers, the services to be provided, and the fees for such services relating to the real estate process are all driven by the buyer and seller users.

The marketplace may be integrated with blockchain whereby secured blockchain-based ledger structures are generated to facilitate a secure and traceable real estate process.

The marketplace may further incorporate a query response module whereby a user can pose queries and information will be processed by said module to formulate a response to said query. Said module may be operable with the user's device to facilitate interaction, such as verbal or text interaction, of the user with the query response module. Said module may incorporate a natural language interface whereby users may interact with the marketplace via voice commands, or other commands delivered via different formats.

The terms "real estate" and "real estate assets" as used herein mean all types of real estate and properties, including commercial, residential, agricultural, industrial, rental, new build, and any other type of real estate.

The term "buyer" as used herein means a person who is interested in purchasing real estate or other services associated with the purchase of real estate.

The term "seller" as used herein means a person who is interested in selling real estate.

The term "service provider" as used herein means a person or entity that assists with and provides services for a real estate process. Embodiments of the marketplace may be agnostic as to the specific service providers, meaning any service provider may be able to join the marketplace, while other embodiments of the marketplace may require service providers to be members of a group, for example, such as service providers working for affiliated companies, or otherwise connected within a group.

The terms "real estate agent" and "agent" as used herein reference a person who engages in the sale and/or purchase of real estate on behalf of a buyer and/or seller, and who may be a licensed real estate agent.

The term "real estate process" as used herein means the process of purchasing, leasing and/or selling real property, and any step, and collectively all steps, of such processes, recognizing that these steps may vary from one real estate process to another.

The terms "marketplace" and "system" as used herein mean the system of the present invention including hardware system elements, software code elements, the platform, app, website, and all elements connected to or integrated with the system, including internal, external and third party resources, in accordance with embodiments of the present invention. In some embodiments the marketplace and system may incorporate blockchain modules, The term "mobile device" as used herein means any devices including smart devices, such as a phone, tablet, speaker, wearable technology or other hand-held or worn computing device. The term "non-mobile device" as used herein means any TV, desktop, laptop or other computing device that is not easily transported in a hand-held manner or worn by a user.

The term "fee" or "fees" as used herein indicate requirements to provide payment, and the form of that payment may vary based upon embodiments of the present invention, the users, and the service providers. For example, fees may be indicated in national or regional currency (e.g., Canadian dollars, British pounds, European Region euros, etc.), in electronic currency (e.g., cryptocurrency, or other electronic currency), or in other currencies. Embodiments of the present invention may incorporate modules or other functions whereby payments of fees in such currencies may be accepted and processed. Alternatively, embodiments of the present invention may be linked to third party software or modules whereby payments of fees in such currencies may be accepted and processed on the behalf of users and/or service providers of the marketplace. Tokenization may also be recognized by the system, whereby investors buying into a new build property may receive partial ownership of said building.

Embodiments of the present invention may incorporate a fee system, whereby transactions that occur in the marketplace as a result of bidding by real estate agents will only require the real estate agent that has the successful bid to pay part of the commission to the marketplace owner if the real estate transaction based upon the bid is successful.

Any connection between modules or other system elements described herein indicates a connection whereby information can be transferred bi-directionally, or information can otherwise be accessed, utilized, and potentially processed by the connected elements. Such connections may be direct (e.g., wired connections) or wireless connections. In some embodiments of the present invention elements may be remotely located from one another.

The operation of the system and all of the modules and tools incorporated therein, are in accordance with software code incorporated in the system. Said software is operable to create responses in and to otherwise control micro-processors and servers incorporated in the system to achieve the operations of the system and all of the modules and tools incorporated therein. Said software is further operable to create a connection between the system and the internet or an intranet, as required for the system to connect with external information resources, and to cause the app and the platform of the system to be connected as discussed herein. Said software provides commands to the micro-processors to process information collected by or inputted to the system, commands to the servers to store and retrieve information and other software code stored within said servicers. The software code is further operable to provide commands to external information resources, whereby the system is operable to access and collect information from such external information resources, as discussed herein.

Embodiments of the real estate marketplace platform and app may be integrated or otherwise incorporated with blockchain technology. Generally blockchain technology generates a list of blocks (records) that each contain a cryptographic hash of the previous block, a timestamp and transaction data. Each block is linked and secured. The linked blocks form an open, distributed ledger that records transactions between parties efficiently and in a verifiable and permanent way. In embodiments of the present invention, blockchain technologies of any type (e.g., Steemit, Hyperledger, Counterparty, Quorum, Bitnation, Factom, Tezos, Ethereum, or any other blockchain technology), and future developed technologies, can be applied. The blockchain will facilitate the recording of events in a real estate process, and record management relating to real estate processes, in a secure and reliable manner.

Through integration or other incorporation with blockchain the marketplace provides users with secured blockchain-based ledger operability, whereby events, such as payments, in a real estate process can be recorded in blockchain ledgers. In some embodiments of the present invention, blockchain can be operable with the marketplace to detect an occurrence of a triggering event, and may access and decrypt a set of rules hashed into the secure blockchain-based ledger using a confidentially-held master cryptographic key. The marketplace may identify a rule associated with the detected event, and perform one or more operations consistent with the rule. The detected event may correspond to a payment for a real estate purchase, a payment for an agent's commission, transfer of real estate title, or some other type of event. The operations performed may be in accordance with one or more terms or conditions of a contractual agreement (e.g., a smart contract) between users of the marketplace to effect a step in the real estate process occurring between said users. Thus, the blockchain integration can facilitate smart contracts being incorporated in the marketplace to establish and enforce the obligations of the users in the real estate process they engage in with each other.

A smart contract is generally a contract that is at least partially in the form of a computer protocol intended to digitally facilitate, verify, or enforce the negotiation or performance of an agreement between users of the marketplace. For example, any contract for services between a real estate agent user and a buyer or seller user or other interactions of users. A smart contract facilitates the performance of credible transactions. There is no human interaction required for terms of a smart contract to be enforced, or any requirement for any third party to enforce the terms of the contract. Enforcement of smart contract terms is trackable and irreversible, because these terms are enforced by a computer-generated activity occurring in accordance with a trigger aligned with a term of the contract. Blockchain technologies can function to enforce a smart contract and record the events occurring in relation to such enforcement. For example, enforcement of a term to disburse funds to a seller user occurring upon acceptance of the statement of accounts for the sale of real estate may occur in a smart contract for a real estate process. The enforcement will be a computer generated transfer of funds from the buyer user's financial institution account to a seller user's financial institution account. The funds will be transferred automatically, upon the event set out in the smart contract as the trigger for the transfer of funds. Blockchain will generate a ledger confirmation, such as one or more blocks, that is a record of the transfer of funds. The blockchain record can be referenced as verification of the transfer of funds, and as compliance with the terms of the smart contract. Smart contracts and blockchain functionalities can also be applied to any other step in a real estate process.

The encryption process applied to the marketplace may be achieved through various mechanisms. For example, transactions engaged in by users during a real estate process can be added as blocks in the blockchain, and the transaction data in a block may be encrypted data with an encryption key. The marketplace may incorporate a method that allows a user to access and read the data in a blockchain. As such, a request to access and read the data may be generated by a user on the marketplace to incorporate a transaction identifier, and that request may then be received with a transaction identifier and a decryption key from a user system. In response, the system will act to find the block corresponding to the transaction identifier in the blockchain, and the data will be decrypted using the decryption key and thereby be readable by the authorized user.

The marketplace is useable by a user (whether a buyer, seller, agent or service provider) though a website or through an app or other future technology. The app may be utilized by a user on any mobile device, such as a tablet, smart phone, wearable device, or any other mobile device. The website may be used by a user on any computing device, such as a desktop computer, laptop, tablet, smart phone, smart speaker, wearable device, or any other mobile device operable to access a website. The marketplace may further incorporate a platform whereby operations are accessed through the website and/or app, and data may be processed. The platform may be connected to one or more servers wherein data relating to the marketplace, whether data utilized to operate the marketplace or data generated through use of the marketplace, is stored and accessible by the platform and app.

The platform further may have operability to download the app, and all updates thereto, from a server to a user's mobile device, whereby the app may be utilized by a user. The app may access information stored in the one or more servers and/or data processed by the platform, when operated by a user. Data generated by the user while using the app may be transmitted by the app to one or more severs for storage, or to the platform for processing.

The marketplace of the present invention is operable for use by a buyer user generally to search properties, review agents, and find service providers to assist the buyer user to navigate the real estate process. The present invention offers an important service as a real estate purchase is a large investment for the buyer. Use of the marketplace offers the buyer user visibility into the services to be provided to said user, and the costs for the real estate process. Specifically, a buyer may use the marketplace, whether via a website or an app, to search properties and select properties for viewing on the screen or voice response of the user's mobile device, smart device or computing device. The buyer may provide information regarding real estate that the buyer is interested in purchasing, whether relating to specific real estate, or generally to real estate in a geographic area (a buyer proposal or request). The buyer proposal so provided may be received by one or more agents. The agents may generate offers of services and fees to assist the buyer in purchasing real estate.

A buyer can review and compare the offers from agents who are competing to assist the buyer and choose an agent to assist the buyer. Once an agent is selected a similar request/offer process may be engaged in by the buyer and service providers, as required for a real estate process. Or alternatively, the proposal/offer process may only occur between a buyer and one or more service providers.

A result of the present invention will be that the buyer is aware of the steps in the real estate process, the agent and/or other services providers able to assist with the process, the services to be provided, and the costs relating thereto.

The marketplace of the present invention is operable for use by a seller user generally to post information about the real estate the seller wants to sell. The information the seller provides (a seller request) may be received by one or more real estate agents. The real estate agents may each generate an offer of services and fees to assist the seller in selling the real estate. Each agent's offer will include the commission fee that the agent will charge. A seller can review and compare the offers from agents who are competing to assist the seller and choose an agent to assist the seller. Once an agent is selected a similar request/offer process may be engaged in by the seller and service providers, as required for a real estate process. Or alternatively, the request/offer process may only occur between a seller and one or more service providers.

A result of the present invention will be that the seller is aware of the steps in the real estate process, the agent and/or other services providers able to assist with the process, the services to be provided, and the costs relating thereto.

The marketplace of the present invention is operable for use by a real estate agent generally to determine the types of real estate that the agent will offer assistance with (e.g., residential, commercial, new builds) to a buyer and/or a seller. The agent will identify all services and fees (e.g., commission fees and any other fees) the agent will offer to a buyer or seller of any for the types of real estate that the agent selects. All fees the agent will charge must be set out explicitly by the agent. The agent may view buyer requests or seller requests generated by sellers and buyers about the real estate such sellers and buyers wish to sell or buy. The agent may generate offers to be provided to one or more of such buyers or sellers that offer the agent's services at specific fees. An offer may be generated by an agent that includes services or fees that are specific to the buyer request or seller request of a particular buyer or seller (e.g., a specific commission rate, etc.). In this manner an agent can bid on, and compete for, the chance to assist a buyer or seller.

The marketplace of the present invention is operable for use by service providers that provide specific services relating to a real estate process that may be one or more activities in said process. For example, service providers may include insurance providers, mortgage brokers, property and home inspectors, land registries, lawyers, escrow managers and financial institutions. Generally service providers can use the marketplace to identify all services and fees (e.g., commission fees and any other fees) the service provider will offer to a buyer or seller of real estate. All fees the service provider will charge must be set out explicitly by the service provider. The service provider may view buyer requests or seller requests generated by sellers and buyers about the real estate such sellers and buyers wish to sell or buy. The service providers may generate offers to be provided to one or more of such buyers or sellers that offer the service provider's services at specific fees. An offer may be generated by a service provider that includes services or fees that are specific to the buyer request or seller request of a particular buyer or seller. In this manner a service provider can bid on, and compete for, the chance to assist a buyer or seller. Service providers can offer their services as part of a real estate process generally (e.g., the process of selling or purchasing real estate), or the service providers can offer services as standalone real estate processes (e.g., the purchase of insurance at any time, a home inspection prior to renovations, legal services to assist with a land dispute, etc.).

The marketplace is operable to collect information that a user inputs to the system. A user may input information via a keyboard of the mobile device or non-mobile device the user utilizes to access the marketplace, via voice controlled input, or via any other input method. The system can store, retrieve and process said information. One or more servers are connected to the system (directly via a wired connection, or via a wireless connection) for the storage of said information. The system may further store said information in one or more databases or other storage structures of formats operable for ease of retrieval of said information by the system and the modules and tools incorporated therein, The system further may access or collect information from external information sources, as discussed herein. If information from external information sources is collected by the system it can be stored by the system and processed in the same manner as information inputted by a user.

An embodiment of the marketplace of the present invention is operable to facilitate auto-bidding, whereby a service provider can pre-define one or more services that said service provider offers in a particular geographical location. Such services may be identified as premium services provided by the marketplace in embodiments of the present invention.

The service provider may indicate that it offers multiple types of services in a geographical location, and/or that it offers different types of services, or combinations of services, in different geographical locations. A buyer user or seller user of the marketplace will indicate said user's geolocation, as well as said user's interest in connecting with a service provider offering specific services. The marketplace will process said user's indication and compare this to the services offered by service providers in the same geo-location as said user has indicated. The marketplace will then direct said user to the service provider (or multiple service providers) who are a match for the same geolocation and services indicated by said user. The matches are determined by the matching module. Whether one or more service provider users are identified as matches, the profile and/or proposals for services to be provided of all service providers identified as matches will be sent or otherwise provided to said user, whereby said user may review such profiles.

The service provider may pre-define a number of different parameters relating to services to be provided by said service provider via the marketplace. Such parameters may include geolocation where services are provided, any commission or reduced fees applicable to services, the specific one or more services provided, and other information relating to the services. This information may be incorporated in a services provider's profile, and may further be the type of information incorporated in a proposal a service provider user may generate relating to said service provider's service offerings, as discussed herein.

Embodiments of the present invention, may incorporate a catalog that is provided to service providers. The catalog may incorporate multiple service options. The service provider may select the services that said service provider will provide from the catalog. The catalog may be generated to reflect the specific services that may be provided by a service provider in the particular jurisdictions where the service provider indicates that it operates. The information in the catalog regarding one or more services may be incorporated in the description of the services provided by said service provider, in a particular jurisdiction if applicable, and thereby support a consistency between service information for service providers provided to other users of the marketplace. The choice of services from the catalog by service providers is further tracked by the marketplace and the relationship between service providers and the marketplace can be established thereby and tracked on an ongoing basis.

An embodiment of the marketplace of the present invention may incorporate a user dashboard, whereby information regarding the user's activities on the marketplace, including interactions between users including with service providers, may be shown in a visual format and/or text format. The dashboard, such as may function as a Home Hub, may be generated to incorporate drill down functionalities, whereby information shown on the dashboard can be selected to activate a link therefrom to supporting documentation or information. For example, information relating to proposal for the sale of a property may be selected to activate a display of a description of the property, including sale details, such as cost, size of the property, pinpoint geolocation of the property, etc. Moreover, such information may further incorporate additional links to other supporting information, such as, for example, the location of the property may be selected to activate a link to a copy of the property title record. A variety of information and links to supporting information and documents may be incorporated in the dashboard, to any number of drill down levels.

Users can generate proposals that indicate information relating to the type to activities they are seeking to engage in via the system. For example, a service provider can create a proposal indicating the service provider's services to be offered via the system, whereas a buyer user can indicate in a proposal the type of property, range of cost, geographic location, amenities in and near the property that are required in a property such buyer user may purchase, and other information relating to the property said user is seeking to purchase. A seller user may provide information such as is discussed herein relating to a proposal for sale of a property. A proposal can be created either when a user starts to use the system or at a later point in time. A proposal may further indicate the types of alerts, tips notifications or other information that a user or service provider wishes to receive relating to the information in the proposal and how such should be received (e.g., as displayed on the system displays, pushed to a mobile device, or in another manner) as generated by the system. This same type of information can be set in a user profile.

A user profile is applicable generally to the user's use of the system, whereas a proposal may be directed to a specific property or services being sought or being identified as being available to be provided, at a point in time. A proposal may also be generated by a buyer or seller user in response to another user's profile, such as, for example, a service provider's proposal directed to offering specific services.

In embodiments of the present invention, a user or service provider can modify any user proposal details on the fly, for example, such as changing the commission information, changing rebate off fees information, adding services, or modifying other details of the proposal. Some such modifications will generate automatic calculations by the system, for example, altering the services will cause the system to auto generate a new list of service providers that offer the requested services to be provided to a buyer user or a seller user.

The activities and options that are available to a buyer user will differ from the options available to a seller user when each type of user creates a proposal. These differences will reflect the different activities and services that a seller will require to complete a sale of property, and those that a buyer will require to complete a real estate process.

When a user, whether said user is a seller or a buyer, undertakes particular activities through the system the system may generate agreements. For example, when a buyer user or seller user sets up a meeting with a service provider the system will generate a Referral Agreement between said user and the service provider. An electronic signature tool may be provided whereby such agreement can be executed by said user and service provider through the system. The agreements that are generated by the system will be in accordance with the agreements that are required by the local laws, regulations, policies and industry practice standards that relate to the service to be provided by the service provider to said user, including any regulatory board (e.g. a local real estate board, zoning board, etc.) requirements. A buyer user or seller user may set-up multiple meetings with service providers, and may only sign agreements once said user has determined to accept services from one or more particular service providers (each of said service providers providing different services under separate agreements to said user).

In some embodiments of the present invention the system may be operable to facilitate filing of documents and agreements relating to the activities of the users and service providers, such as, for example, documents and agreements relating to the sale of a property that are required to be filed with a real estate board.

Agreements between a buyer user or seller user and a service provider relating to a real estate process undertaken via the system may be stored on the system, and may be accessible by said user and one or more service providers, as required for the real estate process, and in accordance with access permission settings set by said user or said service provider through use of the system, such as in a proposal or a profile.

The system may further provide reminders to users regarding agreements and documents that must be obtained for purposes of a real estate process, to assist the users with ensuring that legal and professional requirements are met for such process. Such reminders may be provided in the same manner as other alerts and notifications and tips generated by the system. Reminders may also be generated to indicate agreements waiting for execution, proposals received by users from other users that have not be viewed or reviewed, etc.

The system may be integrated or otherwise connected to information sources, such as, for example, land title registries, real estate board websites, documents and statistics, databases of information provided by third parties, and other information sources relating to real estate processes. The system may access this information and may store or incorporate such information in the processing of the system. Thus, tips, recommendations, insights, matching, comparison, trend reporting and other functions and features of the present invention may incorporate such accessed and/or collected information. The system may further store information over time relating to prior real estate transactions, and may process such information to determine historical information (e.g., past rankings of service providers, etc.), identify trends (e.g., hot real estate areas, etc.), and produce averages (e.g., average property prices, average service provider commissions or rebates, etc.).

Information records for properties may be generated at least in part from such accessed and/or collected third party sourced information (e.g., title information, nearby amenities, neighbourhood statistics, etc.). Information records for properties may further include information generated by a service provider or seller user (e.g., text descriptions of aspects of a property, details regarding amenities of a property, photos or video showing a property, etc.).

Based upon all of the information accessed, collected, processed and generated by the system, embodiments of the present invention may generate analytics, machine learning, artificial intelligence and other activities relating to big data operability (namely, functions and operation of the system that are achieved through the analysis, processing and/or aggregation of large quantities of information by the system).

The marketplace of the present invention may undertake additional processes, that may be facilitated by a matching module, whereby a buyer user's or seller user's needs are matched with one or more service provider's service offerings. The marketplace may further undertake processes whereby a matching module generates matches of a user's proposal criteria to particular property, or other matching of properties or services to a user's needs in accordance with information submitted to the marketplace by the user, or a user's location as identified via a connection between the marketplace and a mobile device (e.g., a smart device, a smart phone, a tablet, a laptop computer, a wearable device, etc.) utilized by said user to connect to the marketplace.

The marketplace may further incorporate an augmentation module, whereby the marketplace will recognize that a user is utilizing multiple service providers, and will generate outputs that support the user's wide experience of the marketplace services. For example, the marketplace may provide a quote document to the user that sets out quotes for all of the services that a user has indicated it may pursue. The multiple services, and functionalities relating to each of the services individually and collectively, may be supported by a portion of the user's profile that is generated by the marketplace to reflect the collection of services the user is pursuing.

The marketplace of the present invention is operable for use by users engaging in leasing real estate, including lessee users and lessor users. Leasing of real estate is a type of real estate process. The functions available for leasing of real estate are similar to the functions described herein relating to selling and purchasing real estate, including functions whereby real estate agent users and/or service provider user(s) compete for, and assist with, real estate process.

An embodiment of the marketplace of the present invention is operable for use for direct sales of real estate between sellers and buyers, in accordance with applicable regulations. Buyers and sellers may conduct real estate processes directly between each other. In such a use of the marketplace, a fee or other compensation may be directed from a buyer user and/or seller user to the operator of the marketplace, and/or a particular service provider active in the marketplace.

An embodiment of the marketplace of the present invention is operable such that a single user may provide parameters and other information relating to pursuing both a sale and a purchase of real estate.

An embodiment of the marketplace of the present invention is operable to require that a fee be paid by a service provider upon enabling the service of said service provider to be accessible to other users of the marketplace.

An embodiment of the marketplace of the present invention is operable to enable multiple owners of a property to engage in the marketplace activities relating to such property. Such an embodiment may incorporate a token mechanism, such that each of the multiple owners is granted a token whereby access to the activities relating to the property is facilitated. Alternatively, such an embodiment may incorporate other types of mechanisms to facilitate the access of multiple owners of a property to all activities relating to such property occurring via the marketplace.

An embodiment of the marketplace of the present invention is operable to facilitate a query and response module. For example, such query response module may be voice-based, text-based, or otherwise facilitated. Queries posed to the marketplace will be processed such that a response to the query is formulated by the marketplace. The response will be directed to the user of the marketplace who posed the query. Generally the response will be provided to said user in the same format as the query was posed (e.g., text-based, voice-based, etc.), however, the user may indicate at the time of the query or in the user's profile that the response should be provided in a different format than the query was posed. For example, a query may be posed as a voice-based query (a spoken question), and the response may be provided in a text-based format.

An embodiment of the marketplace of the present invention is operable to cause all of the activities of a buyer user or seller user of the marketplace to be transparent and visible to all service providers. Such visibility may be through a list of the activities of said user that is accessible by all service providers, through auto-generated messages regarding the activities of said user being sent to one or more services providers upon the prior request of said service provider, or through some other tracking module whereby said user's activities are tracked and such tracking is accessible or otherwise viewable by the service provider.

An embodiment of the marketplace of the present invention is operable to generate referrals to service providers who are not directly accessible via the marketplace. Said service providers may be service provider partners, for example, such as other service providers with whom service providers in the marketplace frequently interact, or have a sufficient relationship with to refer other users to work with from time to time. As an example, a service provider partner may be a mortgage broker that a real estate agent service provider user frequently works with and therefore refer its clients to, and to whom said real estate agent service provider user refers other users of the marketplace to from time to time. The marketplace may further incorporate functionality whereby interaction between a service provider partner and a user is tracked.

An embodiment of the marketplace of the present invention is operable to issue loyalty currency to users of the marketplace. The loyalty currency may be issued on the basis of use of the marketplace by said users. The issuance of said loyalty currency may be in accordance with rules set in the marketplace whereby said loyalty currency is generated and issued. For example, when a user first utilizes the marketplace a certain amount of loyalty currency may be generated and issued to said user. As another example, upon the completion of a real estate process by a user via one or more service providers of the marketplace, a certain amount of loyalty currency may be issued to said user. Loyalty currency may be utilized to pay fees, or to obtain services or goods offered via the marketplace.

Agreements, may be smart contracts, or some portion thereof may be a smart contract, or traditional written contracts. Said agreements may be set-up between marketplace users and may include terms relating to events that are steps and activities in a real estate process and other terms. For smart contracts, upon the fulfilment of agreement terms details of the fulfilment may be recorded in blockchain ledgers. Traditional pen and ink contracts, e-contracts or other forms of contracts that are generated by embodiments of the present invention may not generate any blockchain effect when the terms are fulfilled. Embodiments of the present invention may further facilitate execution of agreements by e-signatures.

In some embodiments of the present invention, users of the marketplace can rate agents and other service providers. Such ratings may be viewable by users of the marketplace. A buyer or seller user may review such ratings prior to selecting an agent and/or other type of service provider.

Embodiments of the present invention may further incorporate several functionalities to assist users. For example, an embodiment may be operable generate alerts sent to a buyer user when a property is sold in a neighbourhood said user has indicated to be a preferred neighbourhood, or when a property that meets criteria set by a buyer user is sold in a location geographically near to a neighbourhood said user has indicated to be a preferred neighbourhood. The system will utilize any of the following to generate such alerts: the buyer user proposal information; said user's profile information; and information it accesses, generates, receives or collects, relating to property sales.

Embodiments of the present invention may be operable such that a user may mark a property record as tagged, a favourite, or to be saved. Upon such an activity by buyer user or seller user, the system may present to said user the profiles and rankings of the top service providers that are service providers of the marketplace who are providing services in the geographic location of said property. A service provider may also be allowed to access information indicating any buyer user or seller user who has marked a property (as tagged, favourite or to be saved) when said service provider reviews the record (being the information) relating to such property. A service provider may further receive an alert via the system when a seller user indicates a property as to be sold or a buyer user indicates a property to be of interest for purchase, in the geographic location where said service provider provides services.

Embodiments of the present invention may further be connected to one or more weather services, whereby a user can access or be provided with alerts regarding weather in a location where said user will be visiting properties. Such weather information may further be processed by the system to indicate the potential needs of an inhabitant of a property for heating or cooling equipment in relation to the average weather experienced at different times during a year at such property.

Embodiments of the present invention may further be operable to assist users to choose properties for which to arrange viewing appointments based upon commute times for said user to travel to such property. This function can further assist with the step of a buyer user or seller user setting up any type of meeting with a service provider via the system.

Embodiments of the present invention may be operable to provide a set of records (e.g., property listings in a geographic area, service providers in a geographic area, etc.) in a manner whereby a user can see one record at a time, but can easily move through said records, such as through use of a swipe feature on a mobile device, or some other mechanism whereby a user indicate that a next record of the record set should be displayed on the display of a user's mobile device or non-mobile device whereby said user accesses the system.

Embodiments of the present invention may be operable to facilitate chat services, video calls, zoom meetings or other means of communication between users.

Embodiments of the present invention may be operable to facilitate communications between service providers. For example, a service provider may tag a property record and forward it to other service providers via the system. In this manner service providers that offer related services (e.g., real estate agents, lawyers, real estate brokers, property inspectors, etc.) may alert each other to prospective properties. Other types of information may also be shared between service providers.

Embodiments of the present invention may facilitate the generation of a display of property records for a user based upon a user's proposal, immediately after a user has generated such a proposal. For example, a buyer user's proposal indicating a search for a property to purchase will generate property records for properties for sale in the geographic area indicated in said user's proposal and that meet other criteria set out in said user's proposal. As another example, a seller user's proposal indicating a search based on a property to sell will generate records of users who are potential purchasers of such property based upon said seller users' proposals. Such an embodiment will utilize the matching module to process information and generate matches of records to criteria in users' proposals.

Embodiments of the present invention may further facilitate real estate processes for a property directly between two users (a seller user and a buyer user), and may not involve any service providers, or may involve only some service providers, in accordance with laws, regulations, polices, real estate board and other governing requirements for direct private property sales in the particular location of said property.

The present invention offers several benefits over the prior art, including that the prior art does not offer transparency of a real estate process to buyers or sellers. The result is that buyers and sellers do not always fully understand how a real estate process works, including activities required to close a real estate purchase and sale. The present invention provides to users a clear list of the services that an agent, or other service provider, will provide to a buyer or seller user. This has two benefits, there is transparency about the specific services that are to be provided to said buyers and sellers, and said buyers and sellers are able to ascertain from the list of services the activities and steps that are involved in a real estate process.

Another benefit of the present invention over the prior art is that the prior art does not offer transparency regarding fees to be incurred by a buyer or seller in a real estate process. The result is that buyers and sellers can find it difficult to determine the whole cost of a purchase or sale of real estate, or other real estate processes, prior to the completion of the real estate process. The present invention explicitly provides to users all of the fees (charged by agents, other service providers, and government organizations), and therefore there is transparency for a buyer user and a seller user regarding all fees to be incurred in a real estate process.

Another benefit of the present invention over the prior art, relates to education. Prior art systems generally do not offer a user education regarding a real estate process. The present invention, and specifically the flow of the steps of the marketplace as experienced by a user, will provide information about the steps in a real estate process, and education relating to such steps. Such education may further be provided in a section of the marketplace, such as a Home School section. The workflow generated by the marketplace will further educate buyer users and seller users about a regulatory compliant real estate process with clearly defined outcomes and approval process. The buyer and seller users therefore receive education about the activities and steps that constitute a real estate process, with the result that said buyer and sellers can make informed decisions during the real estate process.

Another benefit of the present invention over the prior art, is that the prior art is not driven by a buyer or a seller. In the present invention the flow of steps is "buyer/seller first" in its goals. Buyer users and seller users review and approve all services and fees involved in the real estate process in advance of the process commencing. Said buyers and sellers further have the opportunity to review and compare offers from multiple agents and other service providers, and each may choose the agent and/or service providers that best suit said buyer or seller. The present invention may further incorporate a workflow module, whereby a user can view the flow of steps and activities of a real estate process and the status of progression through such steps by agents and other service providers, as such agents and other service providers confirm completion of services relating to each step. Activities and steps of a real estate process are thereby managed and are apparent to, and driven by, buyer users and seller users.

Yet another benefit of the present invention over the prior art is that the prior art does not integrate with blockchain technology through the entirety of a real estate process. The present invention integrates with blockchain technology through the entirety of a real estate process to create a secure and reliable record of the real estate process including transactions thereof, and each of the activities and steps (transaction steps) of the real estate process, and data and information relating thereto.

The drawings provided herewith offer examples of some embodiments of the present invention, and other embodiments of the present invention are also possible.

Buyer and Seller Login & Registration

As shown in FIG. 1, a buyer user 10 and a seller user 12 may login to the marketplace services 14. Upon initially logging-in to the marketplace services a buyer user or seller user may register and set-up a profile. The buyer user or seller user may be required to provide profile information such as a name, address, or other information, and create a login and password when registering and creating a profile. The buyer user's or seller user's profile information may be stored by the marketplace platform as the user's profile. The registration process may further require the buyer user or seller user to accept marketplace terms and conditions that are rules and obligations of the buyer user and seller user when using the marketplace. Such terms and conditions may be provided to the user in a smart contract or other form of contract.

Seller

After registration and set-up of the profile is complete, a seller user may provide information to the marketplace about the real estate the seller wants to sell in a real estate process, or information relating to another real estate process the seller wishes to engage in, the foregoing constituting a seller request or seller proposal. For example, a seller user may indicate the property type (residential, commercial, new build), a value of the real estate in the form of a broad value range, and the location of the real estate as a seller proposal. The seller proposal created by the seller user relating to the real estate process may be made available to one or more real estate agents or other service providers through operation of the marketplace platform.

A single seller user can create multiple proposals, each relating to different real estate the seller is looking to sell and/or different services the seller user is seeking. New proposals can be generated by the seller user at any point in time which the seller user utilizes the system.

Real estate process event information, that is information about the steps and activities involved in the real estate process indicated by a proposal of the seller user, may be provided to the seller user. Through review of such real estate process event information, the seller user will understand the steps and activities required for a real estate process.

The seller user may receive one or more offers 16 from one or more real estate agents or other service providers to assist said seller in the real estate process in accordance with the seller's proposal. The offers will include offer information, including a list of all of the services the real estate agent or service provider who sent the offer will provide to the seller, and all costs to be charged for such services. For example, offers from real estate agents will set out commission fees to be charged by the agent. The seller user can review and compare the offers, and choose to accept one or more of the offers. A seller can only accept one offer from a real estate agent, and one offer from each other type of service provider engaged in the real estate process. Through acceptance of one or more offers, a seller will understand the services to be provided relating to a real estate process, and the expected costs relating thereto.

An offer will be sent in response to a user's proposal, whereas a proposal contains general information that is not directed to any specific proposal of any other user. Seller users may receive service provider proposals and may provide a response to such service provider proposals, such as, for example a request for additional details, a request to set-up a meeting, etc. Such response may be generated by the seller user through use of the system and directed to the service provider by the system. A service provider offer may be provided to a seller user based upon the response of the seller user to the service provider's proposal. Such offer provided in response to a proposal will be provided and addressed in the manner described herein for other offers directed to seller users.

Buyer

After registration and set-up of the buyer user profile is complete, a buyer user may provide information to the marketplace about real estate the buyer wants to purchase in a real estate process, or information relating to another real estate process the buyer wishes to engage in (a buyer request or proposal). The buyer proposal the buyer creates may relate to specific real estate, or provide general information about the type of real estate the buyer is considering buying (e.g., type of real estate—commercial, residential, new build; price range; general geographical area; the number of rooms; required amenities—fireplace, gas heating, pool, garage, etc.).

In some embodiments of the present invention, if the buyer user indicates a geographic area, a map may be generated by the marketplace platform through use of the map tool that indicates available properties in the geographic area that are consistent with the buyer proposal. The map area may be displayed to said buyer user (through the app or a website) and said buyer may select and view properties indicated on the map and information relating thereto, and thereby receive information relating to each property chosen (e.g., images, property details, information available through multiple listing service (MLS) or the equivalent available in the geographic are chosen, etc.). The buyer user may utilize the map to identify specific real estate in which the buyer has an interest.

The buyer request created by the buyer user, that relates to a real estate process and may include specific real estate that the buyer identifies as being of interest, may be made available to one or more real estate agents or other service providers through operation of the marketplace platform.

Information about the steps and activities involved in the real estate process indicated by the buyer user may be provided to said buyer user. Through review of such information, the buyer user will understand the steps and activities required for the real estate process.

The buyer user may receive one or more offers 16 from one or more real estate agents or other service providers to assist the buyer user in the real estate process. The offers will include a list of all of the services the real estate agent or service provider who sent the offer will provide to the buyer user, and all costs to be charged for such services. For example, offers from real estate agents will set out commission fees to be charged by the agent. The buyer user can review and compare the offers, and choose to accept one or more of the offers. A buyer can only accept one offer from a real estate agent, and one offer from each type of other service provider engaged in the real estate process. Through acceptance of one or more offers, a buyer will understand the services to be provided relating to a real estate process, and the expected costs relating thereto.

An offer will be sent in response to a user's proposal, whereas a proposal contains general information that is not directed to any specific proposal of any other user. Buyer users may receive service provider proposals and may provide a response to such service provider proposals, such as, for example a request for additional details, a request to set-up a meeting, etc. Such response may be generated by the buyer user through use of the system and directed to the service provider by the system. A service provider offer may be provided to a seller user based upon the response of the buyer user to the service provider's proposal. Such offer provided in response to a proposal will be provided and addressed in the manner described herein for other offers directed to buyer users.

Real Estate Agent & Service Providers

A real estate agent user 18 or any other service provider user(s) (e.g., lawyer/escrow manager 20, mortgage broker 22, home inspector 24, insurance provider 26 and/or title service provider 28) may login to the marketplace. Upon initially logging-in to the marketplace a real estate agent user or any other service provider user(s) may register and set-up a profile. The real estate agent user or any other service provider user(s) may be required to provide information such as a name, address, or other information, and create a login and password when registering and creating a profile. The real estate agent user's, or any other service provider user's, information may be stored by the marketplace platform as said user's profile. The registration process may further require the real estate agent user or any other service provider user(s) to accept marketplace terms and conditions that are rules and obligations applicable to the real estate agent user or any other service provider user(s) when using the marketplace. Such terms and conditions may be provided to the user in a smart contract or another type of contract.

After registration and set-up of the profile is complete, a real estate agent user or any other service provider user(s) may provide information about the services and fees the real estate agent user or any other service provider user(s) can provide to a buyer user or seller user as a proposal. Such proposal may further indicate one or more geographical areas where the real estate agent user or other service provider user(s) provide services as well as related charges and fees. The real estate agent user or any other service provider user(s) may receive information about real estate processes that buyers and sellers are looking to engage in, as buyer proposals or seller proposals.

The real estate agent user or any other service provider user(s) may each generate an offer relating to one or more such proposals. The services and fees of a real estate agent user or any other service provider user(s) included in an offer may be tailored in relation to the information provided in the buyer proposal or seller proposal to which the offer responds. The offer of the real estate agent user or any other service provider user(s) will be sent to the applicable buyer user or seller user.

Notice of an accepted offer will be provided to the real estate agent user 18 or service provider user(s) (e.g., lawyer/escrow manager 20, mortgage broker 22, home inspector 24, insurance provider 26 and/or title service provider 28) that sent such offer. Such notice will be sent as a notification by the system and said notice will confirm that the offer was accepted by a buyer user or a seller user. Such real estate agent and/or other service provider(s) may contact the buyer user or seller user who accepted the offer through the marketplace platform as required for the real estate process, for example, to set up a meeting or for other purposes relating to the real estate process for the accepted offer. Other service providers and features relating thereto may be incorporated in embodiments of the present invention, as required for a real estate process.

Access to buyer proposals and seller proposals may be facilitated through a searchable section of the marketplace that lists said proposals or a subset thereof. The list may be tailored in accordance with the user profile of the user who is accessing and viewing the list. For example, a real estate agent user who only provides services in a specific geographic area identified in the agent's user profile or said user's proposal, may access a list that is filtered to only list buyer proposals and seller proposals relating to the geographic area where the agent user provides services. Transfers of offers may be facilitated directly between users within the marketplace.

Upon acceptance of an offer a real estate agent user or other service provider user(s) will acknowledge and confirm the acceptance. An agreement is entered into by the real estate agent user or other service provider user(s) and the buyer user or seller user. The agreement may be generated by the marketplace platform. A method for execution of the agreement by the relevant parties, for example, such as an e-signature method, may be facilitated via the marketplace. The agreement may further be a smart contract, whereby the obligations of each of the service provider and buyer or seller user (collectively the parties, and each a party) will be tracked and blocks on a blockchain ledger will be generated in accordance with blockchain technology of the present invention.

Once said agreement is in force between the parties, the real estate agent user or other service provider user(s) will perform the services agreed to by the parties. The execution of the service and confirmation of such performance will cause the marketplace workflow, that is viewable by the users and that indicates the steps of the real estate process and provides confirmation of the steps thereof that are completed, to be updated. The real estate agent user or other service provider user(s) will also pay any fees or other charges for the real estate process for which the marketplace may prompt the users, as described herein.

Information and Notifications

Any information provided to a user by the system may be displayed on a screen of a mobile device or the user or a non-mobile device of the user that said user either uses to connect to the system or uses to access a social media account that the system has pushed information to in accordance with said user's profile or proposal. Alternatively, information may be conveyed in another manner to said user, such as, for example, by audio or other formats.

Notifications of such events or other notifications relating to the function of the marketplace and the activities of users thereof, may be generated by the marketplace and sent to buyers, sellers, service providers and other users of the marketplace. The specific notifications to be generated and sent may be requested by a user of the marketplace, for example, such as requests that may be set in a user's profile or a user's proposal, as some examples of how notifications may be requested. Such notifications may further be generated based upon the geolocation of a user. For example, geolocation notifications may include realtime updates (e.g., updates about the status of real estate (properties), etc.), alerts regarding information relating to a particular geolocation, or opportunities available in a specific geolocation.

As an example, a user of the marketplace may receive questions or alerts sent as notifications when said user interacts with certain service providers via the marketplace, or said user indicates an interest in certain services. Questions sent to the user may indicate additional information required to identify one or more services providers who may offer the services that a user is seeking, or interested in seeking. Alerts sent to a user may indicate other services that a user may require, or should look at acquiring, in relation to the specific activities of the user in the marketplace and any interaction between said user and any service provider. As one example, if a user interacts with a real estate agent as a purchaser of a property, a question may be sent to the user asking if the user already has a lawyer. If the user indicates in a response that the user does not have a lawyer, an alert may be sent that the user should seek the services of a lawyer to assist with aspects of the property sale. Other questions and alerts may be sent as notifications by the marketplace.

The marketplace may track questions, alerts, and other notifications, as well as the activities and information provided by users. This information may be processed to identify queries and responses to be incorporated in the query and response module, services that should be integrated in the marketplace to assist service providers and users, as well as other aspects of the marketplace that should be developed or enhanced to assist service providers and users of the marketplace.

Workflow

Once a buyer user or seller user accepts one or more offers the marketplace platform will generate a workflow relating to the steps for the real estate process indicated by the buyer user or seller user in said user's proposal. The workflow will be generated to include information relating to all accepted offers for the buyer proposal or seller proposal, and will be updated if further offers are accepted during the real estate process. In some embodiments of the present invention, the workflows may provide detailed steps relating to agent offer and selection processes, pre-closing steps for a real estate process (e.g., obtaining copy of real estate title certificate, listing real estate, showing real estate, steps for reviewing, countering and accepting offers for purchase of real estate, etc.), and/or real estate process closing day steps and activities (e.g., transfer of real estate title, accounting of purchase funds, transfer of purchase funds, transfer of keys, etc.).

As an example, a workflow created upon the acceptance of an offer may include steps and activities relating to the real estate process from the offers through to the close of the real estate process. The workflow may further indicate all regulatory requirements for the real estate process to be regulatory compliant in the country and/or region where the real estate is located.

As another example, a pre-closing day work flow may be generated to track all of the steps and activities required for a real estate process. The users of the system may be required to indicate to the system when an activity or step (an event) is completed, or provide a status for an event. The status or completion is captured by the workflow and the workflow is updated to reflect the current status of all events in the workflow. Such a workflow can be used to track the progress of a real estate process, and to keep a real estate agent user and other services provider user(s) on schedule, in accordance with the due dates for events reflected in the workflow. Such a workflow further is generated and updated to incorporate sufficient information for all users involved in a real estate process to be aware of the events, tasks, schedule and dependencies required for the workflow (and the real estate process) to be completed when said users review the workplace. Due to the transparency of the real estate process requirements and progress thereof offered by such a workflow, all requirements and events for the closing day are reported to all users in advance of completion of the real estate process and in advance of such requires and event occurring. This assists the users to ensure that the completion day of the real estate process (the closing) occurs without incident, such that the closing date is essentially a "non-event".

Commission Factoring Module

Figure 10:
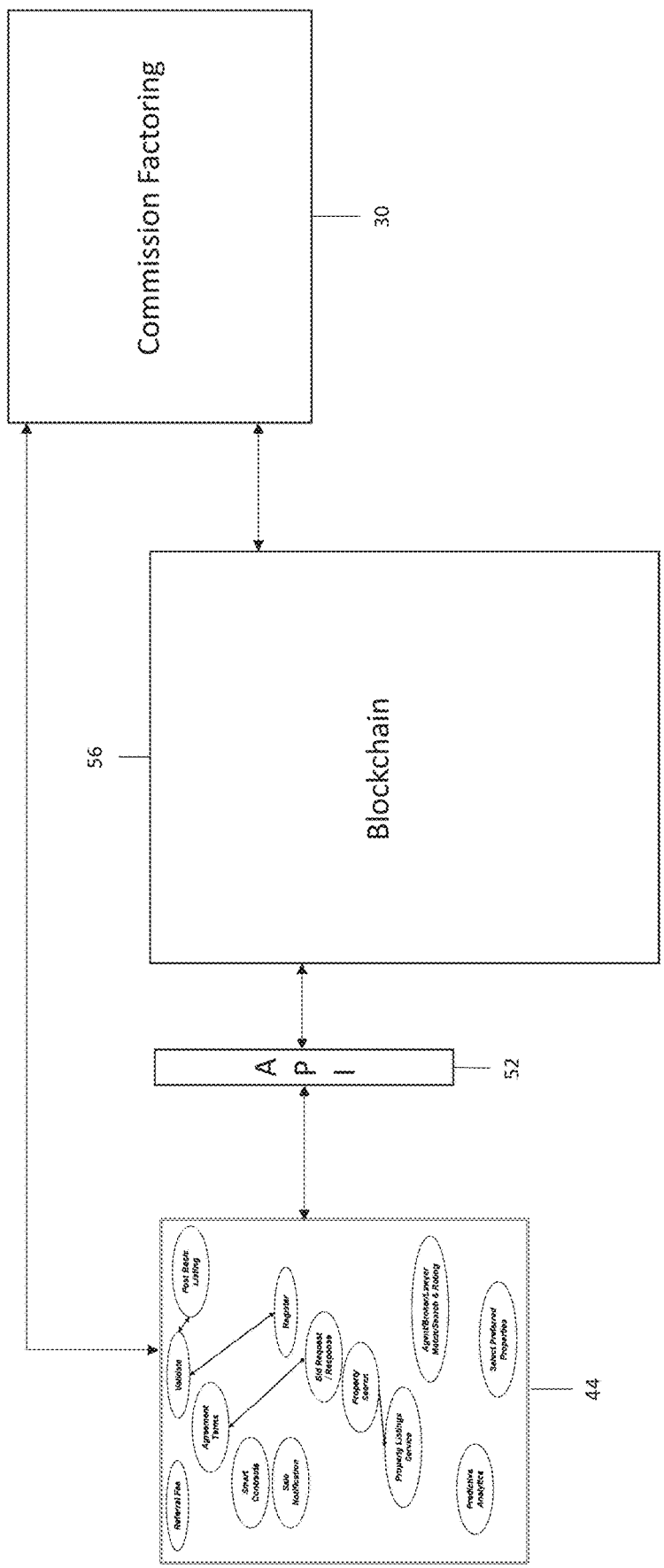
FIG. 10 is a systems diagram showing the integration of the application with blockchain and a commission factoring module, in accordance with an embodiment of the present invention.

In some embodiments of the present invention, a service provider engaged to assist a buyer user or seller user in a real estate process may utilize a commission factoring module 30 of the marketplace. The commission factoring module may be utilized to undertake a process to determine if access to cash will be provided to said service provider prior to the close of the real estate process. Said module utilizes a factor to determine if the commission payable to a service provider for a real estate process will be purchased before the close of the real estate process (transaction). For example, said service provider may receive 90% of the commission in advance of closing and payment of the commission upon said close will be directed to the marketplace. In some embodiments of the present invention the factoring module may involve the participation of a third party financial institution or other organization that will purchase the real estate process, provide the advance commission payout, and receive the commission upon close. If integrated with blockchain, as shown in FIG. 10, the activities of commission factoring may be recorded in a blockchain ledger and any agreement for commission factoring may be a smart contract. As further shown in FIG. 10, the activities of the commission factoring may involve communication with the app 44, or with the marketplace directly.

Charges

In embodiments of the present invention, the marketplace platform may be configured to charge a fee relating to any step in the real estate process (e.g., a referral fee charged to a real estate agent user, or other fees). Any such fees will be set-out in a transparent manner to the party that incurs the fee, such as, for example, through a notification or inclusion in a workflow. The system may prompt the user to provide payment of such fee directly via the system. For this purpose the system may be connected to a third party payment service, or incorporate payment module within the system, whereby a user can provide payment via bank transfer, credit card, Paypal™, cryptocurrency, or another electronic payment method.

Marketplace Services

In embodiments of the present invention, as shown in FIG. 1, the marketplace services module 14, may provide a variety of services and information to buyer, seller, real estate agent, and service provider user(s). For example, one or more of the following services may be provided by the marketplace services: real estate process education and training services, real estate process estimation tools, real estate market analytics, real estate agent user and/or service provider user(s) ratings, and real estate process workflows. The present invention may incorporate other modules, as discussed herein, and embodiments of the present invention may incorporate different combinations of modules.

App & System

All functions and modules of the system that are accessible and operable by the app also function and are operable in the non-app version of the system.

Figure 2:
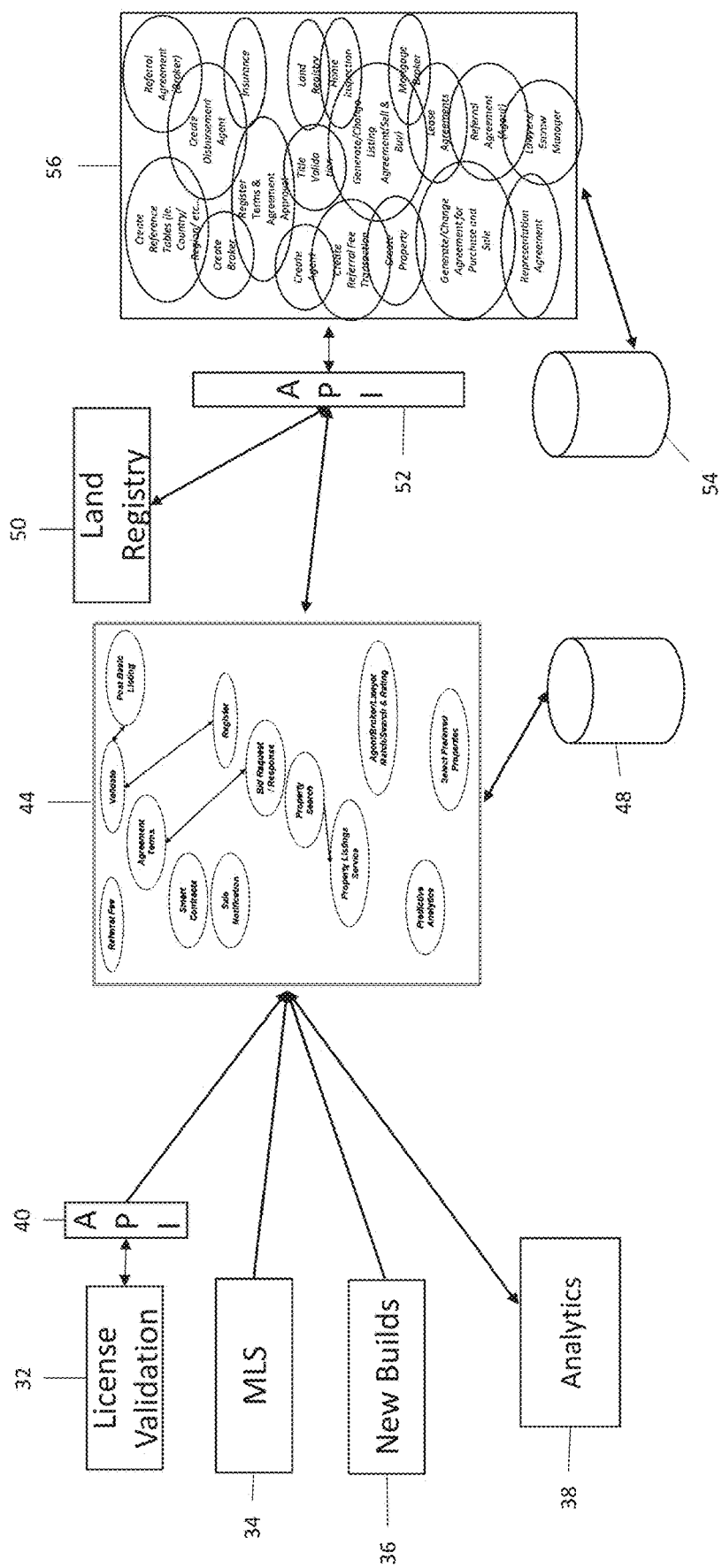
FIG. 2 is a systems drawing showing elements of the system of the present invention in accordance with an embodiment of the present invention.

As shown in FIG. 2, an embodiment of the present invention system may incorporate an app operable by users via said user's mobile device. The app 44 can be operated by a buyer, seller, real estate agent, and/or service provider user(s). The app will have particular functions, tools and modules to assist with the steps in the real estate process to be undertaken by each type of user, as discussed herein. Information generated by the app may be stored in one or more servers 48, and thereby be accessible to, and available for, the operation of the app. Examples of some types of operations of the app in some embodiments of the present invention include: referral fee agreements and disbursements; generation and enforcement of smart contracts; regulatory and legal requirements for real estate sale notifications; analytics (statistics and/or predictive analytics); selection of preferred real estate from multiple real estate properties; search, match and rating resources for real estate agents, brokers and lawyers, and for other service providers; real estate listing; post-listing activities for real estate; validation of a real estate listing; registration of a real estate listing; setting agreement terms; generating buyer proposals and seller proposals (including bid requests), and responses thereto (offers); generating services provider proposals and responses thereto by buyer users or seller users and real estate searches. Embodiments of the present invention may incorporate an app that is operable to facilitate other functions as well as the foregoing.

The app may be connected to one or more internal or external data sources that operate as modules of the marketplace, whereby information is obtained and/or processed, for use by the app. FIG. 2 shows examples of such modules, and other embodiments of the present invention may incorporate other modules or different combinations of modules. The modules may exist with the platform, or be connected to the platform. Connections between the platform and the app or other external information resources may be via any wired or wireless connection (e.g., via the Internet, an intranet, or some other connection whereby information may be transferred therebetween).

In some embodiments of the present invention information may be transmitted bi-directionally between the app and any one or more modules on a regular or semi-regular basis (e.g., monthly, weekly or daily at a set-time, such as nightly, or upon a particular event, etc.), upon a specific trigger for a transfer of information (e.g., a request for information from a user), or in real-time or virtually real-time.

The app may be connected to (and operable to access or otherwise transmit information within) a license validation module 32, via a license validation module application programming interface (API) 40. The app may send information relating to a real estate agent user to the license validation module, to determine if the real estate agent user holds a valid real estate license. The license validation module may be operated and maintained by a third party, and depending on the geographic use of the app, multiple license validation modules may be accessible by the app. The license validation module may further be operable to confirm whether other types of service providers accessible or referred via the marketplace hold valid licenses relating to the services they provide via the marketplace.

The app may further be connected to (and operable to access or otherwise transmit information within) a MLS module 34, or a module providing an equivalent service thereto in a particular area, to obtain information (including details and materials) relating to particular real estate. For example, the app may transfer a request for information pertaining to particular real estate, as identified by a seller user or any other user, to the MLS module. The MLS module may process the request and obtain the requested information and transfer the information pertaining to the particular real estate to the app. The app may further request information pertaining to multiple real estate (properties), such as properties in a geographic location. This request may be in accordance with specific real estate information provided in a proposal of a buyer user, or information provided by any other user. The MLS module may process the request and obtain the requested real estate information and transfer the information pertaining to the multiple properties to the app. The app will utilize the real estate information received from the MLS module to provide information regarding such properties to a user, such as in a map format, or in any other format. In some embodiments said app may operate such that it accesses information in the MLS module and the user views the information directly in the MLS module, and information is not necessarily transferred from the MLS module to the app.

The app may further be connected to (and operable to access or otherwise transmit information within) a new builds module 36, to obtain information relating to new build real estate. For example, the app may transfer a request for information pertaining to particular new build real estate, as identified by a seller user (in a seller request) or any other user, to the new builds module. The new builds module may process the request and obtain the requested information from external information resources and/or internal information collected and stored by the system. For example, a service provider or other user may have created a proposal relating to the new build that is stored by the system, or alternatively an external third party information source (such as MLS, etc.) may be accessed by the system to obtain information relating to the new build. The new build information collected by the system is transferred to the app. The app may further request information pertaining to multiple new builds real estate, such as new builds real estate in a geographic location. The app will utilize the new builds real estate information received from the new builds module to provide information regarding new build real estate to a user, such as in a map format, or in any other format. In some embodiments the app may operate such that it accesses information in the new builds module and the user views the information directly in the new builds module, and information is not necessarily transferred from the new builds module to the app.

The app may be connected to (and operable to access or otherwise transmit information within) an Analytics module 38, operable to generate statistical data relating to real estate or to one or more real estate processes. The app may provide information to the Analytics module to be processed by said module to generate statistical data, or the app may send a request to the Analytics module to provide specific statistical data previously stored in the Analytics module to the app. The statistical data may be provided to a user by the app in a report format of any type (e.g., visual, graphical, text, or in any other format), and such report may be generated by the app or by the Analytics module. The app may further transfer information generated by the app to the Analytics module on a regular basis, and the Analytics module may store and process such information to generate statistical data that it stores for future analytics requests.

The app may be connected to a blockchain technology 56 (by integration or incorporation) that may be any type of blockchain technology, via a blockchain API 50 whereby the blockchain technology operates with the app. The blockchain technology is operable to generate secured blocks relating to events of a real estate process. The blockchain technology may be connected to a block server 54 wherein the real estate process transaction blocks transferred from the blockchain technology are stored, and such block are also accessible by the blockchain technology. The app is operable to transmit information to the blockchain technology via the blockchain API, and to access one or more blocks and the information therein, of the blockchain technology. A block may be generated upon an event, such as a step or activity, in a real estate process, and information relating thereto may be stored in the block. For example, a block may be generated upon the transfer of the purchase price from a seller to a buyer for a real estate process. Information relating to such transfer will be stored in the block. The blockchain technology thereby integrates with the app to provide a secure method of capturing and storing information relating to events in a real estate process transaction.

Through integration (or incorporation) with the Blockchain, the marketplace may be operable to facilitate a variety of functions in embodiments of the present invention, including: creating real estate reference tables (i.e., for country, region, etc.); creating broker; creating agent; creating referral fee transaction; creating real estate; generating and modifying change agreement for purchase and sale of real estate; generating, modifying and enforcing representation agreements between users; registering terms of agreements and approvals of agreements; validating real estate title; generating, modifying and enforcing listing agreements for sales and purchases of real estate; generating and enforcing lease agreements for real estate; generating and enforcing referral agreements for real estate agents or services providers; generating and enforcing agreements for lawyers or escrow managers; creating disbursement agent; generating and enforcing referral agreements for brokers; assisting with and enforcing insurance services; assisting with and enforcing land registry services and legal requirements; assisting with and enforcing home inspection services; assisting with and enforcing mortgage broker services.

In embodiments of the present invention, the blockchain API is connected to the land registry module 50, and is operable to access information in the land registry module. The land registry module may be operated by a third party, such as a land titles office (that may be a government organization). The app may request information relating to real estate from the land registry module via the blockchain API, or the app may transfer information relating to the purchase and consequent change of title of real estate to the land registry module. Such transfer of information relating to real estate as maintained by the land registry module may trigger events that cause blocks to be generated by the blockchain technology, such as the transfer of title for real estate. Through the connection between the blockchain technology and the app, via the blockchain API, information relating to multiple events of real estate processes may be transferred, and blocks may be generated as applicable to the function of the blockchain technology. Furthermore, this connection may be operable to maintain smart contracts between users of the app.

The integration, or other incorporation, of blockchain technology with the app allows embodiments of the present invention to comprise various functionalities. For example, the integration or incorporation with blockchain technology can facilitate the application and enforcement of smart contracts between users, such as between a buyer user and a real estate agent user, a seller user and a real estate agent user, a buyer user and service provider user(s), a seller user and service provider user(s), and/or a real estate agent user and service provider user(s). A smart contract can be developed to incorporate written clauses as well as event triggered clauses. An event trigger clause may function such that when one or more events identified in a smart contract occurs a response will be triggered and operated by the marketplace. For example, an identified event could be acceptance of the statement of adjustments by the users that are parties to the statement of adjustments, and the event triggered by such event could be a transfer of funds in accordance with the statement of adjustments. A block can be generated to reflect such event. In this manner permission-based functions of blockchain technologies can be applied to enforce smart contracts.

Smart contracts enforced by blockchain technologies can control events, such as payment of funds between parties to a real estate process. For example, payment of purchase funds to a seller user, payment of commissions to a real estate agent user, and payment of fees to services provider user(s), can all be terms of a smart contract. The enforcement of such terms by blockchain will ensure that the payments occur upon an event, such as acceptance of a statement of accounts, or another event. In accordance with the smart contract terms, blockchain will cause the payments to be distributed from and to the appropriate users, and will further record the payments in blocks of the blockchain ledger. Thus, the blockchain technology integrated, or incorporated, with the present invention, can control events in a real estate process in accordance with terms of a smart contract, and keep a secure and accurate record of such events.

The application of smart contracts between the users of the marketplace facilitates further benefits of the present invention. For example, smart contracts can be developed to be regulatory compliant. Thus the enforcement of smart contracts through blockchain technology ensures that the events of a real estate process engaged in by users of the marketplace is undertaken in a regulatory compliant manner.

Real estate agent users and service provider users may reap a benefit from the integration or incorporation of blockchain technology in the marketplace. The service provider users may include real estate brokers, insurance brokers, insurance providers, mortgage brokers, or any other type of service provider discussed herein, or that otherwise may be involved in a real estate process in the future. Smart contracts provide a method whereby real estate agent users and services provider users can be certain that the terms relating to services to be provided the price to be paid for such service (whether a fee, commission, or other payment) is certain. The blockchain enforces contract terms, such as terms to transfer funds for a payment, in a straightforward manner, and does not permit for any subjective considerations to sway any payment decision. A smart contract will be enforced by blockchain technologies in accordance with the letter of the terms, such that the agreed-upon price and fees will not be altered or modified, and the payment will occur upon the trigger for the payment indicated in the terms (e.g., and event such as the completion of services, acceptance of a statement of accounts, or other event). Thus, the amount and timing of payments are certain. Moreover, the occurrence of the payment is confirmed, because there is a blockchain record generated for the payment. Smart contracts enforced by blockchain technologies offer a secure, auditable, and immutable record of smart contract agreement terms.

As another example, blockchain technology facilitates secure, immutable, auditable evidence of the occurrence of an event in a real estate process. Blocks can be generated to include transaction information that incorporates approvals for events in a real estate process. A block may further indicate changes occurring in relation to a real estate process, for example, such as change of title, or other changes. The ledger-based record of events in a real estate process facilitates an ease of audit for a real estate process, such that a confirmation of events having occurred in a real estate process is available. The ledger record is further secure, which ensures that the record of events of a real estate process is reliable and accurate.

Website

Embodiments of the present invention may incorporate a website providing functions of the marketplace to users. The website is connected to the platform that is further connected to elements, tools and modules of the system, in a manner similar to the connection of the app to elements, tools and modules, as shown in FIG. 2. The platform function to provide the software code that causes the functions of the platform and all of its elements and modules. The platform is connected to hardware including servers wherein software and information are stored and accessible, and microprocessors operable to access and process information as well as to generate agreements, proposals, maps and other outputs of the system, and an Internet or intranet connection means. The connections of the app and the website to the platform facilitate the access thereof to information stored in the servers attached to the platform, and functions of the platform and system.

Services

Figure 3:
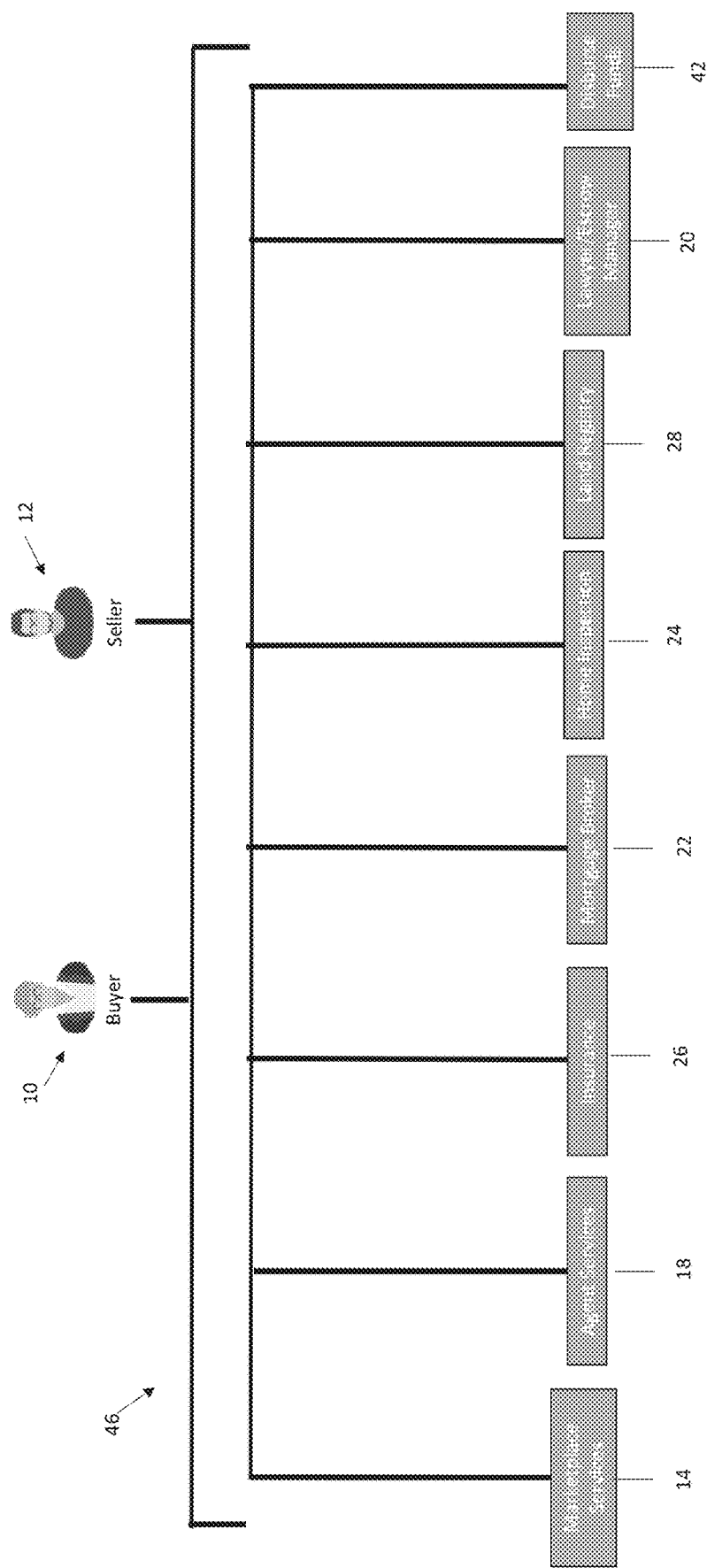
FIG. 3 is a flow chart showing the processes available to buyer and seller users of embodiments of the present invention.

As shown in FIG. 3, multiple services are accessible from a services offering module 46 by a buyer user and seller user of the marketplace. The specific service that are accessible in embodiments of the present invention may vary, for example, such as in accordance with the focus of the embodiment upon a specific real estate process that only requires particular services, or upon a specific real estate type, or for any other reason relating to a specific embodiment of the present invention. The services may include any of the following:

Marketplace services 14, as described herein.

Agent services 18, can be provided by a service provider that is a real estate agent and may include services relating to buying and selling real estate, commissions applied to such buying and selling of real estate, facilitating cash payments required for buying and selling of real estate, and submitting offers, or assisting buyer or seller users with submitting offers, for service provider(s) services. Agent services may further include any of the foregoing relating to any other type of real estate process.

Insurance services 26, can be provided by a service provider that is an insurance organization, and may include services to provide a buyer or seller user with home insurance, title insurance or mortgage insurance. Insurance services may further include assistance to a buyer or seller user in obtaining approval for any insurance condition required for a real estate process.

Mortgage broker services 22, can be provided by a service provider that is a mortgage broker and may include services relating to mortgage pre-approval or mortgage funding. Mortgage broker services may further include assistance to a buyer to obtain approval for a condition relating to funding of a real estate process.

Home inspection services 24, can be provided by a service provider that is a home inspector and may include services for home inspection, as well as reporting services and recommendation services relating to the results of a home inspection.

Land registry services 28, can be provided by a service provider that is a land registry organization, such as a land titles office or other organization that is either a governmental or non-governmental organization relating to land registration. The services may include title searches and title transfers, as well as assistance to a seller to obtain approval for a title transfer condition.

Lawyer/Escrow manager services 20, can be provided by a service provider that is a lawyer or an escrow manager and may include preparing a statement of adjustment relating to a real estate process. The services may further include assisting a seller or purchaser with obtaining approval for funding of disbursements, and/or obtaining legal approvals required for a purchase and sale of real estate.

Disbursement of funds services 42, can be provided by a service provider that is a financial institution, or some other provider or receiver of funds, whereby the purchase price and all disbursements relating thereto are fully paid upon closing of a real estate process.

Figure 4:
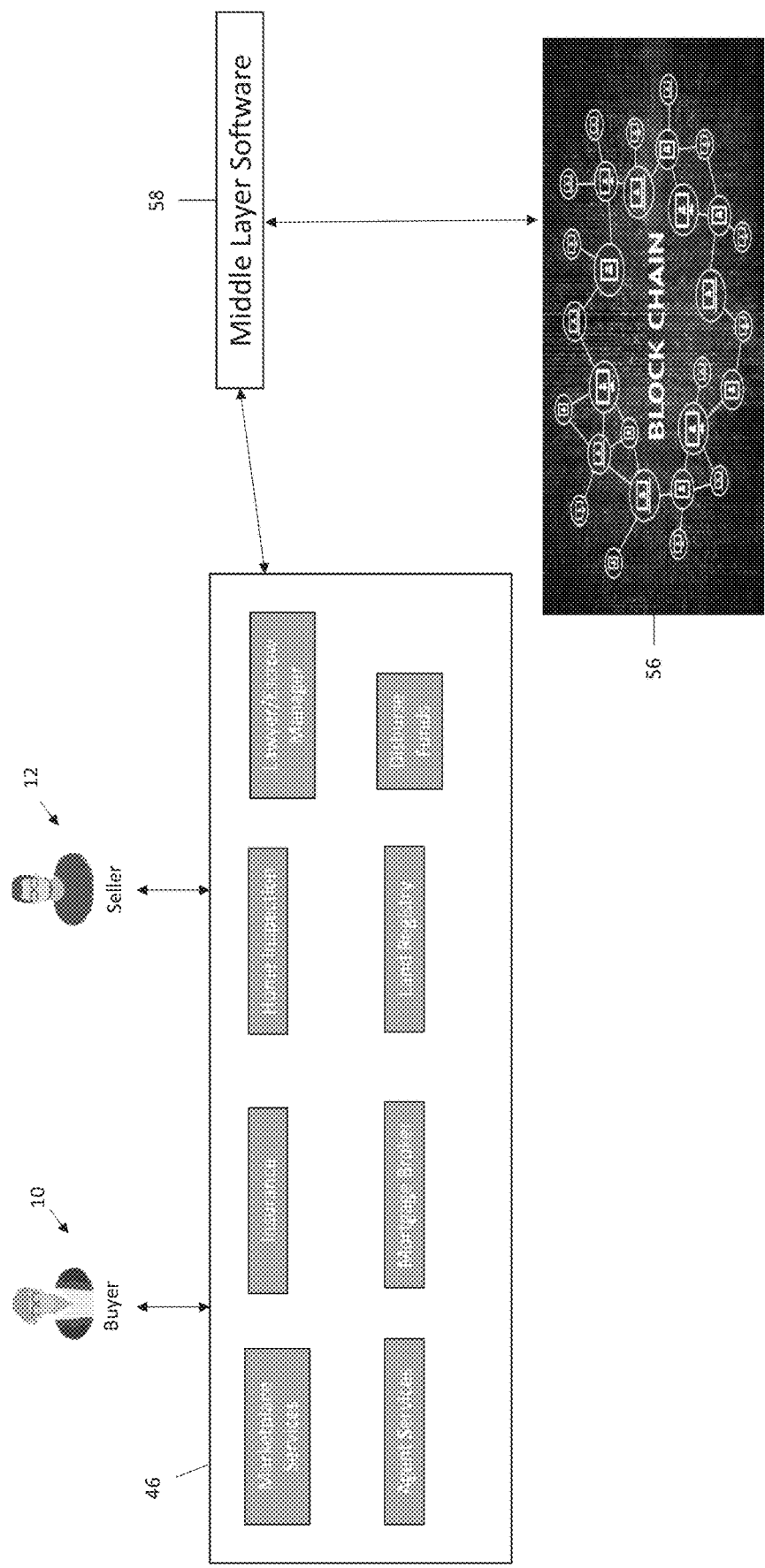
FIG. 4 is a systems drawing showing the integration of the present invention as utilized by buyer and seller users with blockchain.

Any or all services may be provided to a user by the marketplace, either through integration of the marketplace with systems of each service provider, or through incorporation of the services into the services provided directly by the marketplace. The services are thereby provided by the services offering module 46. The services offering module may be connected to the blockchain technology 56, as shown in FIG. 4. Through such connection the module can incorporate and integrate with operability of the blockchain technology, including smart contract functions and secure ledger facilities. Software code 58 may exist between the blockchain technology and the services offering module to integrate and incorporate the module with the blockchain technology, and to otherwise generate functions for a user relating to the integration and/or incorporation of the module with the blockchain technology.

Figure 5:
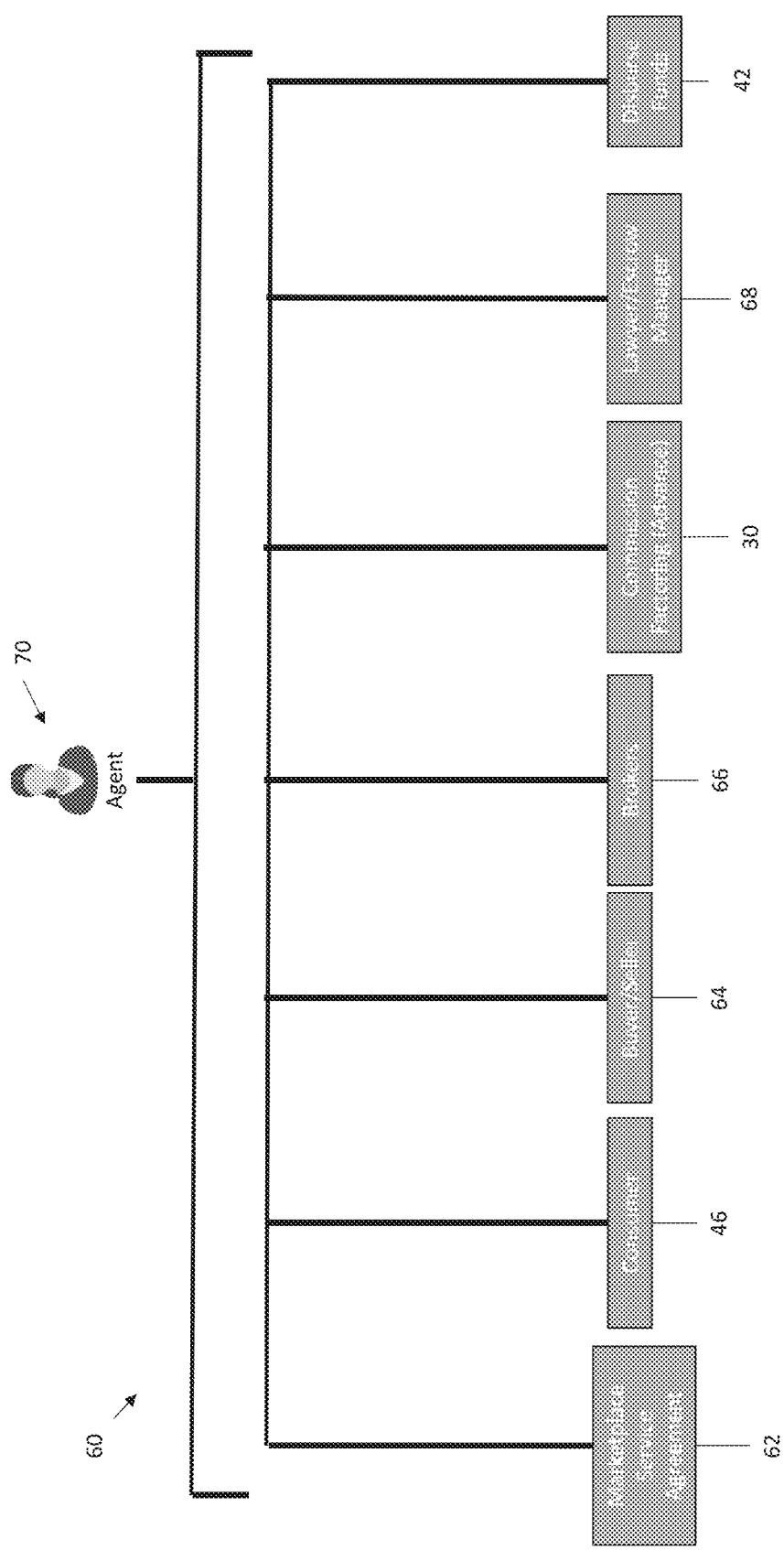
FIG. 5 is a flow chart showing the processes available to marketplace service providers, of embodiments of the present invention.

As shown in FIG. 5, multiple services are accessible by a real estate agent user 70 of the marketplace from an agent services offering module 60. The specific services that are accessible in embodiments of the present invention may vary, for example, such as in accordance with the focus of an embodiment of the present invention upon a specific type of real estate process that only requires particular services, or for any other reason relating to a specific embodiment of the present invention. The services may include any of the following:

A marketplace services agreement 62, may be generated by the system as the agreement between the real estate agent user, and a buyer user or seller user. The agreement sets out the conditions and obligations agreed to by said agent and said buyer or seller (the parties) for the real estate process. The agreement may be a smart contract, and when obligations are met under said agreement, this may trigger specific events and blockchain blocks to be generated relating to such events. For example, upon the execution of all agreements on the closing date, including a statement of adjustment agreement, a payment of the purchase funds for real estate from the buyer to the seller may be automatically triggered to occur in accordance with the smart contract, and a block relating to the transfer of said funds will be generated by the system. Other marketplace services, as described as being accessible to buyer and seller users, such as education, estimation tools and analytics, may also be accessible by the real estate agent user.

Services provided to buyer users and seller users in accordance with the services offering module 46 may be utilized by a real estate agent user to assist in the provision of services to said buyer and/or seller. These services can include functions whereby real estate and details relating thereto can be viewed (e.g., on a map or in other formats), and proposals for real estate process service or offers for real estate processes needed by buyer users or seller users can be generated by a real estate agent and submitted to the system or to said buyer users or seller users, respectively.

Buyer and/or seller agreement services 64, whereby an agreement for the cost and terms of an offer that has been accepted is generated and executed by the service provider user and seller user or buyer user engaged in the offer (the parties), is available to a real estate agent user.

Broker services 66, can be provided by a service provider that is a broker and may include services relating to mortgage pre-approval or mortgage funding. Mortgage service may further include assistance to a buyer user to obtain approval for a condition relating to funding of a real estate process. A real estate agent user may obtain such broker services on behalf of a buyer user or seller user, and an agreement setting out the terms and costs will be executed by all parties involved in the real estate process that are affected by such terms and costs.

Commission factoring services 30 may be available to a real estate agent user, as described herein.

Lawyer/Escrow manager services 20, can be provided by a service provider that is a lawyer or an escrow manager and may include preparing a statement of adjustment relating to a real estate process. Said services may further include assisting a seller user or a buyer user with obtaining approval for funding of disbursements, and/or obtaining legal approvals required for a purchase and sale of real estate. A real estate agent user may monitor said lawyer or escrow manager services on behalf of a buyer user or seller user.

Disbursement of funds services 42, can be provided by a service provider that is a financial institution, or some other provider or receiver of funds, whereby the purchase price and all disbursements relating thereto are fully paid upon closing of a real estate process or another activity occurring via the marketplace. Real estate agent user commissions, as well as disbursements to other service provider user(s), such as broker fees, will be disbursed directly to such recipient of such fees by the system, or through a third party payment system connected to the marketplace.

Each service provider of the marketplace will have knowledge of the status of the service that they are providing, for example, such as that the service is in progress, completed or not yet started. Said service provider will be able to provide such status information to the system for use by the system to update the workflow. Service providers may have access to information that other users of the system are not privy to, due to the service providers' role in the provision of services via the marketplace.

FIG. 5 is merely illustrative of one embodiment of the present invention. Other embodiments of the present invention may incorporate additional service providers and/or may incorporate different combinations of service providers.

Figure 6:
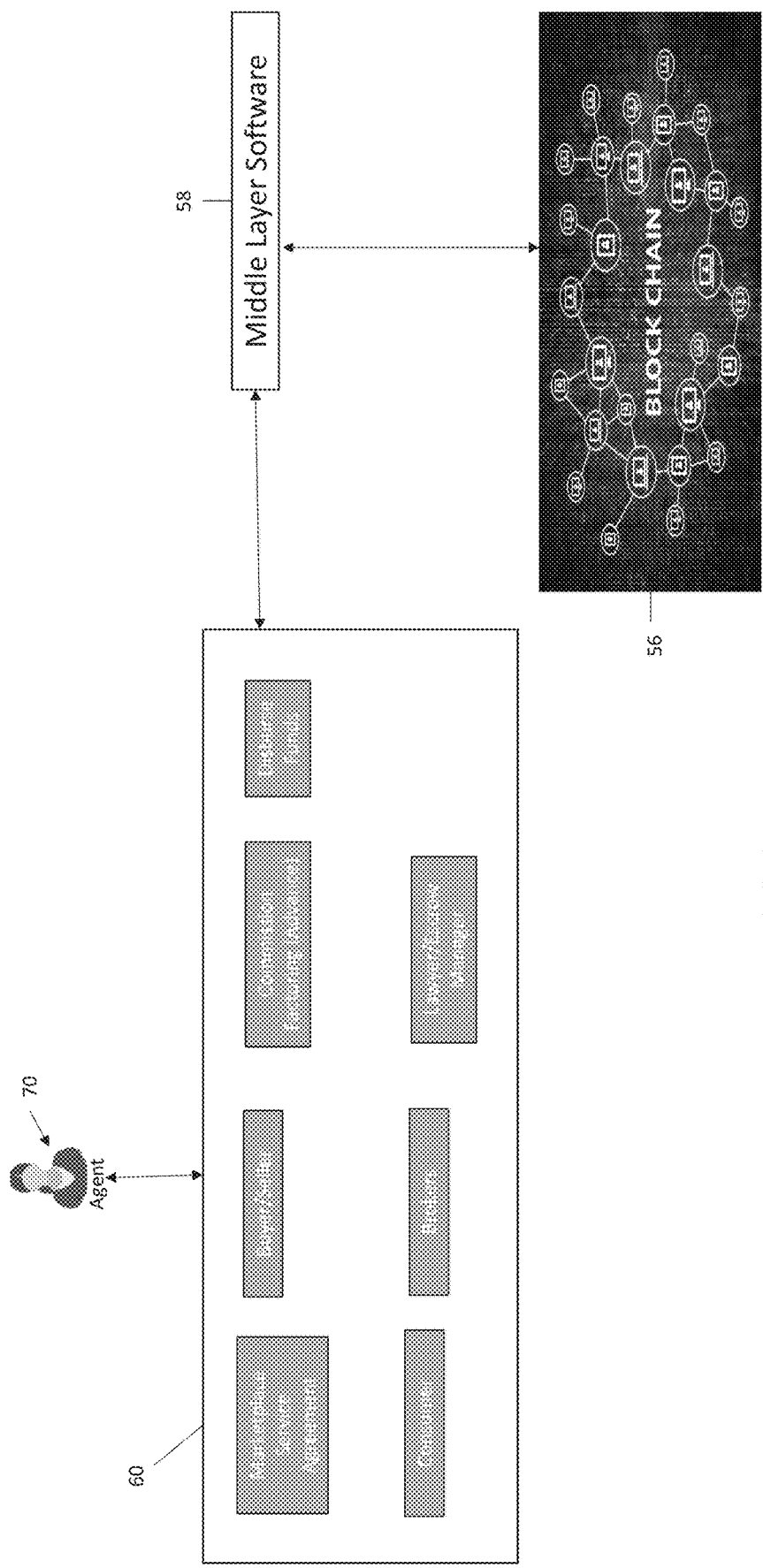
FIG. 6 is a systems drawing showing the integration of the present invention as utilized by agent users with blockchain.

All services may be provided to a user by the marketplace platform, either through integration of the platform with systems of each service provider, or through incorporation of the services into the services provided directly by the marketplace via modules, tools or elements of the system. Said services are thereby provided by the agent services offering module 60. The agent services offering module may be connected to the blockchain technology 56, as shown in FIG. 6. Through such connection the module can incorporate, and integrate with, operability of the blockchain technology, smart contract functions and secure ledger facilities. Software code 58 may exist between the blockchain technology and the services offering module to integrate and incorporate said module with the blockchain technology, and to otherwise generate functions for a user relating to the integration and incorporation of the module with the blockchain technology.

Each service provider user may offer its services in an electronic mode to a user via the system. The system supports interaction between the said service provider and a buyer user or a seller user, and further supports the provision of services from said service provider thereto, through education tools and modules, agreement generation and execution tool and modules, as well as via other methods and operations of the system. The system may further integrate with face-to-face interaction of said users by tracking the steps of a real estate process engaged in by said users, and permitting said users to update the workflow for said real estate process to reflect completion of steps performed due to electronic services or services delivered face-to-face.

Revenue Flow

Figure 7:
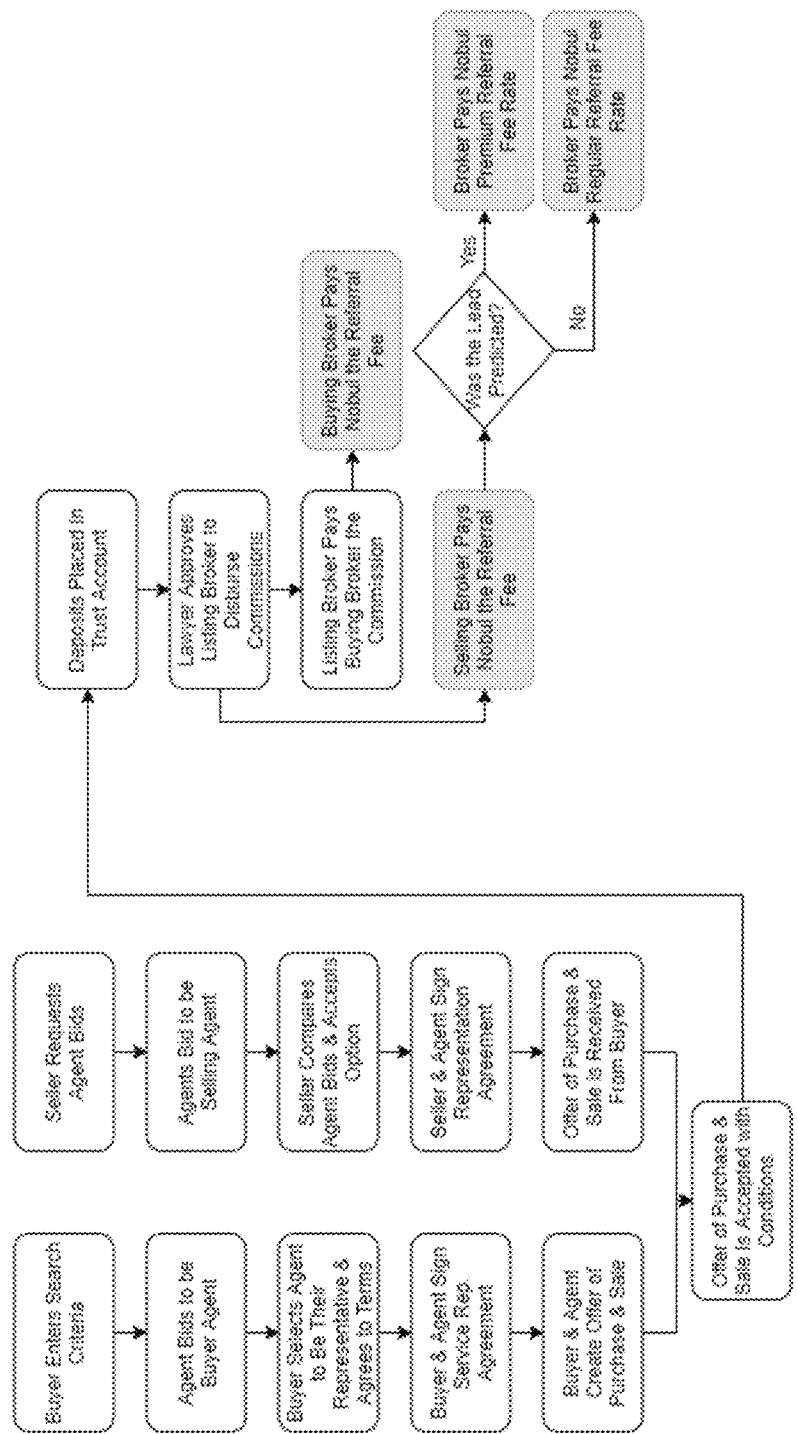
FIG. 7 is a flowchart showing the steps of a revenue for of an embodiment of the present invention.

Revenue may be generated by embodiments of the present invention at one or more points of time in the workflow relating to a real estate process. Unique sets of steps may occur between a real estate agent user and a seller user, and a real estate agent user and a buyer user, prior to a general set of steps occurring for each use of the marketplace for a real estate process. Revenue may be generated for the marketplace upon one or more steps occurring. An example of such steps in an embodiment of the present invention is shown in FIG. 7.

In such an example of an embodiment of the present invention, a buyer user may engage in the following steps:

The buyer user enters information relating to real estate the buyer user wishes to purchase (a buyer proposal), and one or more real estate agents and/or other service providers will receive the buyer proposal.

The agent and or other service providers will submit an offer in response to the buyer proposal, and will thereby bid to be the provider of real estate process services to the buyer user.

The buyer user will review and compare offers received by said buyer user and will select a real estate agent user to represent the buyer user in the real estate process. The buyer user and real estate agent user and/or the buyer user and other service providers will agree to terms and obligations that will govern said real estate process and the relationship o said users in relation thereto.

An agreement will be generated to reflect the terms and obligations agreed to by the buyer user and real estate agent user and/or the buyer user and other service providers. This agreement may be a smart contract. The buyer user and real estate agent user and/or the buyer user and other service providers will sign the agreement.

The buyer user and real estate agent user will utilize the system to generate an offer of purchase and sale agreement for said real estate.

As an example of an embodiment of the present invention, a seller user may engage in the following steps (either at a different point in time than the buyer user engages in the steps listed for the buyer user, or simultaneously with the buyer engaging in said steps):

The seller user enters information relating to real estate the seller wishes to sell (a seller proposal), and one or more real estate agents and/or other service providers will receive the seller proposal.

The real estate agent user and/or other service providers will submit an offer in response to the seller proposal, and will thereby bid to be the provider of real estate process services to the seller user.

The seller user will review and compare offers received by the seller user and will select a real estate agent user to represent the seller user in the real estate process. The seller user and real estate agent user will agree to terms and obligations that will govern said real estate process and the relationship of said users in relation thereto.

An agreement will be generated by the system to reflect the terms and obligations agreed to by the seller user and real estate agent user and/or the seller user and other service providers. This agreement may be a smart contract. The seller user and real estate agent user and/or the seller user and other service providers will sign the agreement.

The seller's proposal or information relating to the real estate identified therein is presented to buyer users via the system and activities of service provider user.

The seller user and real estate agent user will receive an offer of purchase and sale agreement for said real estate from a buyer.

After the buyer user and/or seller user steps set out above are completed the following steps will occur:

The offer of purchase and sale agreement for real estate will be accepted by a buyer user and seller user with conditions incorporated in such offer of purchase and sale agreement.

Deposit fees for the sale price and disbursements for said real estate process will be placed in trust.

A lawyer that may be a service provider user will be engaged to approve a listing broker that may be a service provider user who will disburse commissions relating to the real estate process.

The listing broker will pay a buying broker the commission relating to the real estate process. As a subsequent step, said buying broker will pay a referral fee to the marketplace.

The listing broker will pay a referral fee to the marketplace for the real estate process.

If the real estate process is determined by the system to be a lead (a property for sale in the future) that was predicted by the marketplace prior to the real estate process, the marketplace will determine whether said lead was accurately predicted, and if said determination is affirmative the listing broker will provide a premium referral fee rate to the marketplace, whereas if the determination is negative the listing broker will provide a regular referral fee rate to the marketplace.

A seller user or buyer user may further respond to a service provider's proposal, as discussed herein.

Each of the steps shown as shaded in FIG. 7 indicate steps that trigger revenue generation by the marketplace.

Figure 8:
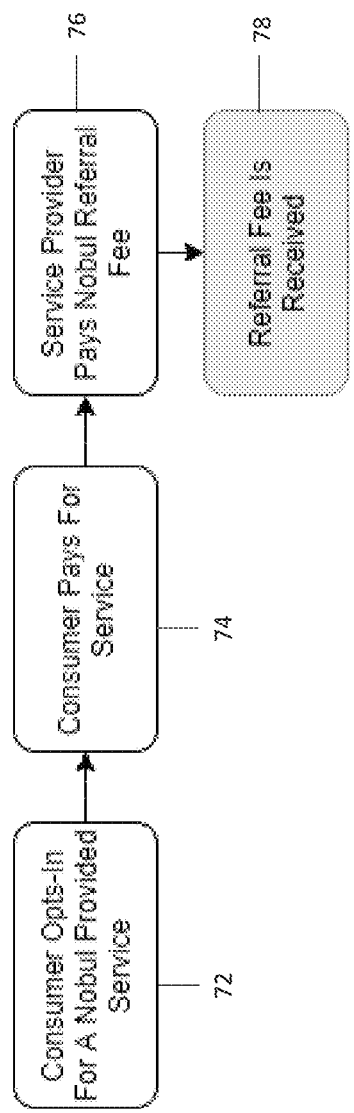
FIG. 8 is a flowchart of basic steps undertaken by a consumer and a service provider for an embodiments of the present invention.

In a very general sense the embodiments of the present invention simplify and provide transparency to the real estate process for the buyer user and seller user, who are each the consumer of services required for a real estate process. This simplification is shown in FIG. 8 wherein the key steps experienced by a consumer through use of the marketplace are indicated. Generally, a consumer provides information about a real estate process the consumer wants and/or needs to engage in (via the buyer proposal or seller proposal), and accepts one or more offers received from real estate agent users and other service provider users to assist the consumer with the real estate process. By accepting the one or more offers for services, the consumer opts-in to services to be facilitated by and provided through the marketplace system, as indicated in step 72. The consumer will enter agreements for each of the accepted offers with the real estate agent and/or other services providers. As the real estate agent and/or other service providers complete the delivery of the services, the consumer will pay for the services, in accordance with step 74. At this point the obligations of the consumer are complete. All services to be provided and costs therefor were transparent to the consumer as they were displayed and treated in the workflow generated by the system for the real estate process (listing the steps of the real estate process and showing realtime status of such steps) and the workflow was provided to and accessible by the consumer throughout the real estate process. The system functions so the consumer could easily understand and track the progress of the real estate process.

During or after the completion of the steps in the workflow (the completion of the real estate process) the real estate agent and/or other service providers will take the step of providing a referral fee to the marketplace, as indicated in step 76. The referral fee will be received by the marketplace, as indicated in step 78. As discussed herein, other fees may paid to the market place in place of the referral fee, or in addition to the referral fee during or after the real estate process.

The present invention demystifies the real estate process. All users that must be, and that can be, involved in said process, the steps and activities to be undertaken by each user, and the fees required are all clearly identified to consumers by the system.

Figure 9:
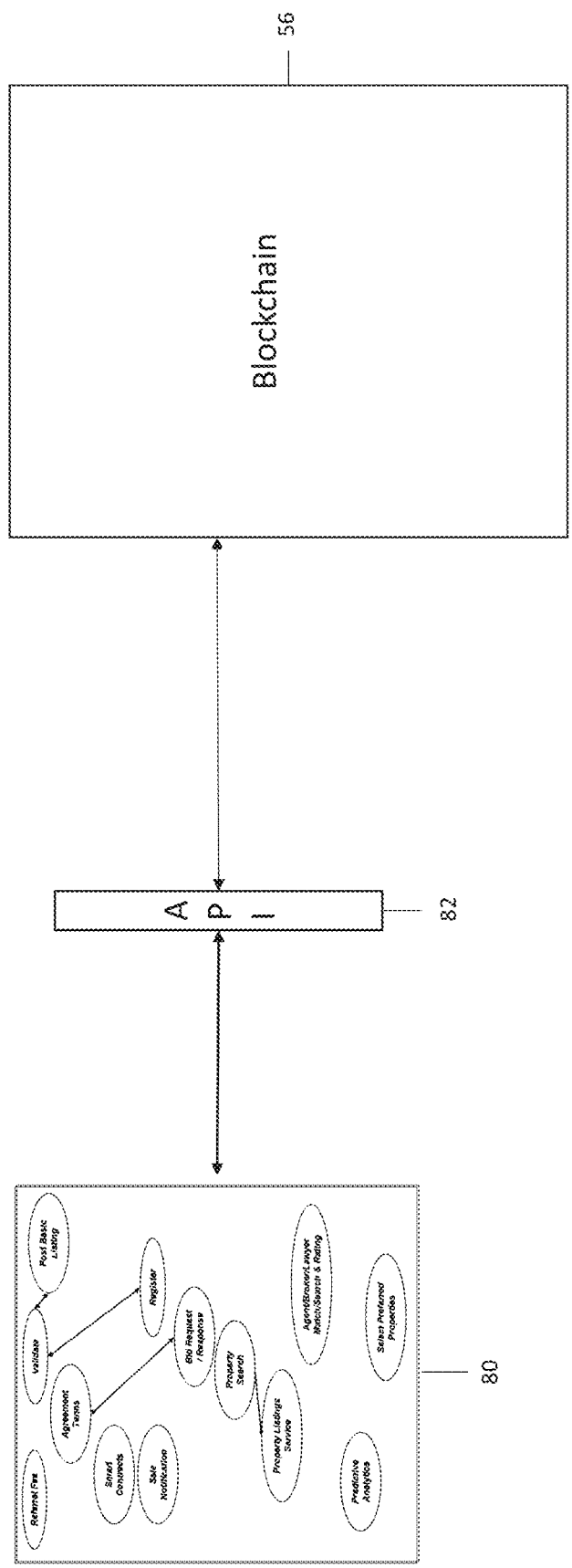
FIG. 9 is a systems diagram showing the integration of the application with blockchain in accordance with an embodiment of the present invention.

Integration of the marketplace with the blockchain further ensures that events in the real estate process and information relating thereto are captured in a secure ledger of blocks, which provides further certainty to a consumer relating to a real estate process, as does the ability to enforce smart contracts between users involved in a real estate process. The integration of the blockchain technology 56 may be via a platform API 82 that creates a connection with the marketplace platform 80, as shown in FIG. 9, and/or via a blockchain API 52 that creates a connection with the marketplace app 44. In either configuration of the present invention it is possible for a commission factoring module 30, or other modules of the system to be integrated with the blockchain technology or with the app or platform, to facilitate additional functionalities for the marketplace.

The marketplace, including the platform, website, app and other elements (internal or external), can be integrated with blockchain technologies of any type. The blockchain technology can be integrated or otherwise incorporated in the marketplace to add a variety of functionalities to the marketplace system.

Query Response Module

An embodiment of the marketplace of the present invention is operable to facilitate a query and response module. For example, such query response module may be voice-based, text-based, or involve any other communication, method and a combination of the foregoing may be utilized by the query response module. A user may pose a query to the system and such query will be processed by the query response module. The processing of said query will formulate a response to said query and generate a form of such response that can be delivered to the user. Said response will be delivered or otherwise provided to the user of the marketplace who posed the query. Generally the response will be provided to said user in the same format of communication as the query was posed (e.g., text-based, voice-based, etc.), however, the user may indicate that the response should be provided in a different communication format than the query was posed. For example, a query may be posed as a voice-based query (a spoken question), and the response may be provided in a text-based format.

The communication formats that the query response module is operable to generate and otherwise facilitate may be determined at least in part by the function of the user's mobile device or non-mobile device, as said device may have voice or text or other communication format operabilites that are required for a query to be transferred by a user through said device to the system and a response to be transferred from the system to the user's device to be received by the user. For example, a user's device that does not operate to support voice queries will not be operable with the query response module to function in a voice communication format.

Figure 15:
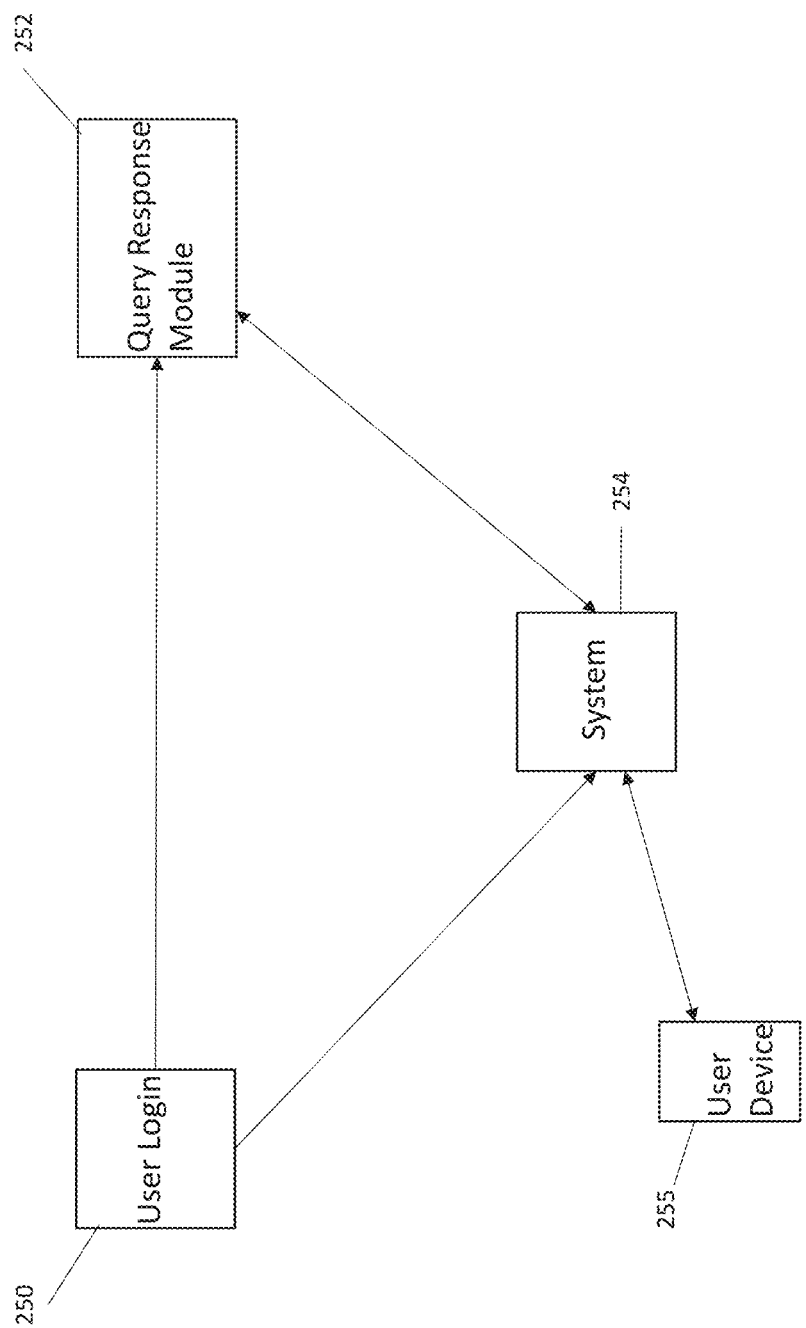
FIG. 15 is a systems view of a query response module of an embodiment of the present invention incorporated with a real estate marketplace.

As shown in FIG. 15, user information provided at the user login 250, for example such as user profile information, may be transferred to the query response module, or be otherwise accessible by the query response module. The user information may include the format of communication of the response that the user prefers to receive for any query said user may pose (e.g., such as a voice-based response, or text-based response, etc.). Said user information may be utilized by the query response module to provide responses to queries posed by said user. Said user may pose a query while utilizing the system 254. Once so posed, the query will be transferred from the system 254 to the query response module 252 where such query will be processed and a response will be generated. The response will be transferred to the system, whereby such response will be provided to the user.

The query response module may be a machine-learning or artificial intelligence based module, and therefore may learn to provide responses that reflect learning to user queries over time (e.g., more directed responses, more detailed responses, clearer responses, etc.). An example of a query that may be posed is a request for an update relating to available properties in a user's preferred neighbourhood, and the response may provide information relating to properties that meet any criteria set by the user (in a user profile or proposal), such as price, number of bedrooms, proximity to amenities, or other information relating to the particular types of properties that said user requires information regarding.

The system may be integrated with a user's mobile device 255, a user's connected home assistant (e.g., Google Home™, or other similar devices), a user's television, or some other device that the user connects to the system. The system is operable to push the response to the user's query that is generated by the query response module, to said device, whereby the response is provided to the user via said device that is either connected to the system or communication method identified to the system (e.g., an email address, a text number, a social media account, etc.).

The query response module may utilize information from the system to formulate the response to the user's query. For example, depending on the subject matter of the user's query, the query response module may utilize information from the system relating to new property listing alerts, updates on property postings, user property proposals, updates regarding the services provided by service provider users, market analytics, information generated by comparing modules, matching modules, estimation tools and other tools, elements and modules of the system, new service providers, new services provided by any service provider users, education tools and information provided via the system, etc.

The query response module may further integrate with tools and modules of the system, and functionalities of the user's device. For example a query may be posed by a user requesting that one or more routes to properties be mapped for said user. Such a query would require the query response module to connect with the Map Tool of the system to generate a map that can be displayed upon the map application available via the user's device.

Examples of queries that a user may pose include the following:
What meetings or open houses do I have booked today?
How much should I budget for property sale closing costs?
Map my routes to my open houses today.
When is the best time for me to list a property?
When is the best time for me to buy a property?
What new listings are available in my neighbourhood?
Tag a property as a favorite for me.
Which homes can I afford in my preferred neighbourhood?
Are there homes I can afford in other neighbourhoods?
Sort seller proposal results based on potential services available at each property.

Other queries can also be posed by a user ranging from queries asking for simple information to those that request recommendations regarding properties. Queries can further request rankings of properties based on certain criteria, that meetings be schedules, etc. The queries will require different levels of engagement of the query response module with other tools and modules of the system, as well as generating a response from varying amounts of collected information.

Figure 20:
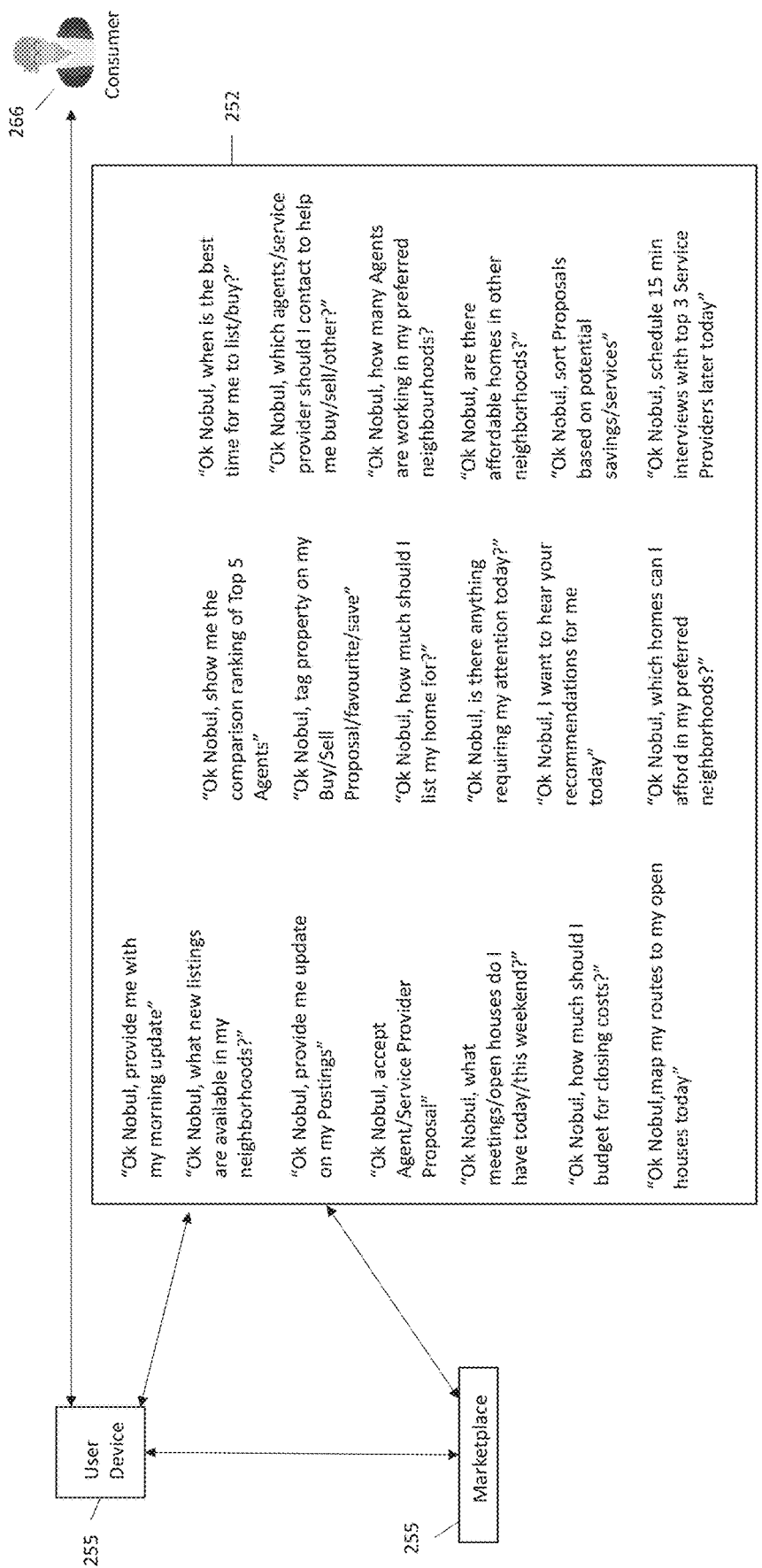
FIG. 20 is a systems view of a query response module offering query options to a user of an embodiment of the present invention incorporated with a real estate marketplace.

As shown in FIG. 20, another embodiment of the query response module 252 may be operable to provide a set of option queries to a user, such as a consumer 266. The user can select a query from the options, by utilizing functions of the user's device 255 (such as a mobile device or a non-mobile device), for example, such as vocally selecting the option by speaking the option, or selecting the option via a touchscreen or the operation of a mouse to select an option displayed upon a screen of the user's device. The query response module is connected to the marketplace (system) 254 and may collect information from the marketplace and process such information to formulate a response to the query. Once a response is formulated the response may be transferred to the user's device and provided to the user via the user's device in any format, such as, for example, a sound format or a text format, etc.

Matching Module

Figure 16:
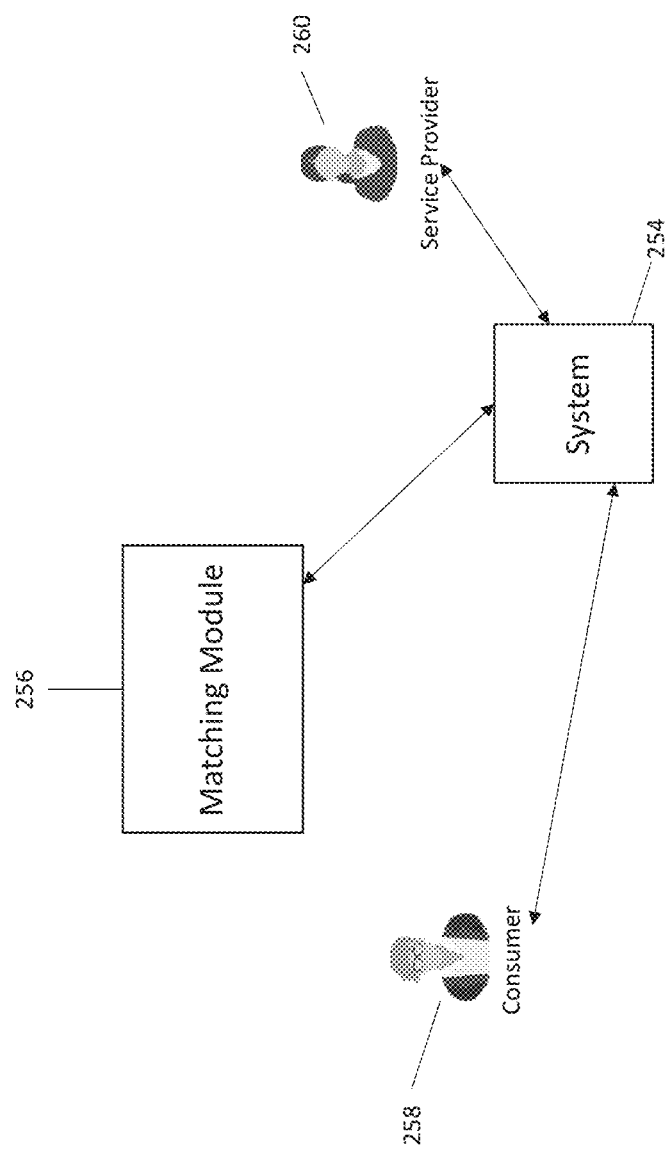
FIG. 16 is a systems view of a matching module of an embodiment of the present invention incorporated with a real estate marketplace.
Figure 17:
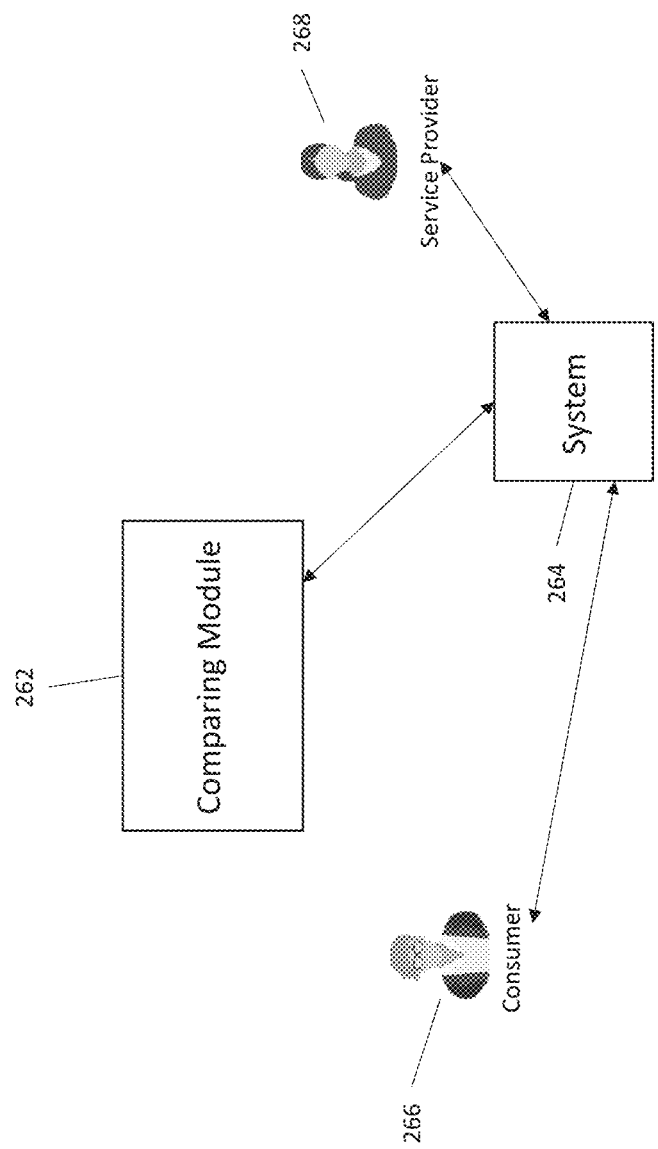
FIG. 17 is a systems view of a comparing module of an embodiment of the present invention incorporated with a real estate marketplace.

As shown in FIG. 16, the system 254 of the present invention may be connected to a matching module 256. A consumer 258 and a service provider user 260 may interact with and utilize the system, and such use of the system may engage the matching module in certain circumstances. For example, a user may provide preferences regarding particular properties it will engage with and activities the consumer wishes to undertake (e.g., purchasing and/or selling a property) in a user proposal. Said preferences may indicate that said consumer wishes to engage with properties in particular locations, a price range for said properties, features and amenities relating to such properties, the size and/or number of rooms of such properties, a budget for such property and services relating to the purchase and/or sale of such property, specific services the consumer will require from service providers, etc. The system is operable to generate said consumer proposal in response to information input to the system by said consumer. Said proposal will be transferred to the matching module. The matching module will process the proposal to identify proposals of other users that contain common information with the consumer proposal, for example, such as common information relating to properties, types of services or service providers.

Service provider users may also generate proposals that include services that said service provider wants to provide to other users. Said service provider proposal may indicate a location wherein such services may be provided, the cost of such services, and other information relating to the services to be provided by said service provider. A service provider user may generate one or more proposals. For example, a service provider user may generate a proposal for each geographic location where a service provider provides services, and one or more of such proposals may indicate that different services are provided than the other proposals. A service provider proposal may further indicate commissions and other fees or rates that the service provider charges for the services it provides, and whether the service provider will engage in auto bidding services, and other details relating to the services identified in said proposal.

The system makes said proposals available to or sends said proposals to the matching module. The matching module processes said proposals individually. The matching module reviews the information in said proposals in relation to other proposals it receives from buyer users and seller users seeking services for real estate processes. The matching module utilizes information from the proposals it has reviewed to identify users that have indicated in their proposals that said users are seeking the services identified in the service provider's proposal. The matching module may review one or more of the following types of information identified in each of the buyer user or seller user proposals and the service provider proposals to find matches between such proposals: the locations identified; the type of services and/or products; a service provider rating; and a seller user's or buyer user's budget. etc. The matching module may also incorporate market analytics information into its processing of proposals.

The results of the matching module processing are the basis of the operation of said module to: provide services provider users with buyer user or seller user requests for services (in accordance with the proposals prepared by said users), and buyer users or seller users with service provider user proposals. The matching module also enables buyer users or seller users to view service providers that are available in their region to empower such users to find and connect with such service providers, by facilitating the identification of such service providers for the user and a means whereby said user can contact said service providers.

The matching module is further operable to provide insights and recommendations relating to property transactions in the location indicated in the matched proposals, or other insights and recommendations relating to commonalities between said proposals whereby the match between said proposals was identified by the matching module. Said insights and recommendations may be provided in the form of tips relating to the information provided in a said proposals, for example, such as tips for property inspections of century homes if said matched proposals indicate that a century home is sought, or other tips relating to the activities of the users to assist with the real estate process to be engaged in. Such insights and recommendations may be further provide information regarding trends that are related to particular properties, occurring in particular areas, or other trends relating to the real estate process to be engaged in. Such insights and recommendations may be provided at other points in time during the activities of the users on the system, and said insights and recommendations may be displayed to a user or pushed to a user's communication method identified in a proposal or profile of said user (e.g., an email account, text number or social media account).

The matching module will provide the matched proposals determined by its processing to the system. The system will display information about service provider users deemed by the matching module to be a match for another user's proposal to said user. The user may view information about to specific details relating to each service provider user by selecting elements of the provided information. For example, a user may select (by clicking upon such information using a mouse, touching the information on a touch-screen, or by some other similar selection method) location information to see a map of the location where a service provider provides specific services. Other information so provided to a user may also be selected to obtain more detailed information relating to the same proposal information.

A user may further choose to view information in a comparison view. A comparison view can be generated by the comparing module 262 that will display information relating to different service providers, properties, or other subject matter, in a manner whereby the information can be easily compared when viewed. The comparing module will process information that a buyer user or seller user 266 and a service provider 268 have provided to the system 264, as well as information that has been collected, accessed or generated by the system. Said information may relate to multiple records for common subject matter, for example, such as multiple service provider user, buyer user or seller user proposals, multiple properties, or other multiple records relating to common subject matter.

Figure 18:
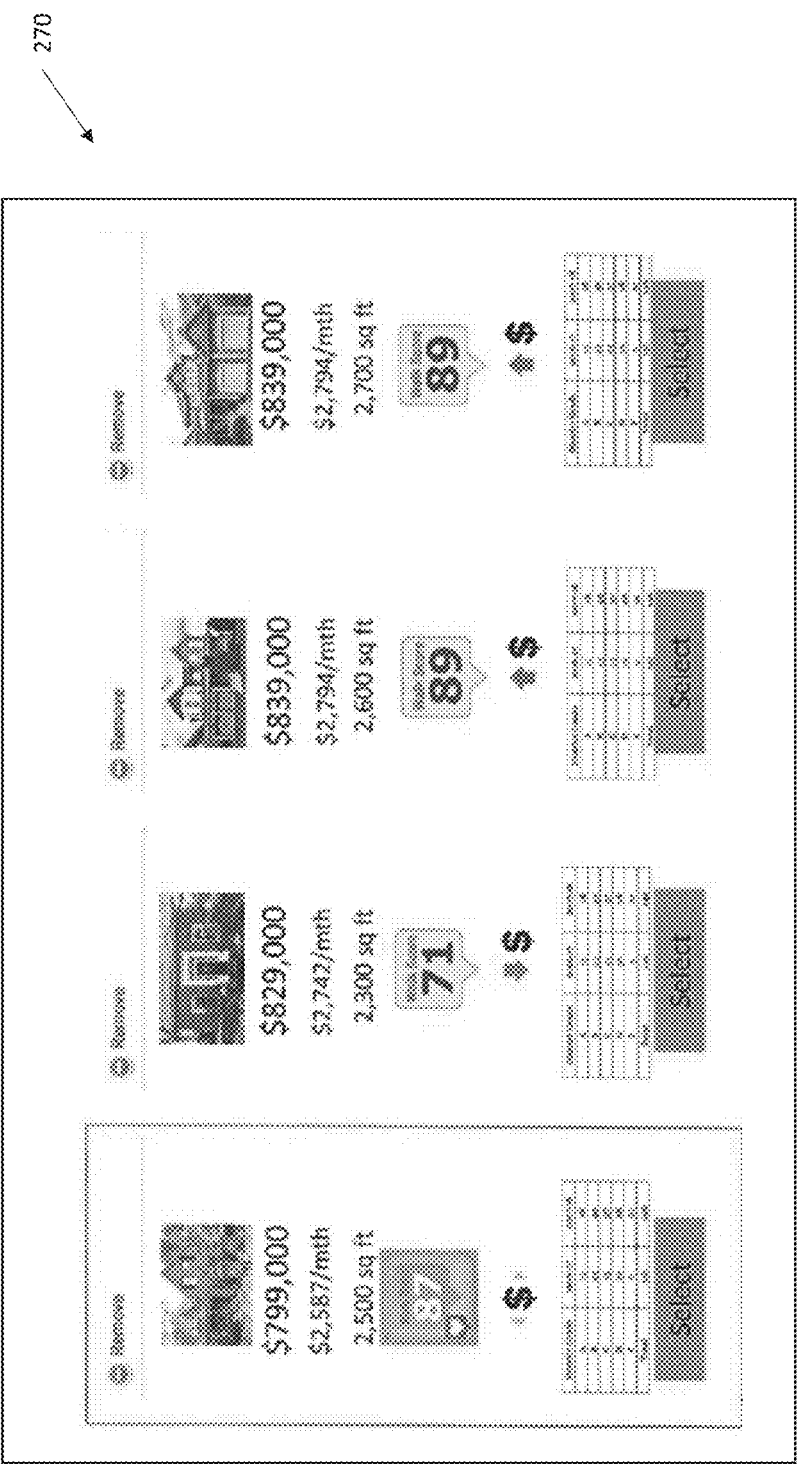
FIG. 18 is a view of a screen view of results of use of the comparing module to compare properties of an embodiment of the present invention incorporated with a real estate marketplace.
Figure 19:
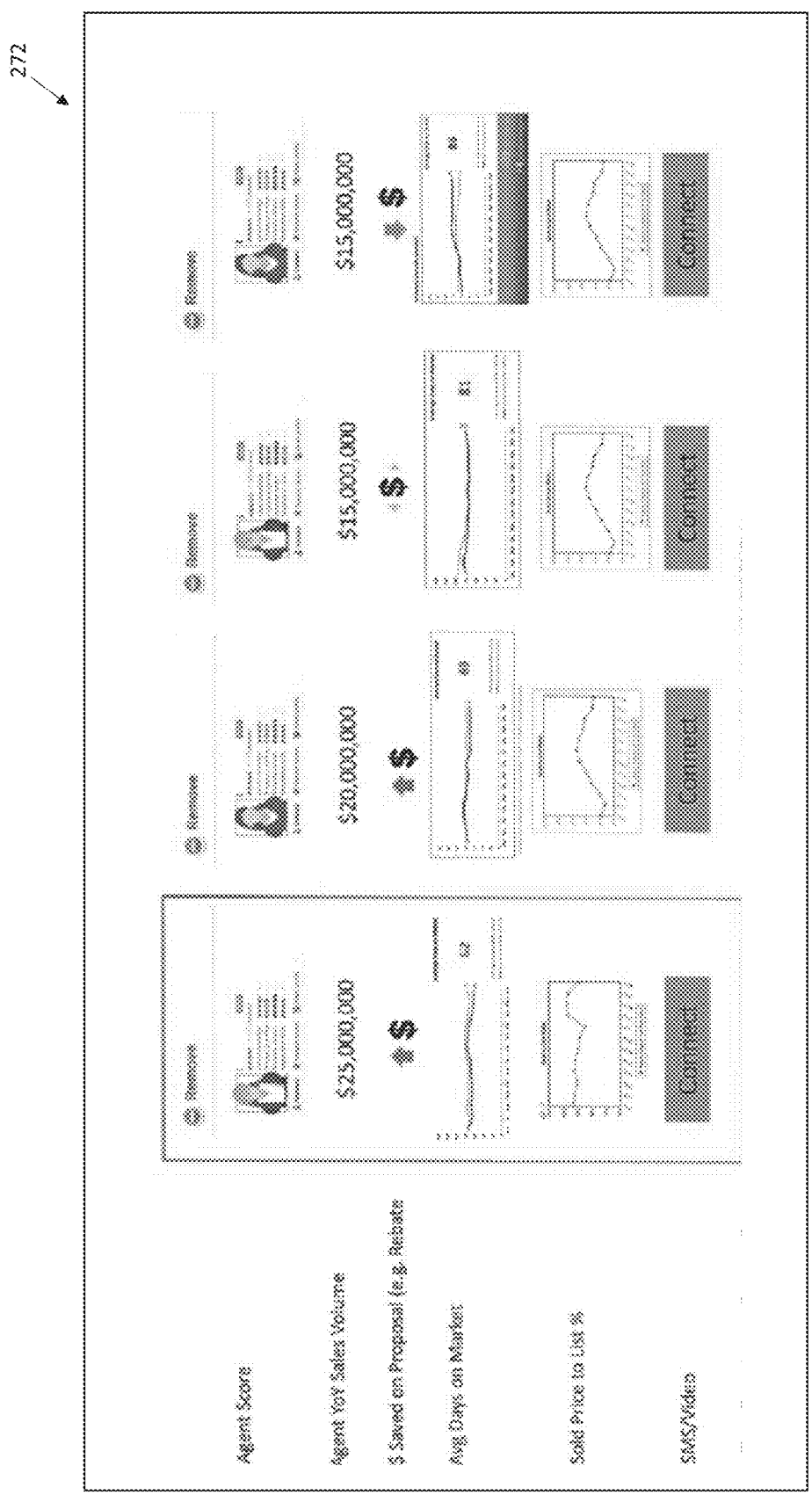
FIG. 19 is a view of a screen view of results of use of the comparing module to compare service providers of an embodiment of the present invention incorporated with a real estate marketplace.

The results of such processing will be displayed to a user in a manner such that the user can easily compare common information relating to the results. For example, as shown in FIG. 18, the properties comparison view 270 may display multiple properties, or, as shown in FIG. 19, the service provider comparison view 272 may display multiple service providers. The comparison view may further display rankings of records (e.g., ranking of service providers having a proposal mostly closely matching the proposal of another user, rankings of properties from most to least expensive, or other rankings), historical information (e.g., historical property prices, etc.), or information relating to insights or recommendations for users relating to properties or other subject matter relating to the activities of said users via the system for real estate processes.

A user may access a comparison view at a particular page of the system, or the comparison view may be pushed by the system to a communication method identified by said. The comparing module may further be activated by the system to generate comparison views relating to particular subject matter at any point in time when multiple records relating to subject matter are to be provided to a user.

The function of the matching module may cause a service provider user to receive information relating to buyer user or seller user proposals for which the service provider proposal indicates that said service provider may be able to provide services. For example, a user proposal that indicates that particular services are needed in a particular location at a particular commission rate, may be provided by the system to a service provider whose proposal indicates that services are provided by said service provider in the same location and at the commission rate indicated by the other user (or within the commission rate range indicated by said user in the user's proposal). A service provider user may receive one or more proposals from other users relating to each of the one or more proposals created by said service provider.

A user receiving one or more service provider proposals can connect with one or more of said service providers via the system. The system is operable to generate messages and other communication between users within the system, via messages or real time electronic chats, or can push messages to a communication method identified by a user who is to receive such message. Users may set-up a meeting at a physical location through messaging or chatting via the system. As indicated herein, if a meeting is set-up between the user and a service provider, or upon the occurrence of other activities by the user and service provider that require a contractual agreement between said users, in accordance with relevant laws, regulations, policies, and/or industry standards, may result in the system automatically generating an agreement for said users to review and execute. In this manner the system assists the users to ensure legal and industry standard requirements are met for real estate processes.

Map Tool

The present invention may further incorporate a computer-implemented real estate mapping tool. Said real estate mapping tool may be operable to generate a map that is viewable by a user on a mobile device or a non-mobile device. Said map identifies one or more real estate assets in a geographic location or information related to real estate assets in a geographic location, such as level of purchasers of real estate in a geographic location. The map is operable by a user to access and view details about real estate identified on the map.

The real estate map tool comprises a data resource, a data collector, a processor, a map generator, a reviewer, a geographic code unit, a database, an analysis unit, and a file generator. The file generator is operable to transmit the map file to a user via the Internet or some other network. The map file that is generated is of a small computing size, whereby the full range of functions of the map can be operated by a user on a mobile device or a non-mobile device in a fast and responsive manner.

The present invention is a tool that generates a map that is viewable and operable upon a mobile device, or non-mobile device. The map may be accessed by a user via an application (app) downloaded to a mobile device, through a website, or by any other means. The map shows a geographic location and indicates one or more real estate assets upon the map or information relating to real estate in the geographic area. The map is operable to increase and decrease the geographic area shown upon the map, and to select any real estate assets shown upon a map user. When a real estate asset is selected by a user details about the real estate asset will be made available to the user, such as through the display of information relating to the real estate asset.

The map may function so as to allow a user to drill down into the details regarding the real estate asset, and several drill down layers of information may be available to a user for a real estate asset. For example, when a cursor is positioned over the real estate asset on the map, basic information about the real estate asset may appear, such as the address of the real estate asset. When a user selects a real estate asset, further details about the real estate asset may be provided to a user, such as a pictures of the real estate asset, and lot size, etc. It may be possible for a user to access details about the real estate asset either through the system providing access to, or reflection of, details of third party resources, such as real estate agent listing resources that provide information relating to any listing for a real estate asset (e.g., type of heating, listing price, number of rooms in a building, etc.), land title registry details such as are available from a land title registry office, or other details. The system may further provide details relating to a real estate asset (property) that are stored by the system when a user selects a real estate asset on a map.

The present invention offers a benefit over the prior art, in that the prior art generates a map in a file size that is too large for functions of a map to be easily navigated and utilized by a user on a mobile device, or through a website. Significant lapses of time occur when a user tries to utilize functions of a prior art map. The present invention overcomes these limitations of prior art maps by generating a map that has a smaller file size and can be navigated and utilized by a user on a mobile device or through a website.

There are several features of the map generation method of the present invention that support the small file size and fluid operability of the map. The present invention is operable to geo-code all real estate assets that are to be shown upon a map. Moreover, when the map is generated the file is compressed before it is downloaded to a mobile device, or made accessible to a website. The data incorporated in the map is further loaded no more than once. The geo-coding, compression and operation such that data is loaded only once, of the present invention facilitates the generation of a map within a fast response time to any request for such map, as well generating a map that quickly responds to operation of the functions of such map by a user, and that produces a fluid user experience.

The geographic location shown on the map, and the real estate assets indicated therein, can be determined by specific parameters set for generating the map. These parameters may be indicated by a user in a user profile or proposal, by input received by the real estate map tool when a map is requested by a user, or hardcoded into embodiments of the present invention. For example, parameters may indicate the type of real estate asset to be indicated on the map (e.g., commercial properties, residential properties, or any other one or multiple types of real estate assets), a listing price or present value range for the real estate assets indicated, proximity to amenities (e.g., a school, a fire department, a police station, a grocery store, etc.), and any other parameters relating to real estate assets and/or the location of such real estate assets. The parameters will be utilized to filter the real estate assets that are indicated on the map that is generated and viewed and operated (e.g., utilized to select elements of the map to cause information to be displayed) by the user.

The mapping tool may obtain and process aggregated data generated by the marketplace (e.g., by the analytics module, or other operations, modules, elements or tools of the system) to provide maps relating to said data (information), such as for example, relating to services provided via the marketplace in a geographic area, the buying or selling of properties occurring in an area during a period of time, or routes between properties, etc. For example, the mapping tool may process aggregated data to generate a map that indicates the levels (amount) of real estate activities in a geolocation. The different levels of said activities may each be indicated by a different colour, for example, such map may display areas within a geolocation where multiple recent real estate sales have occurred within a particular time frame in one colour, areas where fewer real estate sales have occurred within the same time frame in another colour, areas where no real estate sales have occurred within the same time frame in yet another colour, etc. Other visual formats whereby differences between areas in a map of a geolocation can be indicated based on aggregated data (information) may also be incorporated in such a map generated by the system.

The drawings herein provide some examples of possible embodiments of the real estate map tool, and other embodiments are also possible.

Figure 11:
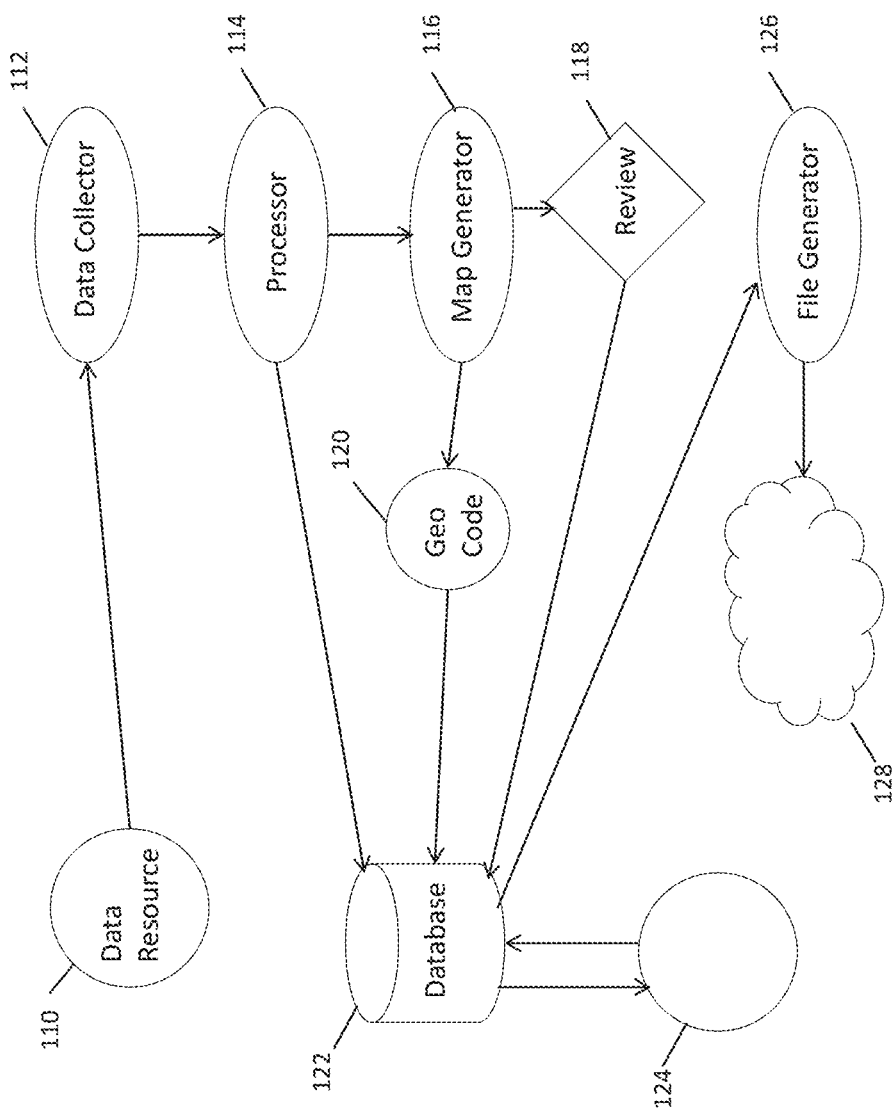
FIG. 11 is a systems view of the elements of a real estate map tool of an embodiment of the present invention.

As shown in FIG. 11, a real estate map tool of the present invention may incorporate a data resource 110. The data resource may be a resource that stores or has access to information and other data relating to real estate assets. In some embodiments of the present invention the data resource is the system and the map tool is a module of the system. In such embodiments of the present invention, the map may be generated and provided to said user within the system. In other embodiments of the present invention the data resource may further provide a connection between the real estate map tool and third party app or website. For example, a marketplace partner can imbed the map seamlessly on their digital properties to enhance the experience of their users of such digital properties.

Information regarding any parameters for the map to be generated provided by a user, and other details relating to real estate assets in a geographic location, and that are within parameters set by or provided to the real estate map tool, will be transferred from the data resource 110 to a data collector 112. The data collector will filter the data transmitted from the data resource and any data stored within, or otherwise accessible by, the data collector that relates to the parameters for the map that is to be generated. In some embodiments of the present invention, the data collector may be connected to one or more third party databases wherein real estate asset details are stored, such as land title registries, real estate listings, etc. The data collector may be operable to obtain real estate asset details from such databases. In other embodiments of the present invention the data (information) collector obtains real estate asset details from databases of the system or databases accessible by the system.

The data collector 112 transmits real estate asset data for the map to the processor 114. The processor may review prior lists of real estate asset data generated for prior maps for the same geographic location and the same parameters. The aim of the present invention is to create a list based upon the prior list. The processor will compare the prior lists to the information provided by the data collector. If any data does not appear on the most recent list, it is indicated as data that should be removed from the present list. An indicator of data to be removed from the list is be transferred to the database 122. New data that is provided in the most recent list will be added to the present list. Data that previously existed on the prior list and that is not indicated to be removed from the list remains on the present list. This function ensures that data is not required to be re-loaded into the present list. The present list is only altered to remove data or add data. The present list is an updated list as compared to the prior list, or is identical to the prior list if no alterations or removals are required.

As an example of updating the present list, where the prior data for a real estate asset has been altered since the data for the same real estate asset captured in the prior list, such as the listing price for the asset has altered, or other information has been altered, the prior data for the real estate asset will be removed from the present list, and the most recent data for the real estate asset will be added to the present list. A complete list to be used for the present map is confirmed and transmitted from the processor 114 to the map generator 116.

The map generator is operable to utilize the list of real estate asset data to organize the data into a map. The map generator will incorporate map data as required for viewing the real estate assets upon the map, as well as to support the functions of the map for each real estate asset. For example, the map generator is operable to identify the real estate assets that will be indicated on a map, and where such assets will be indicated on the map by geolocation. The map generator is also operable to configure the map data to support functions associated with the real estate asset through use of the map, such as drill down detail functions, and other functions.

The map generator incorporates geo-codes into the map data for each real estate asset to be indicated on the map, if a geo-code is not already indicated in the present list that was provided to the map generator by the processor. The geo-code indicates the geolocation of the real estate asset. The map data, including the data to display the initial map indicating geolocations of real estate assets, and data for other functions of the map in relation to each real estate asset, is thereby generated.

The foregoing description is related to lists for real estate assets (properties). A similar process is applied to obtaining and updating information for maps generated based upon aggregated data and directed to show information other than real estate assets.

The map data is transmitted from the map generator 116 to the database 122 via a reviewer 118. In the process of generating the map data, the map generator may indicate important and significant changes to the map since any prior map for the same geolocation and parameters. The map generator may transmit such important changes to the reviewer 118. The reviewer may review the significance of such changes and generate an update if it determines that the change is significant. Such a determination is based upon one or more determining factors. Any updates will be transmitted from the reviewer 118 to the database 122 with the map data. Such updates may be incorporated into maps generated on an ongoing basis. For example, a significant change may be a severance of a real estate asset, whereby two real estate assets are formed. A significant change may also be new roads, or other map details. These are just examples, other significant changes may also be detected by the reviewer.

The geographic map details are generally obtained initially, from a known map source, such as Google™ maps or another map source, and stored in the database. The real estate asset indicators may be overlaid upon said map or embedded therein. Alternatively, the map details may be obtained each time the real estate map tool generates map data.

The map data is reviewed by the geo-code unit 120. Any geo-codes that were added to the map data, and that did not previously exist in the map data of prior maps, will be identified and determined by the geo-code unit. The geo-code unit transmits an update indicating the added geo-codes to the database of the map tool.

A copy of the map data will be stored to the database of the map tool. One or more analysis units 124 may be attached to said database 122 whereby data is transmitted bi-directionally to and from said units and said database. The analysis units may be utilized to undertake additional processing of the map data, such as applications of any algorithms to the map data, filtering of the map data in accordance with one or more additional parameters, or any other processing. The processed map data is transmitted from the one or more analytics units to the database of the map tool. In embodiments of the present invention the one or more analysis units will be operable to process any data stored in the database of the map tool.

Figure 12B:
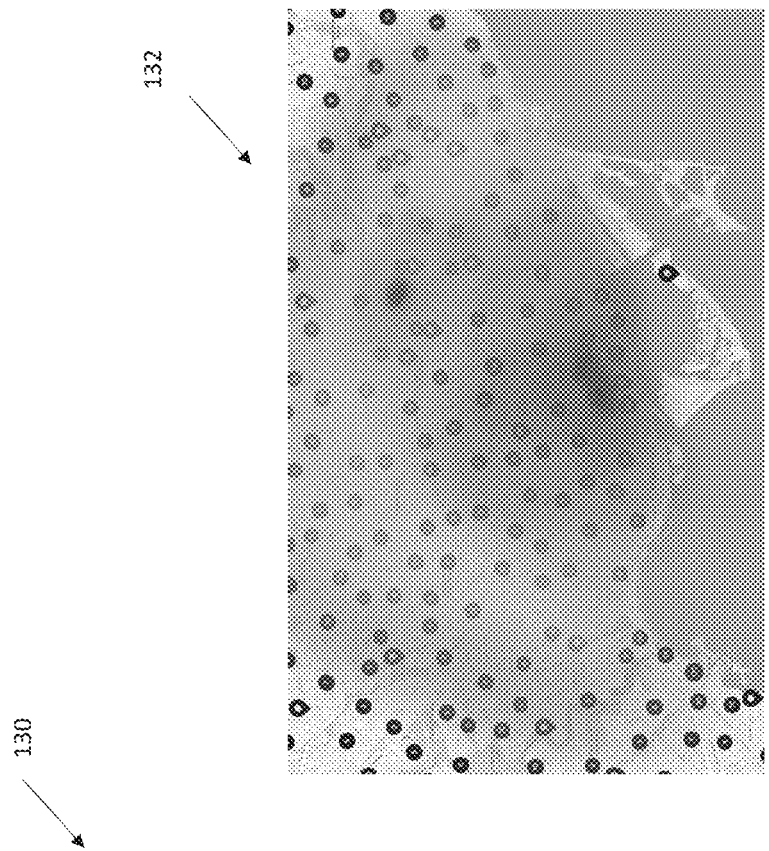
FIGS. 12*a* and 12*b* are screen shots of maps generated by the real estate map tool of an embodiment of the present invention incorporated with a real estate marketplace.
Figure 12A:
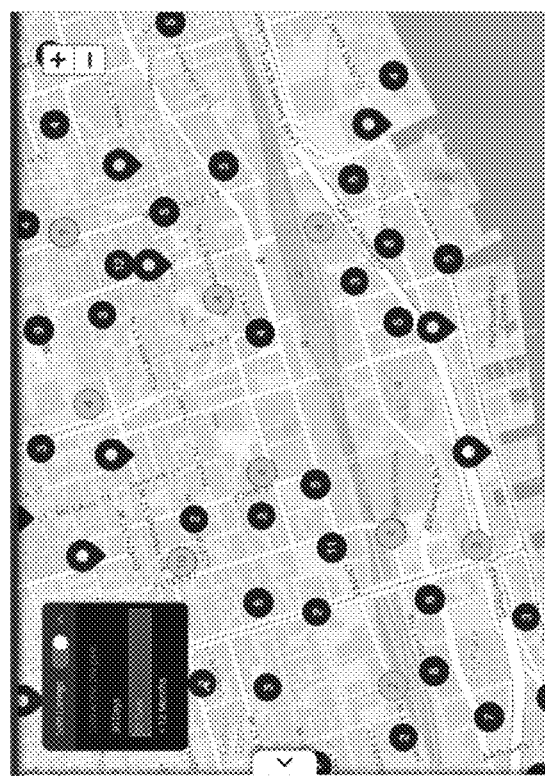

Map data is transmitted from the database 122 to the file generator 126. The file generator is operable to generate the map file that will be downloaded to an app or accessible by a website provided to a user by other methods. The file generator will compress the map data and transmit the map data as a map file to an app or a website via the Internet 128. An example of a generated map indicating properties is shown in FIG. 12*a*. An example of a generated map indicating locations within a geographic area that have experienced better or worse property sales in the recent past (the term of the recent past may be set by the user) is shown in FIG. 12a and such better or worse property sales are indicated by colours appearing upon the map relating to levels (amounts) of sales. Other maps may also be generated by the map tool.

In embodiments of the present invention, a wholly new map data and/or map file may not be required to be created each time a map is requested. If the data for the real estate assets to be indicated on a map are unchanged from a prior map generated by the present invention, no new map data or map file will need to be generated. A new map data or map file will also not be generated if there is no change to data reviewed by the review for other types of maps. The prior map file is transmitted by the file generator. Should only some of the map data have been altered only that map data that has altered will be changed from the prior map data, and an updated map data and an updated map file will be generated. A wholly new map data or map file will not be required to be generated after the initial generation of map data and map file unless significant changes to the map or real estate assets occur.

In embodiments of the present invention, the steps of use of prior map data or map files, and updates to map data and map files, offers computational benefits over the prior art. The prior art requires that wholly new map files be generated each time a map is requested. By utilizing prior map data and map files, or only having to generate updates thereto, the present invention may require less computational time and processing power than the prior art. The result is that a map indicating real estate assets in a geographical location, and other types of maps, can be generated and transmitted for use to a user faster by the present invention than is possible for a prior art map tool.

In embodiments of the present invention, a user receiving or otherwise accessing the map generated by the present invention will receive and/or be able to access the map quickly after the map is requested. In such embodiments of the present invention, the user's experience of the functions of the map will be fluid due to the file size and the method of updating (instead of wholly replacing) map data and map files.

Predictive Analytics Tool

The present invention may incorporate a real estate predictive analysis tool. Said real estate predictive analytic tool method and system, may comprise an ingest data module and a model development module. The ingest data module is connected to multiple data sources that may be internal to the predictive analytic tool, or may be external data sources operated by third parties to which the predictive analytic tool is connected. The ingest module collects information relating to real estate, such as property data, census data, household data, consumer (real estate purchaser and seller) behavior, and social data. The ingest module is operable to process the information it collects to generate statistics, to aggregate data, and to perform other processing of data. The model development module is connected to the ingest data module, and data can be transmitted bi-directionally therebetween. The model development module can utilize the information received from the ingest data module to develop real estate predictive analytic models, whereby real estate to be listed for sale in the future can be predicted. In embodiments of the present invention, the model development module incorporates artificial intelligence operability, and can learn based upon its modeling activities overtime.

The present invention is operable to predict when real estate will be listed for sale in the future. The term "future" as used herein means a point in time after the present date when the predictive analytic tool generates aggregated data and develops real estate predictive analytic models. The future date for any prediction of the present invention may be set by a user or otherwise indicated to the present invention at the time when the tool is operated by the system in relation to a user query or other activities of a user in the system. The present invention may initially be utilized for near-future dates (e.g., within a year of the present date or other near-future dates). The present invention may be utilized for other future dates farther into the future and farther from the present date when the tool is activated, as the artificial intelligence operates to increase the predictive accuracy of the present invention for future dates that are not near-future dates.

The term "report" as used herein to reference a report generated by the present invention indicating predicted future real estate listings, means a hard copy or digital report, reports in any format (graphic, tables, charts, text, etc.), and reports that incorporate one or more pages providing a variety of types of information, including information relating to predicted future real estate listings, including historical, present and predicted data relating thereto.

The present invention offers a benefit over the prior art, in that the prior art is unable to predict future real estate listings. Prior art real estate tools can merely provide a real estate buyer with information about present real estate listings known at the time when said tool is operated. A real estate buyer is therefore limited to choosing to purchase real estate from the available present listings. The present invention offers real estate buyers information about real estate predicted to be listed in the future, in advance of the listing being made. This information facilitates a real estate buyer's ability to purchase the specific real estate that said buyer needs, because the real estate identified to said buyer as being listed and predicted to be listed broadens the scope of the real estate that the real estate buyer will consider prior to purchasing real estate.

There are many possible uses of the present invention. The present invention may be utilized as a standalone tool, whereby it generates reports of predicted listings that may be distributed to, or otherwise accessed by one or more of, real estate buyers, or real estate agents, brokers, or other service providers, and other persons. Each recipient of the report may utilize the report for a different purpose. For example, real estate agent may use the report to target the marketing of agent services to the sellers of predicted future real estate listings, so as to obtain the listing and selling business for the real estate on behalf of such seller. A buyer may use the report to widen the scope of a search for real estate appropriate to said buyer's needs that said buyer will consider buying in the future. Real estate service providers may utilize the report to target marketing of said service provider's services to the predicted seller.

The predictive analytics tool may be operable to indicate trends for real estate transactions in neighbourhoods, provide a confidence level with response to a stated price for a property, and/or indicate trends for real estate listings that do not result in any transaction. The trending information may be aggregated by the predictive analytics tool, and such aggregated information may be processed by said tool to produce reports that reflect information relating to a buyer user's or a seller user's interests, needs or requirements in relation to particular services offered via the marketplace, or the process of selling or buying property generally.

The drawings herein provide some examples of possible embodiments of the real estate predictive analytics tool, and other embodiments are also possible.

Figure 13:
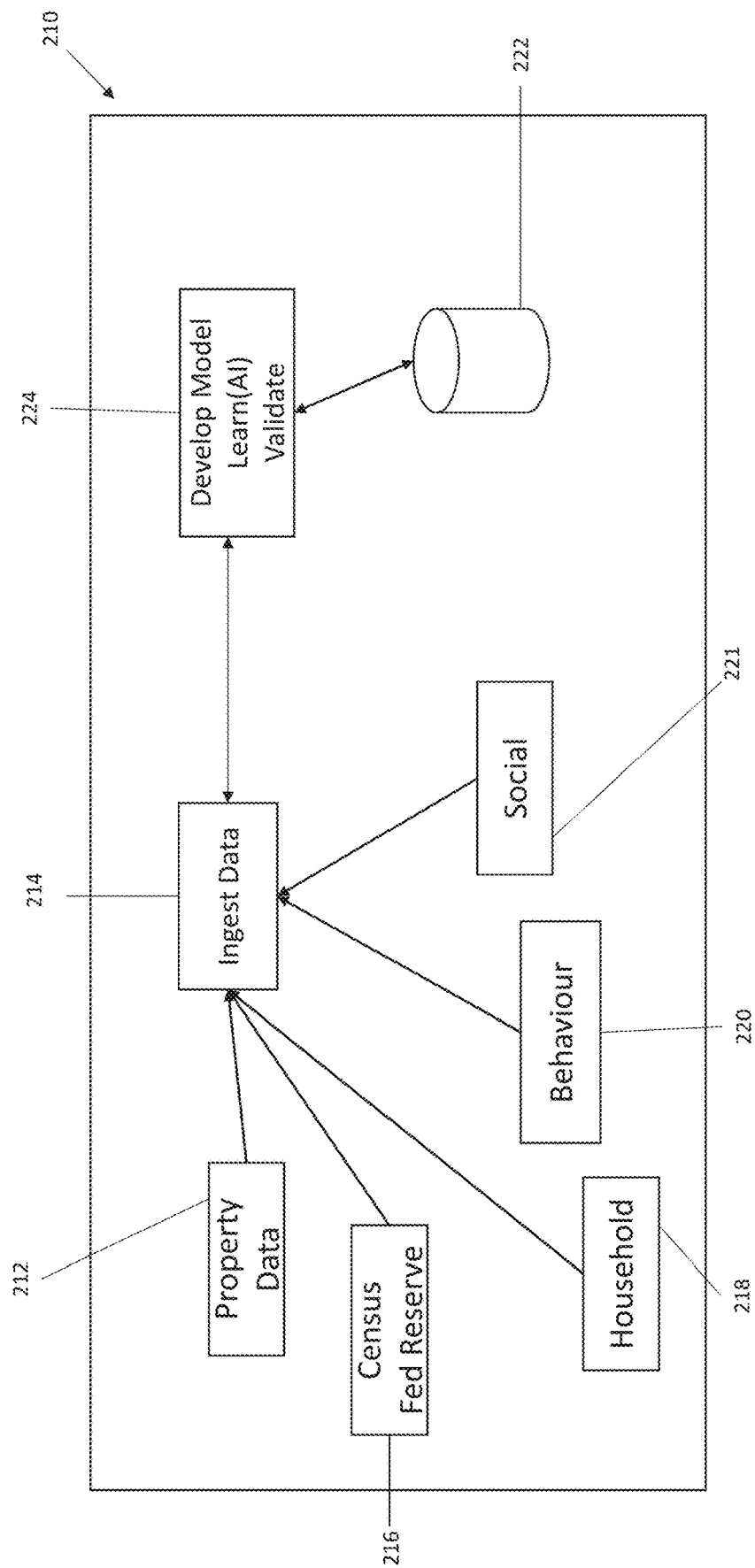
FIG. 13 is a systems view of the elements of a predictive analytic tool of an embodiment of the present invention.
Figure 22:
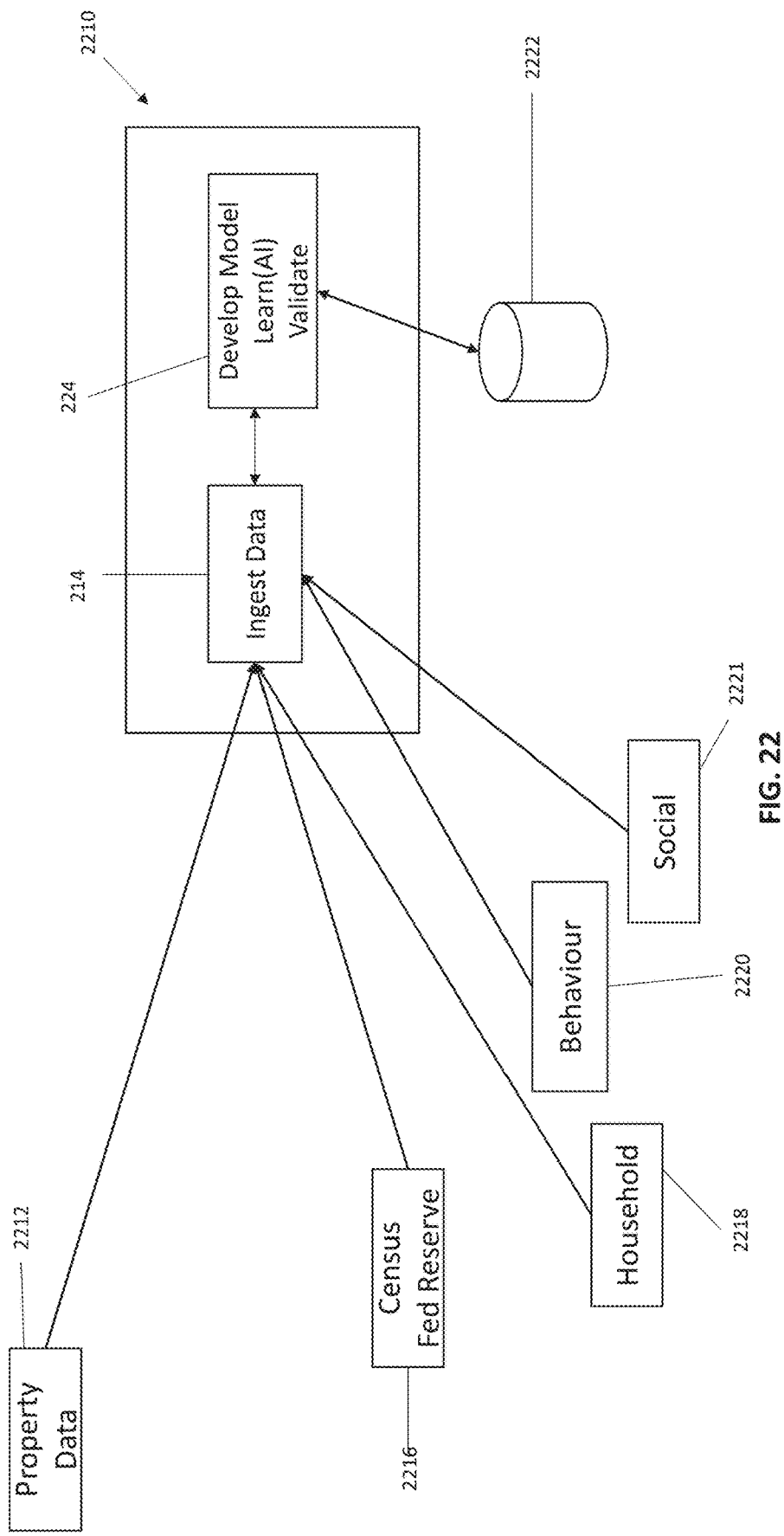
FIG. 22 is a systems view of the elements of a predictive analytic tool of an embodiment of the present invention.

As shown in FIGS. 13 and 22, the real estate predictive analytics tool 210 may incorporate an ingest data module 214.

As shown in FIG. 13 the ingest data module may be connected to one or more internal data (information) resources, such as a property data resource 212, a federal reserve of census data resource 216, a household data resource 218, a consumer behavior data resource 220, a social data resource 221, and any other resource that can provide information related to owners of real estate, as well as any other information relating to real estate processes (buying and selling real estate).

As shown in FIG. 22 the ingest data module may be connected to one or more external data (information) resources, one or more of which may be third party data resources, such as a property data resource 2212, a federal reserve of census data resource 2216, a household data resource 2218, a consumer behavior data resource 2220, a social data resource 2221, and any other resource that can provide information related to owners of real estate, as well as any other information relating to real estate processes (buying and selling real estate).

The ingest module may further be connected to the databases and other data (information) resources of the system. Information is transmitted from the data resources to the ingest data module.

For example, the information may be transferred on a regular basis, such as nightly or some other regular basis, upon a particular event, or upon a command from a user. Information from the data sources may be transferred at different times and upon varying schedules (e.g., some data sources may send data on a regular basis, and other data sources may send information upon an event, etc.).

The data resources may be databases stored upon one or more system servers, third party servers, social media sites, or other types of data resources. The connection to the data resources, and to any other connection between elements of the present invention as discussed herein may be wired or wireless, and may be direct or via a network or the Internet. Transfer of data between elements of the present invention and third party data (information) resources may be via a secure transmission means and in accordance with secure transmission protocols.

The data resources may include information that is historical and present. For example, the data resources may include one or more of the following historical real estate listings, active real estate listings, historical social media site information for sellers, historical real estate sales, active real estate sales, agent locations, municipal property assessments, mobile browsing history of sellers, real estate sales locations, and other information.

In some embodiments of the present invention, information will only be provided (by transmission) to the ingest data module from one or more data resources and upon a request for specific information the request may be transmitted from said one or more data resources to the ingest data module. For example, such a request may be for a prediction of condominium listing in a geographic area, and only information relating to the specific query regarding condominiums will be provided from data (information) resources, namely information pertaining to condominium listings. In such embodiments, the data transferred will be limited in scope to information that responds to the request. In such an embodiment a bi-directional transmission of data may be possible between the ingest data module and the one or more data resources.

The data resources may each provide a specific type of information to the ingest data module. The following are some examples of data resources and information provided by such data resources that may be incorporated in an embodiment of the present invention:

A property data resource may provide details relating to real estate. For example, such as date of prior sale, prior sale price, present owner, details of the real estate, such as size, details of any structure upon (e.g., number of rooms, heating source, amenities, etc.), and/or other details relating to the real estate.

A federal reserve of census data resource may provide information from one or more federal censuses.

A household data resource may provide information regarding households in a particular area. For example, such as the number of residents in households, the livelihoods of the residents of households, the power consumption by households, the number of school age children in households, and/or other household information.

A consumer behavior data resource may provide information regarding consumer behavior relating to the sale and purchase of real estate. For example, such as the real estate listings viewed by consumers, the time period between viewing real estate listings and purchase of real estate by consumers, the percentage of income spent on the purchase of real estate by consumers, the types of advertising for real estate viewed by consumers, and/or other consumer information.

A social data resource may provide information regarding how social networks affect purchases and sales of real estate. For example, such as the timing of real estate listings, world events (e.g., stock market results, wars, weather patterns, etc.), and/or other information relating to social effects for real estate.

The data transferred to the ingest data module may be processed by the ingest data module, or it may be transferred to one or more internal servers 222 via the develop model module, as shown in FIG. 13. In some embodiments, as shown in FIG. 22, the database 2222 may be external to the real estate predictive analytics tool 2210.

The real estate predictive analytics tool 2210 may be incorporated in the marketplace, or act as a standalone module. For example, the module may be linked to or embedded in an external electronic environment, for example, such as a website, app or other electronic platform, which may be operated by the marketplace operator or by a third party (e.g., a real estate professional's website, a real estate listing website or app, such as a MLS page, relator.ca, etc.). Such environment may facilitate a search of real estate properties by a user. Information relating to a person who views properties in the environment can be gathered from the real estate information sources and collected by the real estate predictive analytics tool.

The activities of the user in such an environment may be tracked, including the properties searched by such user at a single searching session, or over time as the user utilizes the environment at different dates and times. Information relating to the user may further be collected from resources that are internal or external to the real estate predictive analytics tool, including third party resources and/or marketplace resources. The collected information may be transferred to the ingest data module, and from the ingest data module to the develop model module. The develop model module may process such information to generate a prediction as to whether the user is likely to a particular property or other real estate.

The internal or external resources from which information pertaining to a user may be collected by the real estate predictive analytics tool may include one or more of the following,

- Core Logic Data Resources, for example, one or more MLS-type resources (e.g. CREA, TREB, etc.) that provide information relating to the one or more properties that a user reviews in the environment, including the search criteria the user utilizes in the environment to identify real estate to be reviewed (e.g., real estate type, user's real estate budget, real estate location, etc.), the frequency of the user's searches, as well as details of the real estate that is reviewed (e.g., size of property and any building thereupon, proximity to amenities (e.g., shops, public transit, schools, etc.), property taxes, etc.).
- Property Data Resources, for example, data sources that include data that determines the assessed value for all real estate (e.g., MPAC, etc.), data sources that provide property title information and property reports (e.g., GeoWarehouse, etc.).
- Lifestyle Data Resources, for example, resources that provide lifestyle type information (e.g. Walkscore, Transit Score, Restaurants, Parks, School Districts, etc.).
- Government Data Resources, for example, data resources available relating to census data, the Federal Reserve, Statistics Canada, and other resources that provide information pertaining to real estate, as well as to the user.
- Credit Data Resource, for example a data source that provides credit information at a household level from Experian, Equifax, Transunion, etc. This resource can be used by the predictive analytics tool for both predictive real estate purchasing transactional analysis, as well as predictive real estate mortgage analysis.
- Behaviour and Location Data Resources, such as data resources providing intelligence relating to behavior and location intelligence pertaining to real estate and/or users (e.g., AirSage Data, etc.).
- Social Media Data Resource, for example, such as information pertaining to the user and/or real estate as can be gleaned from social media accounts, websites, search engines, etc. (e.g., Facebook™, Instagram™, Google™, Twitter™, Youtube™, etc.).
- Mortgage Data Resources, for example, such as information pertaining to mortgages for real estate and/or mortgages granted to the user (e.g., Genworth, Canada Guaranty, Purview (which provides fraud data), etc.).

The prediction can be sent to a real estate agent. Such real estate agent will only pay a fee to the owner of the real estate predictive analytics tool if the user engages in a successful transaction in accordance with the prediction.

If the map tool is provided as a standalone tool or a subscription based tool in the marketplace. Users of the real estate predictive analytic tool may be required to subscribe to the tool. For example the tool may be provided as a software-as-a-service (SAAS) subscription. The users may each set-up a profile for their subscription. The profile may indicate information such as one or more types of real estate, one or more geographic locations, a price range for real estate, and other details.

The report generated by the tool for a user may indicate the range of the predictions for the timing of the real estate listings identified in the report, such as a week, a month, a year, etc. The range of timing for predictions may alter in accordance with the operation of the artificial intelligence of the develop model module, as described herein.

The report of the predictive analytics tool provided to each user may be tailored to said user's profile details. For example, the report may only report on a specific type of real estate in a geographic area. A user may also provide details for particular reports to be generated, such as a report targeting specific real estate, such as home, or real estate of a specific size within a geographic location, real estate predicted to be listed within a set period of time within a geographic location, or a user can a request a report be generated in accordance with any other type of real estate parameters that a user wishes to set.

If the user subscribes for use of the tool the scope of the parameters available to a user may be in accordance with the level of the subscription of the user. For example, a basic level subscription may allow a user to generate reports providing information about the number of real estate listings predicted to occur within a period of time in a jurisdiction. A high level subscription may allow a user to generate reports providing full information about the specific real estate predicted to be listed within a period of time in a jurisdiction, including prior sale price, structure details, and all other details available to the ingest data module. Other subscription levels may also be determined to provide users with varying amounts of information in the reports said users generate.

The reports may be one-dimensional reports, or may be layered reports. A layered report may be a digital report with drill down options. The report may incorporate a wide range of information that may be provided to a user in a set of pages (either hardcopy pages or digital pages, such as webpages). The information and pages may be provided as accessible by the user from links, searches, in an order, or through drill down functions.

In some embodiments of the present invention there may be multiple ingest data modules. Each ingest data module may be operable to collect information related to a specific geographical area. All of the information collected by the ingest data modules may be stored in one or more servers, and the stored information may all be accessible to the develop model module. The multiple ingest data modules may be each utilized to process data in accordance with rules and functions programmed into software code operable by the ingest data module relating to the geographic area for which such ingest data module collects information.

In other embodiments of the present invention, multiple ingest data modules may be incorporated each being operable to collect and process information relating to a specific type of real estate.

In such embodiments of the present invention that incorporate multiple ingest data modules, users may only have access to information collected by one or more ingest data modules.

In embodiments of the present invention, user access may be available on a subscription basis, a temporary basis, or a one-off basis. No subscription maybe necessary for access on a one-off basis.

In embodiments of the present invention, a user may access a website and provide a request for a report to be generated on the basis of one or more parameters. The present invention may generate a report in accordance with such request and deliver the report to the user. The scope of information embedded in the report relating to the predicted real estate listings may be set by an administrator for various users or types of users. The scope of information embedded in a report may further be in accordance with the request of the user.

In some embodiments of the present invention, the scope of information embedded in the report relating to the predicted real estate listings may be in accordance with the credentials of the user. An example of such credentials may be real estate agent accreditation. For such embodiments of the present invention, a user may be required to provide credential information, and possibly confirmation thereof. In some embodiments of the present invention, a connection may exist between the ingest data module and a third party resource whereby credential information provided by a user can be verified. As an example, a real estate agent who provides an agent number as user credentials, may cause the present invention to access a real estate agent registry to confirm the real estate agent's agent number.

A real estate agent user of the present invention may be required to pay a referral fee for each use of the system on behalf of a client.

The develop model module 224 may process information transmitted from the ingest data module, and/or accessed from the one or more servers connected to the develop model module. The one or more servers may be remotely located from the develop model module. The develop model module may process information collected by the ingest module (or one or more ingest modules in some embodiments of the present invention), to review details relating to previously listed and sold real estate and present listings, and other information. Such information is utilized to generate models predicting when real estate is to be listed in the future, and/or to predict real estate listings to occur in the future for real estate in a geographic area generally. The models will consider the data collected by the ingest data module, such as real estate sales and listing information, world event information, real estate news stories, consumer behavior information, census information, and other information. The models that are generated may reflect a variety of variables.

The develop model module may be operable to apply artificial intelligence, that incorporates machine learning processes. By operation of the artificial intelligence, overtime the develop model module learns how to predict future real estate listings with increasing accuracy. Models generated by the module may be updated in accordance with the artificial intelligence operation of the module, such as advancements in learning thereof.

For example, the develop model module may compare prior predictions for real estate listings in a geographic area with listings at the time the prior prediction targeted to confirm accuracy of prior predictions. This step will further allow the develop model module to identify parameters upon which prior predictions were based that were not valid for the present listing, and thereby infer the weight of certain parameters in predictive processing. For example, the module may compare information relating to households, consumer behavior and social factors, such as world events, that were factored into the prediction to these elements existing at the time of the present listing.

This type of comparison aids the artificial intelligence operations of the present invention to advance its learning. The result is an increased level of machine learning achieved by the develop model module that assists the operability of the artificial intelligence. This increased learning can be conveyed into modifications to predictive models, or generation of new models.

The examples provided herein of processing involved in the artificial intelligence operability and machine learning of an embodiment of the present invention, are but some examples of possible processing. The processing of the artificial intelligence and machine learning of the module increase the accuracy of the predictions and predictive models of the develop model module incrementally over time. Essentially, the develop model module incrementally develops in a manner whereby it mimics cognitive functions associated with humans, including learning and problem solving.

When a user requests that a report be generated, or a report is otherwise indicated to the real estate predictive analytics tool to be generated, the develop model module will collect the information relating to the report parameters, either from information transmitted by the ingest data module immediately, or from the information stored in the one or more servers. The information will be processed in accordance with one or more models, as applicable to generate a report that predicts real estate listings in response to the report generation impetus (e.g., the user's request for a report, or some other event whereby a report is caused to be generated). The report is delivered to the user who requested the report, or access is made available to the user whereby the report may be accessed. Reports that are not generated upon a user request may be directed to a user or to a server for storage as indicated in the report generation parameter information.

Each report may indicate both predicted real estate listings and present real estate listings that are within the parameters for the report. A report may further indicate a percentage of accuracy for predictions, as may be altered overtime. Operation of the artificial intelligence of the present invention may cause the accuracy rate to increase over time.

The receipt of a report request and report parameters from a user shall be effected through a secure data transmission protocol. Any transmission of a report, or access provided to a report, will be through a secured mechanism and protocols applicable to the mode of delivery.

Figure 14:
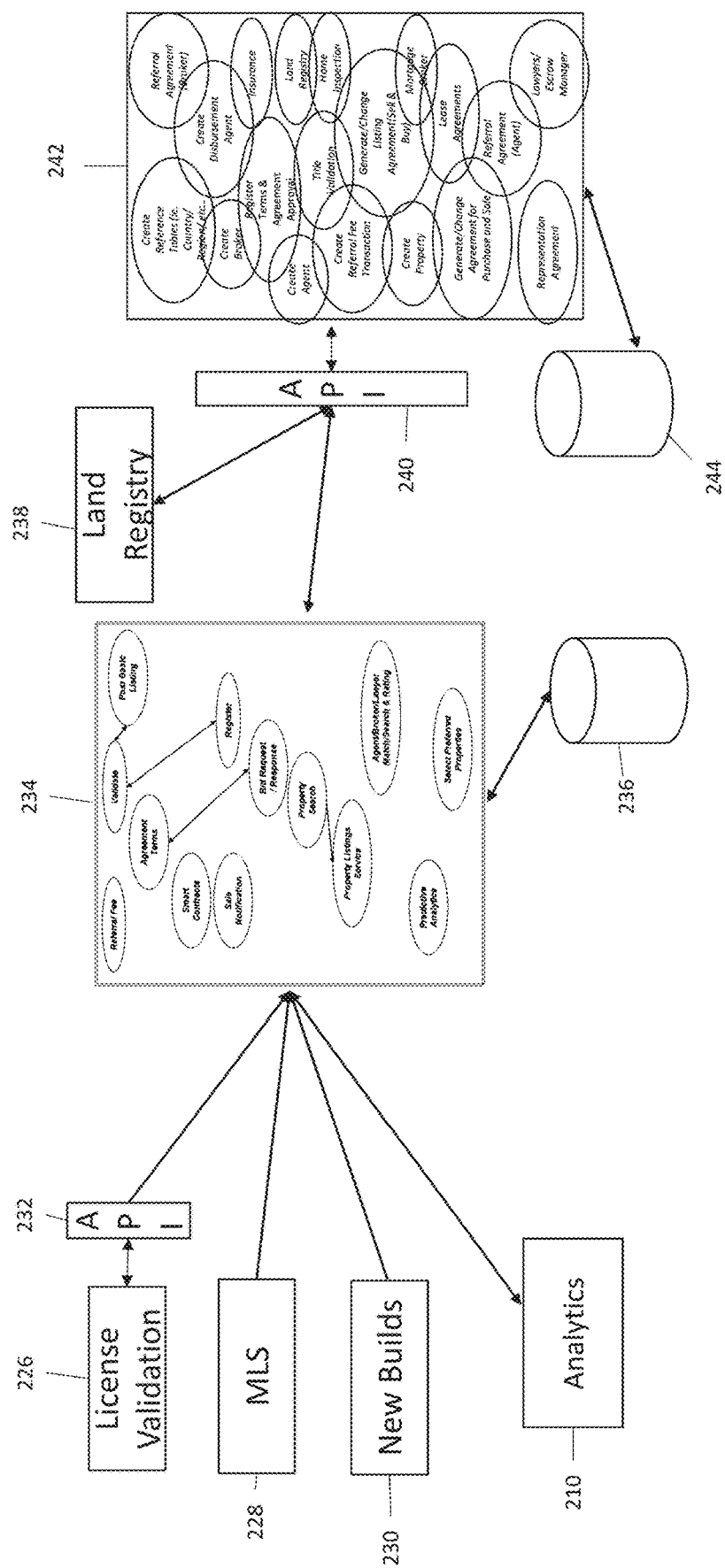
FIG. 14 is a systems view of a predictive analytic tool of an embodiment of the present invention incorporated with a real estate marketplace.

An example of an embodiment of the present invention having a predictive analytic tool is shown in FIG. 14, wherein the real estate predictive analytics tool 210 of the present invention is integrated with the system. The marketplace incorporates a platform 234 (or an app) that is connected to one or more data sources. For example, the one or more data sources may be a real estate license validation resource 226 that connects to the platform via an application programming interface (API) 232. The platform may further be connected to a real estate listing service such as MLS 228 (or any such listing service for the geographic location of the report), and a new builds database 230. The platform may be operable to use information collected from the data sources to assist buyer users and seller users to review real estate listing and to identify, enter agreements with and otherwise engage with real estate agent users and other service provider users to initiate and follow the steps through to completion for a real estate process. The real estate process may be a sale of real estate, purchase of real estate, or any other real estate process.

The platform may be connected to one or more servers 236 that are operable to store data provided to or generated by the platform. The platform may further be integrated with a blockchain technology 242 via a blockchain API 240. A land registry 238 may be connected to the blockchain API. The connection to the land registry facilitates land registry information being transmitted from the land registry to the blockchain technology and/or the platform. The blockchain technology may further be connected to one or more blockchain servers 244 that are operable to store data relating to blockchain (e.g., smart contract terms, ledgers, blocks, etc.).

In such an embodiment of the present invention, the real estate predictive analytics tool 10 may be operable to receive information from the platform. Information from the data resources connected to the platform and the land registry may be transferred to the ingest data module, along with information generated by users of the platform, or generated by processing of the platform. In this manner, information that the ingest data module collects can be provided by the platform. In some embodiments of the present invention, the ingest data module may generate a request for specific information from the platform.

Through such integration with the real estate marketplace, a user can request and/or access reports generated by the develop model module.

Scoring Module

Figure 23:
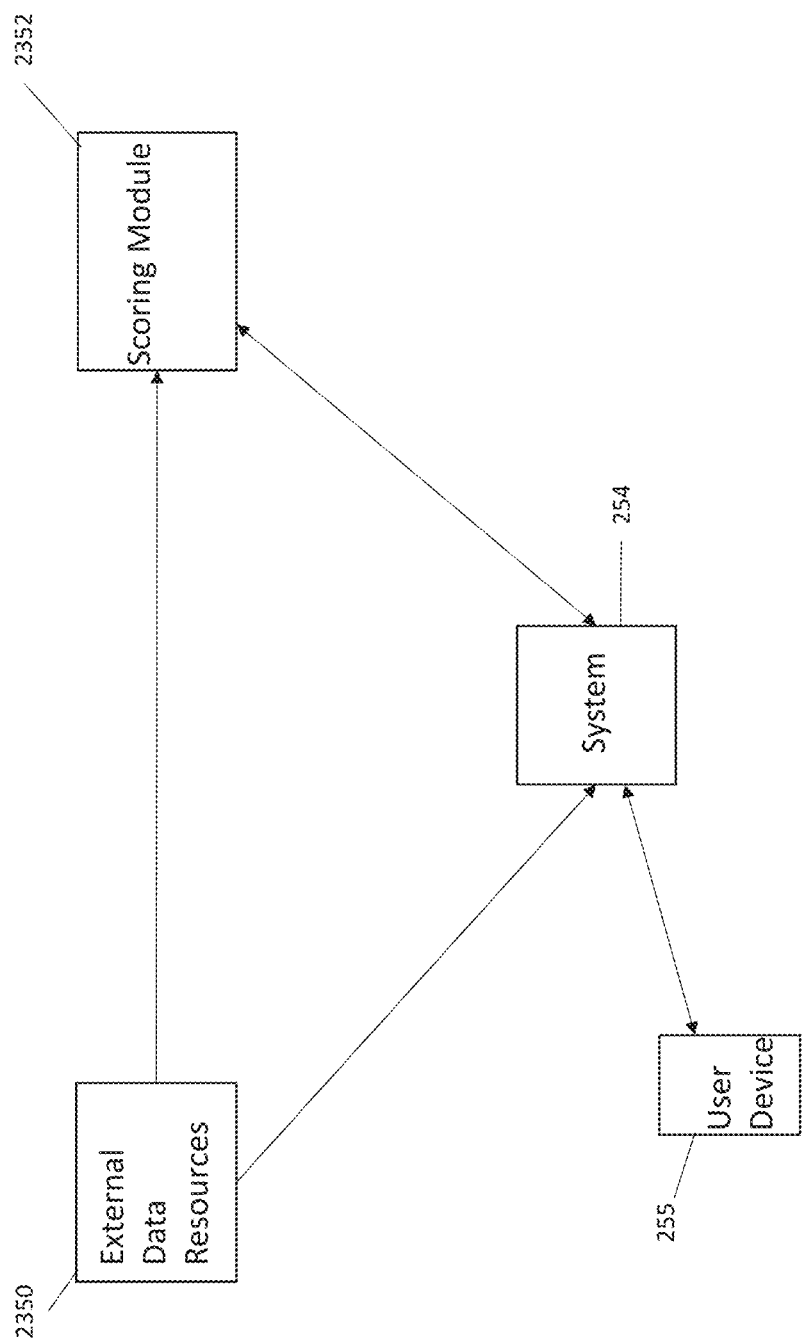
FIG. 23 is a systems view of a scoring module of an embodiment of the present invention incorporated with a real estate marketplace.
Figure 24:
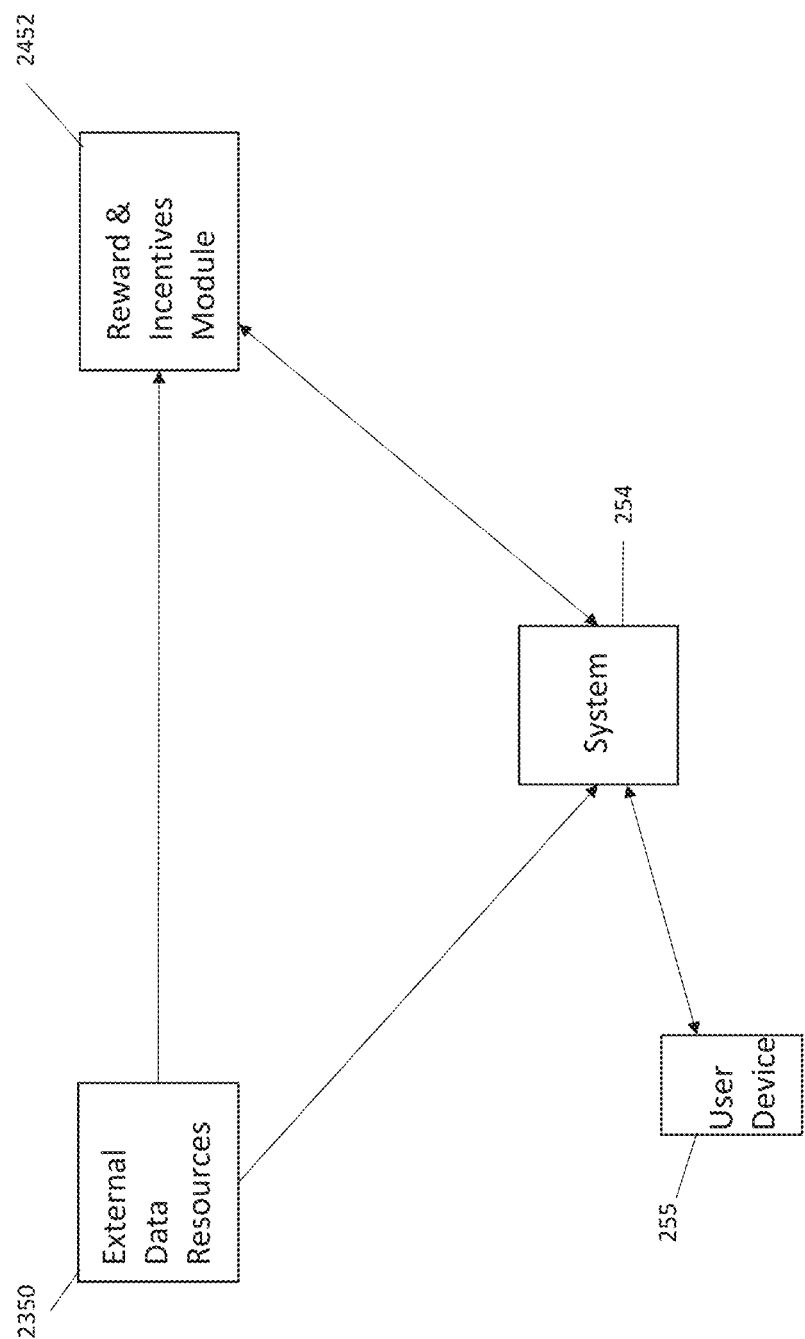
FIG. 24 is a systems view of a rewards and incentives module of an embodiment of the present invention incorporated with a real estate marketplace.

As shown in FIG. 23, a scoring module 2352 may be integrated with the system 254, that is the marketplace. The scoring module may gather information relating to a service provider from internal data resources within the marketplace, as described herein, or from one or more external data resources 2350, being any data resource that collects information relating to one or more of the service providers engaged with the marketplace to provide services via the marketplace or based upon a referral generated by the marketplace. Such information relating to a service provider may be processed by the scoring module, in accordance with algorithms and other processing criteria coded therein by the owner of the marketplace, to generate a score for said service provider's services. Such information may include one or more of the following: completed real estate transactions, years of experience as a service provider, sales metrics relating to real estate transactions, volume of real estate transactions undertaken by said service provider, days that real estate handled by said service provider remain on the real estate market, incomplete real estate transactions, type of real estate for which transactions are undertaken (e.g., condominiums, buildings, residential property, commercial property, leases, rentals, etc.), or other information.

In some embodiments of the present invention, the scoring module may access external data resources that provide a score relating to service provider, and the scoring module may not generate a new score, or may integrate said externally collected score into the scoring module processing.

Once the score is generated or otherwise obtained by the scoring module, the score may be transferred to the system and thereby provided to users of the marketplace, either via the marketplace, or through download to a user's device 255.

Dashboard

The marketplace may generate one or more dashboards that are viewable and useable by users of the marketplace, either within the marketplace, or via a webpage or mobile application relating to the marketplace. A dashboard may be general, so as to be useable by multiple users, or may be generated to be tailored to a particular user, or a particular group of users.

Figure 21:
FIG. 21 is a screen shot of a user dashboard of an embodiment of the present invention incorporated with a real estate marketplace.

An example of such a dashboard 2100 is shown in FIG. 21. The dashboard is operable to provide a user with access to information and functions relating to their use of the marketplace, and to functions of the marketplace generally. The dashboard may further be connected to one or more of the following, the predictive analytics tool, the scoring module, the map module, and other modules and tools of the marketplace or that are external to the marketplace and linked to the marketplace.

As an example, the dashboard may provide the user with a list of real estate profiles, bids, and/or proposals recently generated or reviewed by a user. Lists provided via a dashboard may be operable to permit access to a record or function referenced in the list through an action such as clicking upon a listed item. In this manner, the dashboard is operable to allow a user to drill-down several layers to access information in a staged progression (e.g., clicking on a property in the list may generate a new display to the user displaying information pertaining to the real estate including the address of the real estate, clicking on address of the real estate may generate a new display that is a geo-map of the real estate, etc.). The available layers of information may vary in different embodiments of the present invention and the information available in or to the marketplace.

A dashboard may display a user's favorite properties (e.g., based upon the number of reviews a user has made of a real estate property, the cumulative time a user has reviewed a real estate property, or an indication by the user that a real estate property is a favorite, etc.), real estate listings for similar real estate properties, new real estate property listings, etc. Alerts and notifications generated by the system may be accessible by a user via a dashboard, for example, such as alerts and notifications advising a user of new or present agent bids, or proposals. A dashboard may have preference settings or filter capabilities, whereby a user can control and configure the information that will be displayed upon a dashboard.

A dashboard may further provide a user with access to information pertaining to all of the service providers that the user has indicated it likes, service providers a user has submitted or responded to a bid or proposal to or from, service provides a user has corresponded with via the marketplace or otherwise met, reviews and/or scores relating to service providers, etc.

Communications generated by a user may be accessible in a section of the dashboard, for example, including emails, text or other messaging, alerts, an active calendar, meeting notices, etc.

The dashboard may further provide access to information and functions relating to any of the following: mortgage brokers, mortgage pre-approvals, approved mortgages, land registry data (e.g., validation of title and title insurance, etc.), home insurance, home services (e.g., painting, decoration, etc), and other information and functions relating to real estate, the user's activities in and relating to the marketplace, and other functionalities and information accessible via the marketplace.

Reward & Incentive Module

Embodiments of the present invention may incorporate a rewards and incentives module 2352 or tool operable to undertake one or more of the following:

a reward system, whereby all fees collected from all transactions conducted through the marketplace that are paid to marketplace owner are calculated, and a portion of such fees is directed to purchasing real estate or application to a portion of the cost of purchase of real estate either for: users of the marketplace; or for charitable or other purposes whereby such real estate may be given away in accordance with humanitarian and charitable purposes. The criteria for the application of such a reward to a person or a humanitarian or charitable purpose and/or the portion of the fees to be so applied, may vary in different embodiments of the present invention. Such criteria may be set for individual promotions, long-term projects or in any other manner by the owner of the marketplace, and may be altered on the fly by such owner of the marketplace.

a. an incentive system, that is operable such that users who refer new users to the platform will receive an incentive for the referral (e.g., real estate or a portion of the cost of such real estate) if the referred user completes a successful transaction on through the marketplace.

It will be appreciated by those skilled in the art that other variations of the embodiments described herein may also be practiced without departing from the scope of the invention. Other modifications are therefore possible whereby the system and marketplace of the present invention may be applied to industries other than real estate whereby multiple service providers are engaged in a transaction or process, such as, for example development and manufacturing of products, corporate transactions, etc.

We claim:

1. A computer implemented method for generating graphical user interface dashboards by rendering user interface screen views for providing a decision support interface for one or more users on a real estate marketplace system, the real estate marketplace system including at least one processor operable for performing the steps of:

a. one or more users each generating a profile in the real estate marketplace system, and the following steps of:
  i. one of the one or more users that is a first user generating a proposal data object including one or more data representations of one or more property preferences and making the proposal data object available via the real estate marketplace system to one or more other users who have generated corresponding proposal data objects, the real estate marketplace system, through a matching module configured to process the proposal data object against the corresponding proposal data objects of the one or more other users to identify a plurality of matching proposals sharing one or more common property preferences, and rendering interactive user interface screen elements to a computing interface corresponding to the first user representing the plurality of matching proposal data objects and providing an input mechanism for selection of a selected matching proposal data object from the plurality of matching proposal data objects;
  ii. one or more of the one or more users that is a second user accessing and viewing the selected matching proposal, the second user selected based on a corresponding proposal data object of the second user being selected as the selected proposal data object;
  iii. the second user generating an offer in response to the selected proposal data object and transferring such offer to the first user;
  iv. the first user that receives the offer reviewing the offer and generating a response that declines or accepts the offer and transferring such response to the second user;
  v. a real estate process agreement being generated by the real estate marketplace system between the first user and the second user and being transferred to said first user and said second user for execution of the real estate process agreement; and
  vi. said first user and second user engaging in a real estate process based on the selected proposal data object to generate an outcome data representation, the plurality of matching proposals provided in a ranked graphical user interface view;

b. periodically re-training a computational machine learning data model architecture based at least on prior predictions conducted on the real estate marketplace system compared against actual transactions provided in the outcome data representation to incrementally improve the computational machine learning data model architecture as transactions are completed, such that weight value of parameters of the computational machine learning data model architecture are periodically updated responsive to the re-training of the computational machine learning data model architecture using the outcome data representation;

wherein the ranked graphical user interface view renders graphical representations of the plurality of matching proposals ranked based on a ranking provided by processing the proposal data object and the corresponding proposal data objects of the one or more other users using the computational machine learning data model architecture;

wherein monitored representations of tracked activities of users interacting with the user interface screen views are utilized in the re-training of the computational machine learning data model architecture to aid in predicting whether a new user is likely to select a particular property by inferring a weight of parameters in predictive processing, the tracked activities of the new user being used as an input into the computational machine learning data model architecture for determining the ranking; and c. generating a map comprising the steps of:
  i. generating map data by geo-coding real estate assets associated with the plurality of matching proposals;
  ii. generating a map file using the map data, wherein the map data includes geolocations of the real estate assets associated with the plurality of matching proposals; and
  iii. compressing the map file;
  iv. and transmitting the compressed map file to the first user.

2. The computer implemented real estate process marketplace method of claim 1, comprising the step of generating a smart contract as the real estate process agreement, the smart contract facilitating performance free of interaction of the first user or the second user once the smart contract is established, the smart contract residing on a blockchain ledger and triggered upon occurrence of one or more triggering events.

3. The computer implemented real estate process marketplace method of claim 2, comprising the step of generating, on the blockchain ledger, a representation of the smart contract for the real estate process in accordance with terms of the real estate process agreement, the smart contract executable on the blockchain ledger to disburse funds to a seller user occurring upon acceptance of a statement of accounts for a sale of the real estate.

4. The computer implemented real estate process marketplace method of claim 1, comprising the step of the first user or second user engaging one or more other users to assist with the real estate market process as a service provider, the service provider also identified using the computational machine learning data model architecture by at least the first user or a second user using a second ranked view showing a ranking of a plurality of service providers based on processing one or more characteristics representing each service provider and the selected matching proposal data object.

5. The computer implemented real estate process marketplace method of claim 4, comprising the step of the real estate marketplace system operating to generate a workflow identifying the steps for the real estate process, and identifying sub-steps for each real estate service provider engaged for the real estate process, the workflow being controlled as a computational process by a workflow computational module, which is configured to enable the first user or the second user to view a representation of the workflow and the activities of the real estate process and status of progression through such steps of the service provider, the first user, and the second user.

6. The computer implemented real estate process marketplace method of claim 3, comprising the step of the real estate marketplace system generating one or more agreements between the first user and second user, or the first user and a service provider, or the second user and a service provider, in accordance with the real estate process.

7. The computer implemented real estate process marketplace method of claim 3, comprising the step of engaging one or more service providers that are one or more of the following: home and property insurance providers, mortgage brokers, property inspectors, home inspectors, lawyers, escrow managers, and financial institutions, and each of the one or more service providers correspond to a computing device that operates a node of the blockchain system that maintains the blockchain ledger as a distributed ledger system where each node propagates blockchain ledger updates to other nodes.

8. The computer implemented real estate process marketplace method of claim 1, wherein the monitored representations of tracked activities of the users interacting include tracked activities that are conducted by each user of the users at a single searching session, or over time as the user utilizes the real estate marketplace system at different dates and times, the tracked activities including the user interacting with displayed information using an interface input device.

9. The computer implemented real estate process marketplace method of claim 3, comprising the step of the first user, second user and the one or more service providers operating the real estate marketplace system via a computing device that renders the decision support interface.

10. The computer implemented real estate process marketplace method of claim 1, comprising the step of the real estate marketplace system collecting proposal data objects from the first user and one or more other users, and making one or more such proposal data objects accessible by the second user in accordance with a query generated by said second user, whereby the one or more proposals available to the second user are identified by the real estate marketplace system as incorporating criteria identified by the query.

11. The computer implemented real estate process marketplace method of claim 10, comprising the step of the real estate marketplace system identifying one or more proposal data objects as incorporating the criteria of a location identified in the query.

12. The computer implemented real estate process marketplace method of claim 1, comprising the step of the real estate marketplace system being linked to one or more real estate registry systems, and the real estate marketplace system transferring one or more filings generated by the real estate process to each of the one or more real estate registry systems.

13. The computer implemented real estate process marketplace method of claim 3, wherein the blockchain ledger is coupled to a land registry computing device through a blockchain application programming interface, transferring information relating to purchase and consequent change of title of real-estate to the land registry computing device.

14. The computer implemented real estate process marketplace method of claim 1, comprising the step of the real estate marketplace system generating a map indicating one or more real estate locations relating to a real estate process.

15. The computer implemented real estate process marketplace method of claim 1, comprising the step of the real estate marketplace system generating predictive analytics for a real estate asset or for one or more real estate assets in a geographic location.

16. The computer implemented real estate process marketplace method of claim 1, wherein the computational machine learning data model architecture is trained only with transaction data restricted to a geographic area.

17. The computer implemented real estate process marketplace method of claim 1, wherein the computational machine learning data model architecture is trained with an expanded set of prior transaction data that is expanded with additional parameters that were not available at the time when the prior transaction data were entered into the real estate marketplace system.

18. The computer implemented real estate process marketplace method of claim 17, wherein the additional parameters that were not available at the time when the prior transaction data were entered into the real estate marketplace system are obtained from additional external data sources.

19. A non-transitory computer readable medium storing machine interpretable instruction sets, which when executed by a processor, cause the processor to perform a computer implemented method for generating graphical user interface dashboards by rendering user interface screen views for providing a decision support interface for one or more users on a real estate marketplace system, the real estate marketplace system including at least one processor operable for performing the steps of:

a. one or more users each generating a profile in the real estate marketplace system, and the following steps of:
    i. one of the one or more users that is a first user generating a proposal data object including one or more data representations of one or more property preferences and making the proposal data object available via the real estate marketplace system to one or more other users who have generated corresponding proposal data objects, the real estate marketplace system, through a matching module configured to process the proposal data object against the corresponding proposal data objects of the one or more other users to identify a plurality of matching proposals sharing one or more common property preferences, and rendering interactive user interface screen elements to a computing interface corresponding to the first user representing the plurality of matching proposal data objects and providing an input mechanism for selection of a selected matching proposal data object from the plurality of matching proposal data objects;
    ii. one or more of the one or more users that is a second user accessing and viewing the selected matching proposal, the second user selected based on a corresponding proposal data object of the second user being selected as the selected proposal data object, iii. the second user generating an offer in response to the selected proposal data object and transferring such offer to the first user;
iv. the first user that receives the offer reviewing the offer and generating a response that declines or accepts the offer and transferring such response to the second user;
v. a real estate process agreement being generated by the real estate marketplace system between the first user and the second user and being transferred to said first user and said second user for execution of the real estate process agreement; and
vi. said first user and second user engaging in a real estate process based on the selected proposal data object to generate an outcome data representation, the plurality of matching proposals provided in a ranked graphical user interface view, the plurality of matching proposals corresponding to rendered geolocated objects on a real estate map tool;

b. periodically re-training a computational machine learning data model architecture based at least on prior predictions conducted on the real estate marketplace system compared against actual transactions provided in the outcome data representation to incrementally improve the computational machine learning data model architecture as transactions are completed, such that weight value of parameters of the computational machine learning data model architecture are periodically updated responsive to the re-training of the computational machine learning data model architecture using the outcome data representation;

wherein the ranked graphical user interface view renders graphical representations of the plurality of matching proposals ranked based on a ranking provided by processing the proposal data object and the corresponding proposal data objects of the one or more other users using the computational machine learning data model architecture;

wherein monitored representations of tracked activities of users interacting with the user interface screen views are utilized in the re-training of the computational machine learning data model architecture to aid in predicting whether a new user is likely to select a particular property by inferring a weight of parameters in predictive processing, the tracked activities of the new user being used as an input into the computational machine learning data model architecture for determining the ranking; and c. generating a map comprising the steps of:
i. generating map data by geo-coding real estate assets associated with the plurality of matching proposals;
ii. generating a map file using the map data, wherein the map data includes geolocations of the real estate assets associated with the plurality of matching proposals; and
iii. compressing the map file;
iv. and transmitting the compressed map file to the first user.

20. A computer implemented real estate process marketplace system including at least a processor coupled to computer memory and non-transitory computer readable data storage, the processor configured for rendering screen views in providing a decision support interface for one or more user, the processor configured for,
a. one or more users each generating a profile in the real estate marketplace system, and performing the following steps of:
i. one of the one or more users that is a first user generating a proposal data object including one or more data representations of one or more property preferences and making the proposal data object available via the real estate marketplace system to one or more other users who have generated corresponding proposal data objects, the real estate marketplace system, through a matching module configured to process the proposal data object against the corresponding proposal data objects of the one or more other users to identify a plurality of matching proposals sharing one or more common property preferences, and rendering interactive user interface screen elements to a computing interface corresponding to the first user representing the plurality of matching proposal data objects and providing an input mechanism for selection of a selected matching proposal data object from the plurality of matching proposal data objects;
ii. one or more of the one or more users that is a second user accessing and viewing the selected matching proposal, the second user selected based on a corresponding proposal data object of the second user being selected as the selected proposal data object,
iii. the second user generating an offer in response to the selected proposal data object and transferring such offer to the first user;
iv. the first user that receives the offer reviewing the offer and generating a response that declines or accepts the offer and transferring such response to the second user;
v. a real estate process agreement being generated by the real estate marketplace system between the first user and the second user and being transferred to said first user and said second user for execution of the real estate process agreement; and
vi. said first user and second user engaging in a real estate process based on the selected proposal data object to generate an outcome data representation, the plurality of matching proposals provided in a ranked graphical user interface view;

b. periodically re-training a computational machine learning data model architecture based at least on prior predictions conducted on the real estate marketplace system compared against actual transactions provided in the outcome data representation to incrementally improve the computational machine learning data model architecture as transactions are completed, such that weight value of parameters of the computational machine learning data model architecture are periodically updated responsive to the re-training of the computational machine learning data model architecture using the outcome data representation;

wherein the ranked graphical user interface view renders graphical representations of the plurality of matching proposals ranked based on a ranking provided by processing the proposal data object and the corresponding proposal data objects of the one or more other users using the computational machine learning data model architecture;

wherein monitored representations of tracked activities of users interacting with the user interface screen views are utilized in the re-training of the computational machine learning data model architecture to aid in predicting whether a new user is likely to select a particular property by inferring a weight of parameters in predictive processing, the tracked activities of the new user being used as an input into the computational machine learning data model architecture for determining the ranking; and c. generating a map comprising the steps of:

i. generating map data by geo-coding real estate assets associated with the plurality of matching proposals;

ii. generating a map file using the map data, wherein the map data includes geolocations of the real estate assets associated with the plurality of matching proposals; and iii. compressing the map file;

iv. and transmitting the compressed map file to the first user.

* * * * *